United States Patent
Fujimori et al.

(10) Patent No.: US 7,226,171 B2
(45) Date of Patent: Jun. 5, 2007

(54) OPTICAL DEVICE AND PROJECTOR

(75) Inventors: Motoyuki Fujimori, Suwa (JP); Masami Murata, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 230 days.

(21) Appl. No.: 11/019,587

(22) Filed: Dec. 23, 2004

(65) Prior Publication Data

US 2005/0168703 A1   Aug. 4, 2005

(30) Foreign Application Priority Data

Dec. 26, 2003 (JP) ............................. 2003-433296
Mar. 11, 2004 (JP) ............................. 2004-068847
Oct. 28, 2004 (JP) ............................. 2004-314547

(51) Int. Cl.
G03B 21/16 (2006.01)
G03B 21/18 (2006.01)
G03B 21/26 (2006.01)

(52) U.S. Cl. .......................................... 353/52; 353/54
(58) Field of Classification Search .................. 353/52, 353/54, 60, 119, 122, 31; 349/161
See application file for complete search history.

(56) References Cited

U.S. PATENT DOCUMENTS 6,450,646 B1 * 9/2002 Ono et al. .................... 353/57

2002/0163625 A1 * 11/2002 Tabuchi et al. ............... 353/31

FOREIGN PATENT DOCUMENTS

JP   A 03-174134   7/1991
JP   A 2002-357803   12/2002

* cited by examiner

Primary Examiner—Melissa Jan Koval
Assistant Examiner—Andrew Kong
(74) Attorney, Agent, or Firm—Oliff & Berridge, PLC

(57) ABSTRACT

An optical device (44) includes an optical modulator holder (4402) having a cooling chamber, in which cooling fluid is sealed therein, for holding the optical modulator in the thermally conductive state for the cooling fluid in the cooling chamber, a plurality of fluid circulating members (448) communicated to the cooling chamber of the optical modulator holder for guiding said cooling fluid to the outside of said cooling chamber and again guiding the cooling fluid to the inside of the cooling chamber, and a cooling fluid accumulating section provided in flow path of the cooling fluid of the plurality of fluid circulating members for accumulating therein the cooling fluid; in which the cooling fluid accumulating section includes a main tank 445 and a fluid branching section 4401 provided in the upstream of the cooling fluid against the optical modulator holder and a downstream-side cooling fluid accumulating section provided in the downstream of the cooling fluid against the optical modulator holder.

20 Claims, 28 Drawing Sheets

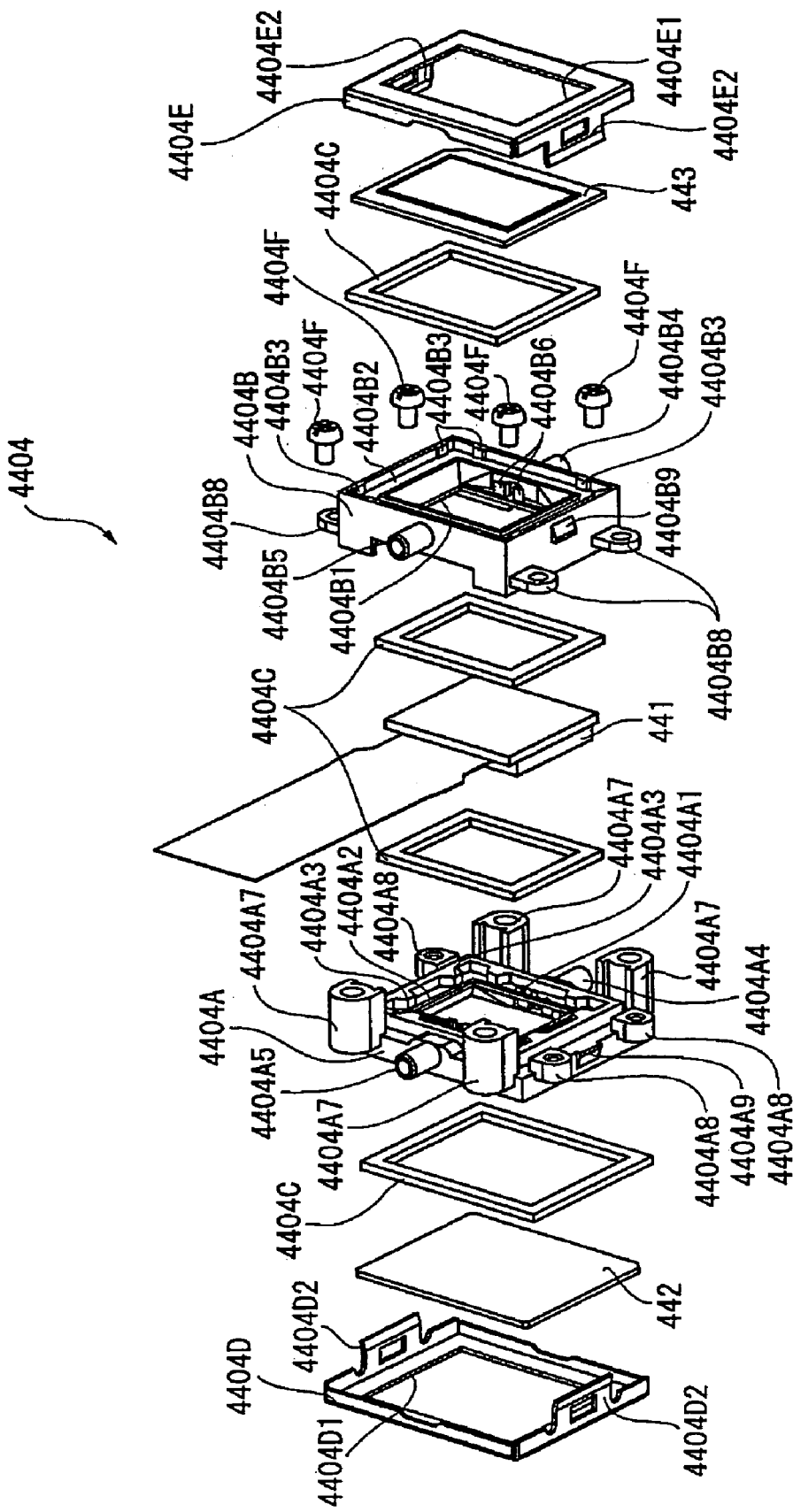

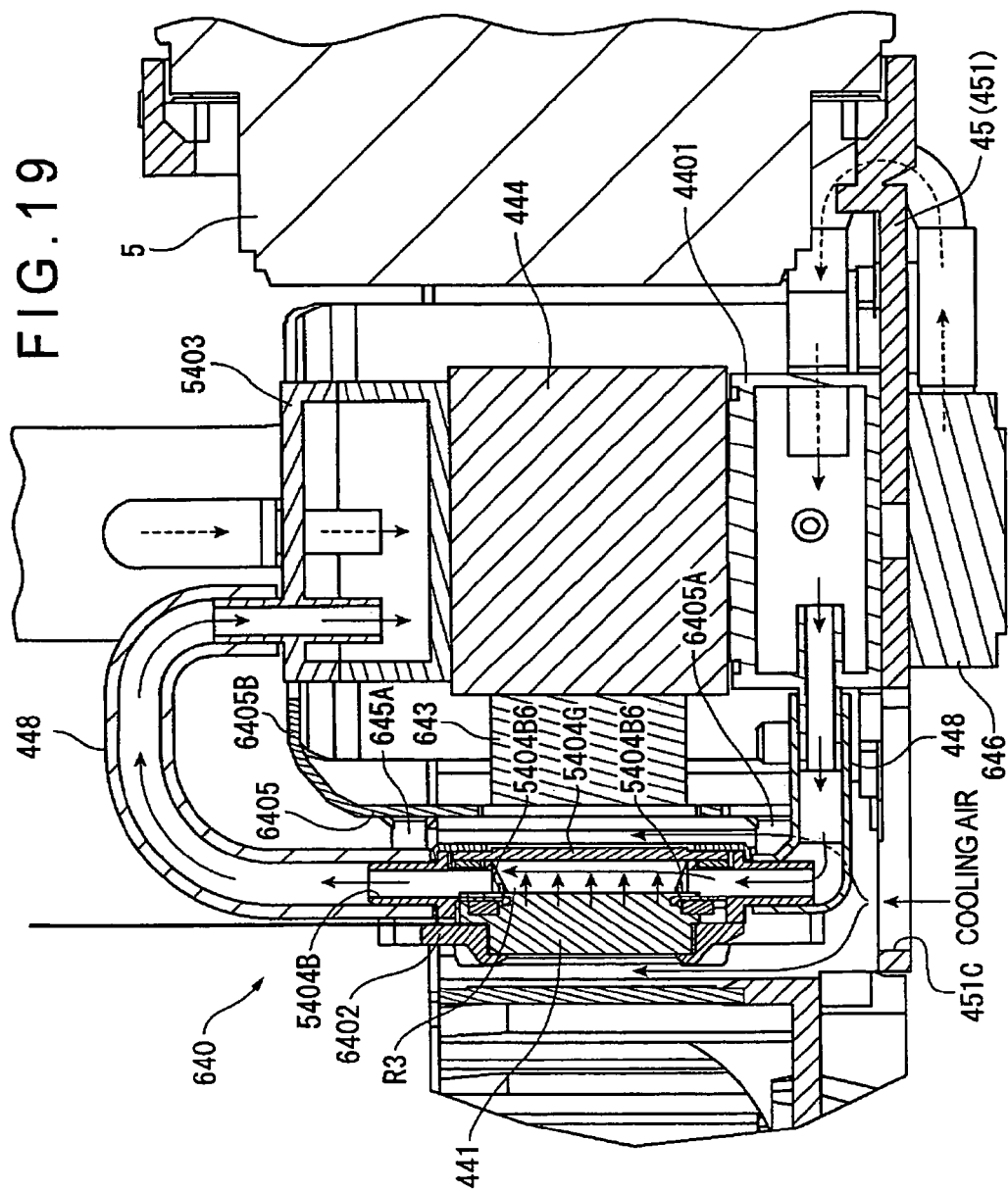

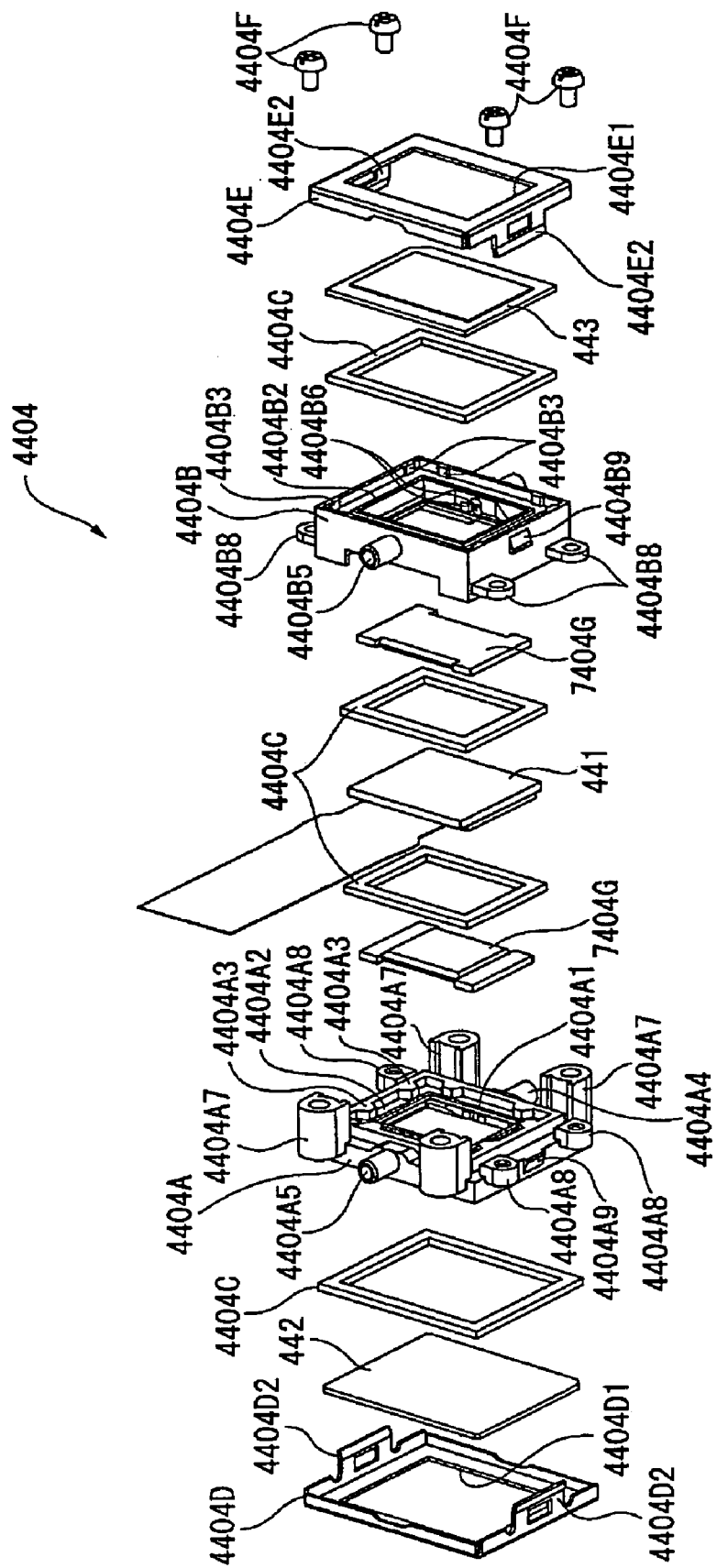

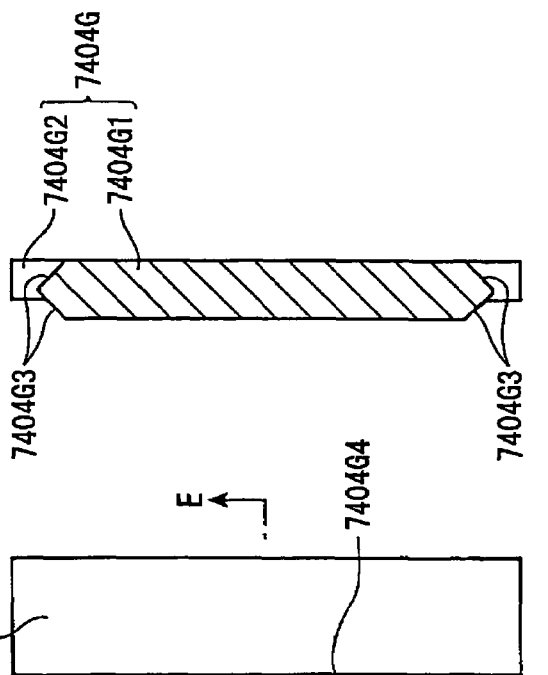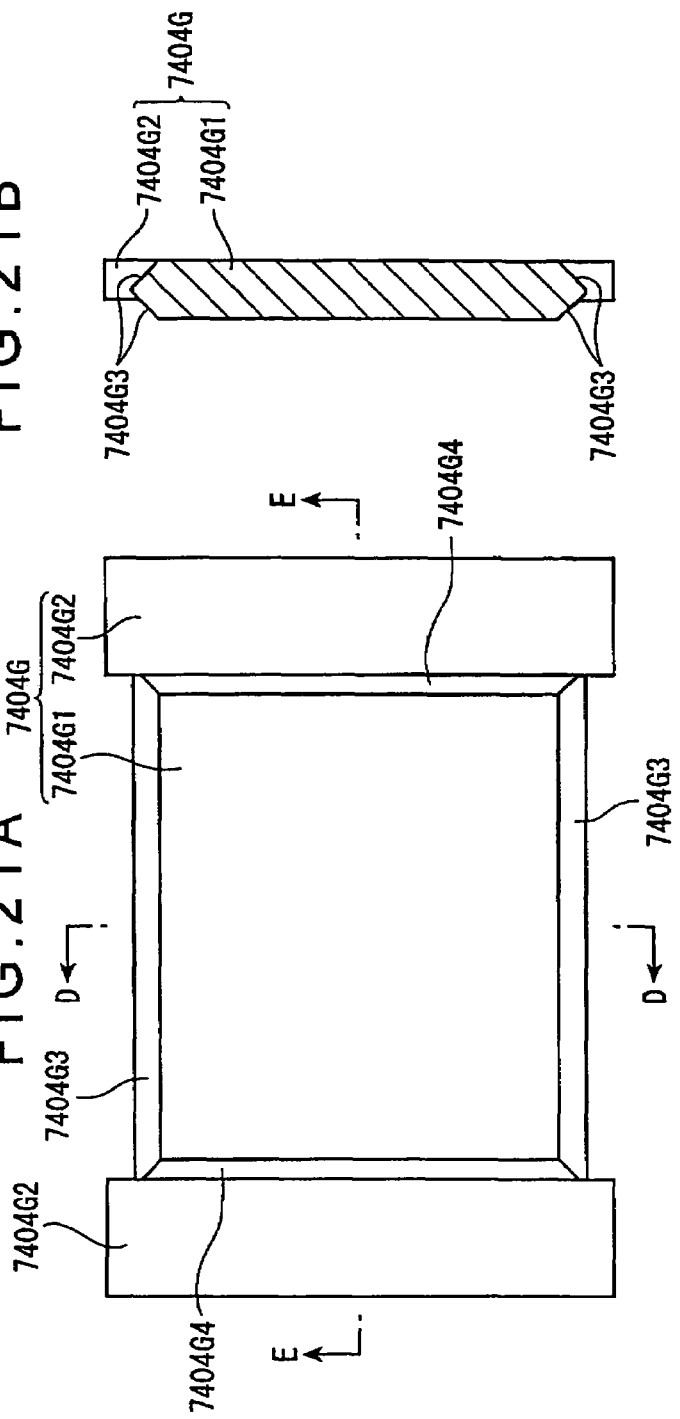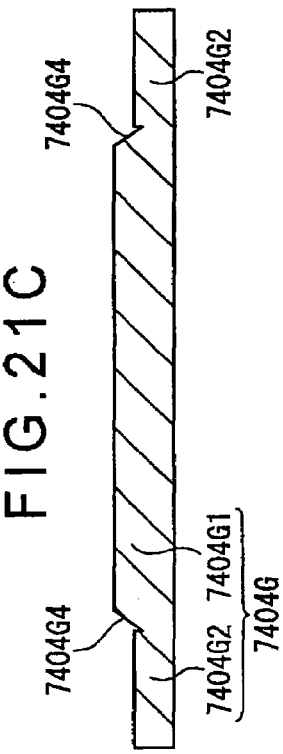

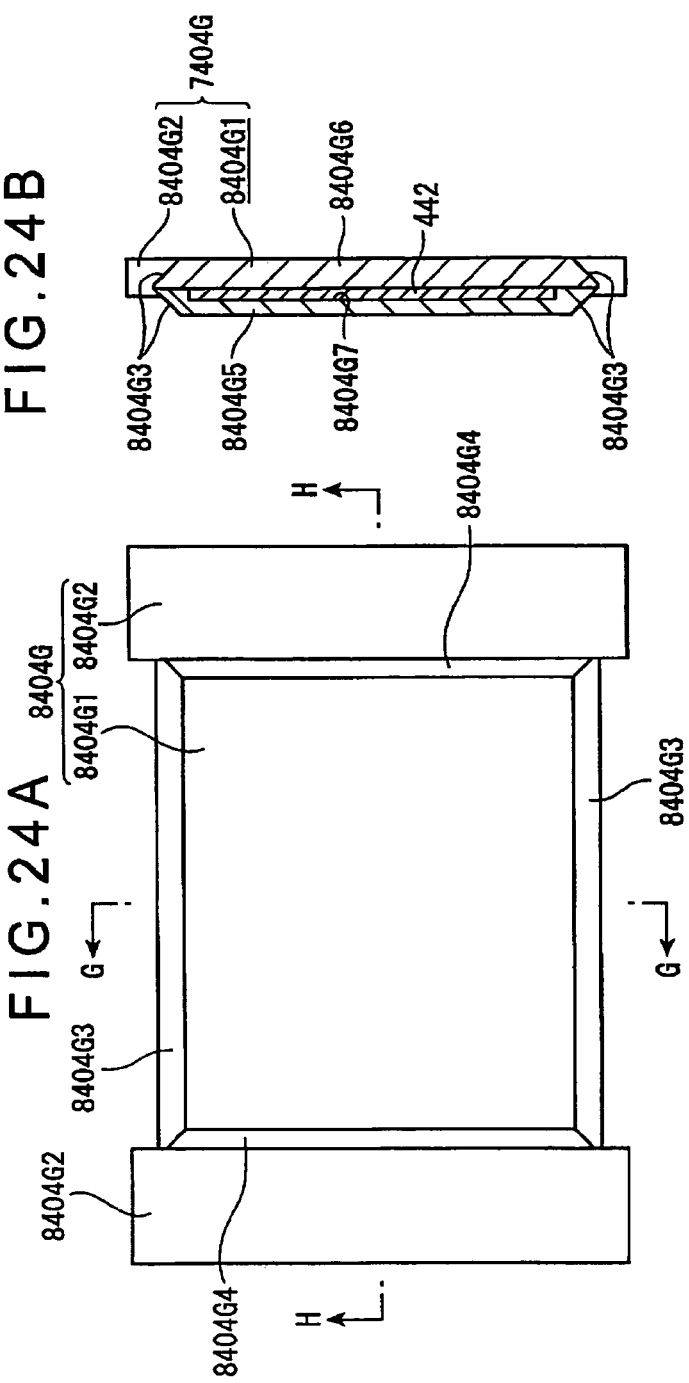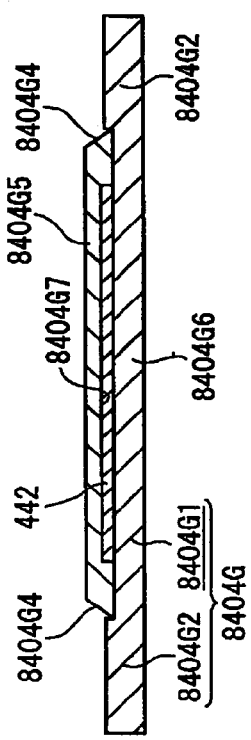

OPTICAL DEVICE AND PROJECTOR

BACKGROUND OF THE INVENTION

1. Field of the Invention

The present invention relates to an optical device and to a projector.

2. Description of Related Art

There has been known a projector comprising a plurality of optical modulators each for modulating a light beam irradiated from a light source according to image information to form an optical image, a color combining optical device for combining the light beams modulated by the optical modulators, and a projecting optical device for projecting the light beams combined by the color combining optical device to project the formed image in the enlarged state.

Of these components, as the optical modulator, for instance, an optical modulator based on the active matrix drive system with an electro-optic material such as a liquid crystal sealed between a pair of boards is generally employed. More specifically, the pair of boards constituting this optical modulator comprises a drive board provided in the light beam incident side and comprising a data line, a scan line, a switching element, a pixel electrode and the like formed thereon for loading a drive voltage to a liquid crystal, and a counter board provided in the light beam irradiation side and comprising a common electrode, a black mask and the like formed thereon.

Further a light beam incident side polarization plate and a light beam irradiation side polarization plate allowing transmission of light beams having prespecified polarization axes respectively are provided in the light beam incident side and light beam irradiation side of this optical modulator respectively.

When a light beam irradiated from a light source is irradiated to the optical modulator, the temperature of the optical modulator often rises due to absorption of light by the liquid crystal layer or by the data line and scan line formed on the drive board, and also by the black matrix or the like formed on the counter board. Further, of the light beams irradiated from a light source, and also of the light beams having passed through the optical modulator, those not having the prespecified polarization axes are absorbed by the light beam incident side polarization plate and the light beam irradiation side polarization plate, which often generate heat in the polarization plates.

To overcome the problems in the projector having optical modulators therein, there has been proposed a projector having a cooling system for alleviate the temperature rise in an optical modulator with a cooling fluid (Refer to, for instance, Japanese Patent Laid-Open Publication No. HEI 3-174134).

Namely, the cooling system described in the reference above comprises a casing with the two edge faces opposing to each other opened and having a substantially rectangular form, and also comprises a cooling chamber with a cooling fluid filled therein. An optical modulator is provided on one of the edge faces opposing to each other with an incident-side polarization plate provided on the other edge face, and the optical modulator and incident-side polarization plate closes the opened opposing edge faces to form a cooling chamber. With the configuration as described above, the heat generated in the optical modulator and the incident-side polarization plate is directly released to the cooling fluid.

With the cooling system described in the reference, however, as a capacity of the cooling fluid sealed in the cooling chamber is small, the heat exchange capability between the cooling fluid and the heated optical modulator or the optical element including the heated incident-side polarization plate is rather low.

Further as a circulation speed of the cooling fluid sealed in the cooling chamber is slow, the cooling fluid is easily warmed up by the heated optical element, so that a temperature difference between the optical modulator and the cooling fluid becomes smaller.

For the reasons as described above, with the cooling device described in the reference, there is the problem that it is difficult to efficiently cool an optical element with a cooling fluid.

SUMMARY OF THE INVENTION

A main object of the present invention is to provide an optical device and a projector in which optical elements can efficiently be cooled by a cooling fluid.

The optical device according to the present invention comprises an optical modulator for forming an optical image by modulating light beam irradiated from a light source according to image information, having a cooling chamber formed therein for sealing a cooling fluid, and this optical device further comprises an optical modulator holder for holding the optical modulator so that heat can be transferred to a cooling fluid inside the cooling chamber, a plurality of cooling fluid circulating members each directly communicated to a cooling chamber in the optical modulator holder for guiding the cooling fluid to outside of the cooling chamber and again guiding the cooling fluid into the cooling chamber, and a cooling fluid accumulating section provided in a flow path of the cooling fluid in the plurality of the cooling fluid-circulating members for accumulating the cooling fluid therein, and is characterized in that the cooling fluid accumulating section comprises an upstream side cooling fluid accumulating section provided in the upstream side of a flow path for the cooling fluid against the optical modulator holder, and a downstream side accumulating section provided in the down stream side of the flow path for the cooling fluid against the optical modulator holder.

In the present invention, the optical device comprises an optical modulator holder, a plurality of cooling fluid circulating members, and a cooling fluid accumulating section. The cooling fluid accumulating section comprises an upstream side cooling fluid accumulating section and a downstream side cooling fluid accumulating section. Because of this configuration, by sealing a cooling fluid not only in a cooling chamber of an optical modulator holder, but also in a plurality of cooling fluid circulating members and cooling fluid accumulating sections, a capacity of the cooling fluid can be made larger, so that the heat exchange capability between the optical modulator and the cooling fluid can be improved.

The cooling fluid accumulating section comprises the upstream side cooling fluid accumulating section and the downstream side cooling fluid accumulating section, so that in the cooling chamber of the optical modulator holder, a cooling fluid flowing from the upstream side to the down stream side can smoothly flow, so that a circulation speed of the cooling fluid can be made faster.

Because of the feature, the cooling fluid is not warmed up by the optical modulator and a temperature difference between the optical modulator and the cooling fluid never decreases and the optical modulator can efficiently be cooled by the cooling fluid, thus object of the present invention being achieved.

The optical device according to the present invention should preferably comprise a heat radiating section provided in a flow path of the cooling fluid in each of the fluid circulating members extending from the downstream side cooling fluid accumulating section toward the upstream side cooling fluid accumulating section for radiating heat of the cooling fluid.

As the heat radiating section, it is possible to employ, for instance, the so-called radiator having a plurality of heat-radiating fins connected in the heat-transferable state with a cooling fluid circulating therein to a plurality of fluid circulating members so that heat can be released to a cooling fluid flowing therein for radiating heat of the cooling fluid flowing through the fluid circulating members to the plurality of heat-radiating fins. Not only the radiator, but also a Peltier module making use of the Peltier effect connected to a plurality of fluid circulating members in the heat-transferable state with the cooling fluid flowing therein.

With the present invention, as the optical device comprises a heat-radiating section, a cooling fluid flowing from the downstream side cooling fluid accumulating section to the upstream side cooling fluid accumulating section, so that the temperature of the cooling fluid accumulated in the upstream side cooling fluid accumulating section can be lowered. Therefore, the optical element can further efficiently be cooled with the cooled cooling fluid flowing from the upstream side cooling fluid accumulating section to a cooling chamber in the optical modulator holder.

The optical device according to the present invention should preferably comprise a fluid press-feeder provided in a flow path for the cooling fluid in each of the plurality of fluid circulating members for press-feeding the cooling fluid via the plurality of fluid circulating members to the optical modulator holder to force the circulation of the cooling fluid.

With the present invention, as the optical device comprises a fluid press feeder, it is possible to send out the cooling fluid warmed up by the optical modulator in the cooling chamber to the downstream side fluid circulating member without fail, and also to make the cooling fluid inside the upstream side cooling fluid accumulating section into the cooling chamber, so that circulation of the cooling fluid inside the cooling chamber can be performed without fail. Because of this feature, it is possible to maintain a large temperature difference between an optical modulator and a cooling fluid with the heat exchange efficiency between the cooling fluid and the optical modulator further improved.

In the optical device according to the present invention, the optical modulator holder preferably comprises a pair of frame members having openings respectively in correspondence to an image formation region of the optical modulator and a pair of light-transmissible boards on the sides of the openings opposite to the sides where the pair of frame members are opposed to each other for respectively closing the sides of the openings opposite to the sides where the pair of frame members are opposed to each other; the optical modulator holder is held between the pair of frame members to close the sides of the opening where the pair of frame members are opposed to each other; inlet ports for inletting the cooling fluid into inside thereof and outlet ports for sending out the cooling fluid to the outside are formed in the pair of frame members respectively, both communicating to the plurality of fluid circulating members; a pair of the cooling chambers are formed for sealing the cooling fluid by closing the sides of the opening where the pair of frame members are opposed to each other and the sides of the openings opposite to the sides where the pair of frame members are opposed to each other respectively with the optical modulator and the pair of light-transmissible substrates respectively In the present invention, the optical modulator holder comprises a pair of frame members having openings, and a pair of light-transmissible boards. The optical modulator is held between the pair of frame members, and the pair of light-transmissible board are provided in the side of the opposite face and in the side of the counter face thereto of the pair of frame members respectively, thus cooling chambers being formed in the pair of frame members respectively. Because of this configuration, the heat generated in the optical modulator due to irradiation of a light beam irradiated from the light source can directly be released to the cooling fluid filled in the cooling chambers provided both in the light beam incident side and in the light beam irradiation side of the optical modulator, so that the optical modulator can efficiently be cooled.

As an opening is provided in correspondence to an image formation region of the optical modulator, so that a cooling fluid filled in each cooling chamber contacts the image formation region of the optical modulator. Because of this feature, temperature distribution in the image formation region of the optical modulator is uniformed with local overheating suppressed, so that a clear optical image can be formed with the optical modulator.

In the optical device according to the present invention, the optical modulator holder preferably comprises a pair of frame members having openings formed corresponding to an image formation region of the optical modulator respectively, and a light-transmissible board provided on either one of the sides of the openings opposite to the sides where the pair of frame members are opposed to each other for closing either one of the sides of the openings opposite to the sides where the pair of frame members are opposed to each other; the optical modulator is held between the pair of frame members for closing the sides of the opening where the pair of frame members are opposed to each other; an inlet port for inletting the cooling fluid into inside thereof and an outlet port for sending out the cooling fluid to the outside thereof are formed in either one of the pair of frame members, both communicating to the plurality of fluid circulating members; and the cooling chamber is formed for sealing the cooling fluid by closing the sides of the opening where the pair of frame members are opposed to each other and the sides of the openings opposite to the sides where the pair of frame members are opposed to each other respectively with the optical modulator and the light-transmissible substrate.

In the present invention, the optical modulator holder comprises a pair of frame members having an opening and a light-transmissible board. By holding the optical modulator between the pair of frame members and providing the light-transmissible member either in the side of the face opposing to the pair of frame members or in the side of the counter face thereto, a cooling chamber is formed in either one of the pair of frame members. Because of this configuration, heat generated in the optical modulator due to irradiation of a light beam irradiated from the light source can directly be released to a cooling fluid filled in the cooling chamber provided either in the light beam incident side or in the light beam irradiation side of the optical modulator, so that the optical modulator can efficiently be cooled.

As the opening is provided in correspondence to an image formation region of the optical modulator, the cooling fluid filled in the cooling chamber contacts the image formation region of the optical modulator. Because of this feature, temperature distribution in the image formation region of the optical modulator is uniformed with local overheating suppressed, so that a clear optical image can be formed with the optical modulator.

In the optical device according to the present invention, preferably, the inlet port and the outlet port are formed in an opposing position in the frame members respectively, and in the vicinity of the inlet port, a rectifying section is formed for making the cooling fluid flow into and extend in the cooling chamber.

In the present invention, the inlet port and the outlet port are formed in an opposing position in the frame members respectively, so that circulation of the cooling fluid in the cooling chamber can be performed smoothly, enabling an even faster circulation speed of the cooling fluid.

Additionally, in the vicinity of the inlet port is formed the rectifying section, so that the cooling fluid flowing into the cooling chamber can be extended therein, preventing the warmed-up cooling fluid from being stagnant in the cooling chamber.

Therefore, the optical modulator can be cooled further effectively by the cooling fluid convecting in the cooling chamber.

In the optical device according to the present invention, preferably, the optical modulator holder has a form corresponding to an image formation region of the optical modulator, comprises a plate-formed member having light transmissibility, and further comprises a cooling chamber dividing section for dividing the cooling chamber into two regions, namely, a light beam incident-side region and a light beam irradiation-side region; and the cooling chamber dividing section is, in the state where placed inside the cooling chamber of the optical modulator holder, formed in a tapering shape in which a cross-sectional area thereof becomes smaller as each side edge of the inlet port side and the outlet port side gets closer to the inlet port side and the outlet port side.

In a case where a pair of cooling chambers is formed in a pair of frame members, the cooling chamber dividing section may have a configuration in which the same is formed in either one of the pair of cooling chambers, or the same is formed in each of the pair of cooling chambers.

In the present invention, the cooling chamber dividing section is placed inside the cooling chamber, so that thickness of a cooling fluid layer contacting with an optical modulator in the cooling chamber is reduced, enabling a faster circulation speed of the cooling fluid. It is thus possible to maintain a temperature difference between the optical modulator and the cooling fluid and to cool the optical modulator with the cooling fluid further effectively.

The cooling chamber dividing section is formed in a tapering shape in which a cross-sectional area thereof becomes smaller as each side edge of the inlet port side and the outlet port side gets closer to the inlet port side and the outlet port side. Because of this configuration, a cooling fluid flowing in from the inlet port can be smoothly convicted toward the light beam incident side and the light beam irradiation side of the cooling chamber dividing section, and also, the cooling fluid convicting toward the light beam incident side and the light beam irradiation side of the cooling chamber dividing section can be smoothly introduced to the outlet port. Thus, compared to the cooling chamber dividing section not having a tapering shape, the cooling chamber dividing section of the present invention can maintain a conviction speed of the cooling fluid contacting with an optical modulator in good condition, and can cool the optical modulator with the cooling fluid effectively.

If the rectifying section described above is formed, for example, in the vicinity of the inlet port and the outlet port, the combination of the cooling chamber dividing section and the rectifying section makes it possible to further obtain a multiplier effect of rectifying the cooling fluid.

In the optical device according to the present invention, preferably, the cooling chamber dividing section has a tapering shape in which a cross-sectional area thereof becomes smaller as the side edge thereof getting closer to the outside, and is formed with a plan-viewed substantially center portion thereof bulging toward the side of the opposing face when placed inside the cooling chamber of the optical modulator holder.

In the present invention, the cooling chamber dividing section has a tapering shape not only in the side edges on the inlet port side and the outlet port side but also in all the other side edges, and is formed with a plan-viewed substantially center portion thereof bulging toward the side of the opposing face, so that thickness of a cooling fluid layer convecting between the optical modulator provided on the opposing face side and the cooling chamber dividing section is further reduced, enabling an even faster circulation speed of the cooling fluid contacting with the optical modulator.

In the optical device of the present invention, preferably, the frame member having the cooling chamber formed therein has at least a pair of recesses with a reduced thickness in the opposing side edge on the rim of the opening; and the cooling chamber dividing section comprises a dividing section body constituting a plate-formed member having light transmissibility, and at least a pair of contact sections each having a form corresponding to the recess; and the cooling chamber dividing section is placed inside the cooling chamber in such a way that the contact section contacts with the recesses of the frame member.

The dividing section body and the contact section may have a configuration in which each of them are formed with a member different from each other and are then integrated, or in which they are monolithically formed with a member of the same kind.

In the present invention, the cooling chamber dividing section is placed inside the cooling chamber in such a way that the contact section formed in the opposing side edge of the dividing section body contacts with the recesses of the frame member. Because of this configuration, the cooling chamber dividing section can be placed in a prespecified position inside the cooling chamber in good condition. Therefore, inside the cooling chamber, the cooling condition of an optical modulator can be maintained in good condition without a change in thickness of a cooling fluid layer contacting with the optical modulator due to displacement of the cooling chamber dividing section.

In the optical device of the present invention, the cooling chamber dividing section is preferably a molded product formed by molding.

In the present invention, the cooling chamber dividing section is a molded product formed by molding, so that a tapering shape can be easily formed and thereby the cooling chamber dividing section can be easily manufactured.

The cooling chamber dividing section is thus formed by molding, so that the contact section located in the opposing side edge of the dividing section body described above can be easily formed.

Additionally, it is easy in the present invention to form a tapering-shaped top end portion in a position at a prespecified distance from the light beam incident side and the light beam irradiation side, allowing a controlled flow volume of a cooling fluid flowing in between an optical modulator and the cooling chamber dividing section.

Further, it is easy in the present invention to form a light beam incident side edge face and/or a light beam irradiation side edge face of the cooling chamber dividing section in a streamlined shape or a non-linear shape, making it possible to discretionally set a circulation state of the cooling fluid in the light beam incident side edge face and/or the light beam irradiation side edge face of the cooling chamber dividing section.

In the optical device of the present invention, preferably, at least one optical converter for converting optical characteristics of an incident light beam is provided; the cooling chamber dividing section is formed by laminating a plurality of plate-formed members; and the optical converter is placed in at least any one space between a pair of adjoining plate-formed members among a plurality of the same.

As the optical converter, for instance, a polarizing plate, a phase contrast plate, a view angle correcting plate or the like may be used.

In the present invention, as an optical converter is provided in at least any one space between a pair of adjoining plate-formed members among a plurality of the same in the cooling chamber dividing section, the heat generated not only in the optical modulator but also in the optical converter by a light beam irradiated from a light source can be released via the plate-formed members to a cooling fluid convecting on the light beam incident side as well as on the light beam irradiation side of the cooling chamber dividing section.

By mounting a phase contrast plate, a view angle correcting plate or the like to an external surface of the pair of light-transmissible boards described above, the optical modulator holder can be integrated with a peripheral optical converter, so that the cooling capability of these optical elements can be improved and the size reduction is also possible.

In the optical modulator holder of the present invention, preferably, at least one optical converter for converting optical characteristics of an incident light beam is provided therein; the optical converter comprises a light-transmissible board and an optical conversion film formed on the light-transmissible board for converting optical characteristics of an incident light beam; and at least any one light-transmissible board of those comprising the optical modulator holder is a light-transmissible board comprising the optical converter.

As the optical converter, for example, a polarizing plate, a phase contrast plate, a view angle correcting plate or the like may be used.

In the present invention, as at least one light-transmissible board of those comprising the optical modulator holder is a light-transmissible board comprising the optical converter, heat generated not only in the optical modulator but also in the optical conversion film by a light beam irradiated from a light source can be released to a cooling fluid convecting in the cooling chamber.

In the optical device of the present invention, preferably, the optical modulator comprises a plurality of the same, the optical modulator holder comprises a plurality of the same corresponding to a plurality of the optical modulators, the upstream side cooling fluid accumulating section comprises a fluid branching section for branching and discharging an accumulated cooling fluid via a plurality of the fluid circulating members for each of a plurality of the optical modulator holders, and the downstream side cooling fluid accumulating section feeds the cooling fluid at once from each optical modulator holder via a plurality of the fluid circulating members.

In the present invention, for example, when heat value generated in each optical modulator varies, cooling fluids having different temperatures flow out from the cooling chamber of each optical modulator holder, and each of the flowing-out cooling fluids is mixed together in the downstream side cooling fluid accumulating section to uniform the temperatures thereof. The cooling fluids each having a uniformed temperature are then branched from the upstream side cooling fluid accumulating section to flow into each optical modulator holder. Because of this configuration, the temperature of the cooling fluids flowing into the cooling chamber of each optical modulator holder is not varied, so that each optical modulator can be cooled by the cooling fluids each having a substantially same temperature.

The optical device of the present invention, preferably, has a plurality of light beam incident sides mounted with a plurality of the optical modulator holders mounted therein, and comprises a color combining optical device for combining and projecting each color light modulated by a plurality of the optical modulators, and the downstream side cooling fluid accumulating section is mounted on either edge face of the edge faces crossing with a plurality of the light beam incident sides of the color combining optical device, while the fluid branching section is mounted on the other edge face of the same.

In the present invention, the optical device comprises the color combining optical device, and the downstream cooling fluid accumulating section is mounted on either edge face of the edge faces crossing with a plurality of the light beam incident sides of the color combining optical device, while the fluid branching section is mounted on the other edge face of the same, so that the optical device can be made to be compact, with the size thereof being reduced.

The optical device of the present invention preferably comprises a flow volume altering section for allowing the flow volume of the cooling fluid circulating in each optical modulator holder to be altered according to the heat value of a plurality of the optical modulators.

As the flow volume altering section, the configuration can be used, for example, in which a valve is provided in a flow path of a cooling fluid, and the flow path is narrowed or widened by changing a position of the valve.

In the present invention, by operating the flow volume altering section, for example, by elevating a flow volume of a cooling fluid for an optical modulator having large heat value, and reducing the flow volume of the cooling fluid for an optical modulator having low heat value, a uniformed temperature of each optical modulator can be easily achieved with a simple configuration and with a high precision. This makes it possible to maintain coloring of an optical image formed in each optical modulator in good condition.

In the optical device of the present invention, preferably, a plurality of the fluid circulating members comprise tube members, and are formed to have the tube members each having a different tube diameter according to the heat value of a plurality of the optical modulators.

In the present invention, for example, by making larger a tube diameter of the fluid circulating member circulating a cooling fluid with respect to an optical modulator having a large heat value, and reducing the tube diameter of the fluid circulating members circulating a cooling fluid with respect to an optical modulator having low heat value, a uniformed temperature of each optical modulator can be easily achieved with a simple configuration. This makes it possible to maintain coloring of an optical image formed in each optical modulator in good condition.

In the optical device of the present invention, preferably, the upstream side cooling fluid accumulating section and the downstream side cooling fluid accumulating section comprise a cooling fluid inflow section connecting to a plurality of the fluid circulating members for making the cooling fluid flow into the inside and a cooling fluid outflow section for making the cooling fluid flow out to the outside; the cooling fluid inflow section and the cooling fluid outflow section have a tubular form capable of circulating the cooling fluid; and one edge face of each of the cooling fluid inflow section and the cooling fluid outflow section protrudes toward the inside of the upstream side cooling fluid accumulating section and the downstream cooling fluid accumulating section.

In the present invention, the upstream side cooling fluid accumulating section and the downstream side cooling fluid accumulating section have a cooling fluid inflow section and a cooling fluid outflow section. One edge face of each of the cooling fluid inflow section and the cooling fluid outflow section protrudes toward the inside of the upstream side cooling fluid accumulating section and the downstream side cooling fluid accumulating section. Because of this configuration, only the cooling fluid accumulated in the inside of the upstream side cooling fluid accumulating section and the downstream side cooling fluid accumulating section can be discharged to the outside without fail. For example, even when the inside of the upstream side cooling fluid accumulating section and the downstream side cooling fluid accumulating section are not fully filled with a cooling fluid, only the cooling fluid can be discharged to the outside without allowing a mixture of air therewith.

Further, in the present invention, not only the cooling fluid outflow section but also the cooling fluid inflow section protrude toward the inside of the upstream side cooling fluid accumulating section and the downstream side cooling fluid accumulating section, so that, when a circulation direction of a cooling fluid is altered, namely, when in the cooling fluid inflow section, a cooling fluid inside is discharged to the outside while in the cooling fluid outflow section, the cooling fluid is flowed into the inside, only the cooling fluid accumulated inside with the cooling fluid inflow section can be discharged to the outside without fail.

The projector of the present invention comprises a light source device, the optical device described above, a projecting optical device for projecting an optical image formed by the optical device in the enlarged state, an exterior casing for accommodating therein the light source device, the optical device and the projecting optical device each in a prespecified position.

In the present invention, the projector comprises the optical device described above, so that the same actions and advantages as those provided by the optical device described above can be provided.

In addition, the projector comprises the optical device described above, so that degradation of the optical modulator due to heat can be prevented, and an operating life of the projector can be prolonged.

In the projector of the present invention, preferably, the optical device is placed in a flow path of the cooling fluid in a plurality of the fluid circulating members flowing from the downstream side cooling fluid accumulating section toward the upstream side cooling fluid accumulating section, and is equipped with a heat release section for releasing heat of the cooling fluid, and the exterior casing has a partition wall formed therein for partitioning the heat release section from the other members.

In the present invention, the optical device is equipped with the heat release section, so that the cooling fluid flowing from the downstream side cooling fluid accumulating section toward the upstream side cooling fluid accumulating section can be cooled, which can lower the temperature of the cooling fluid accumulated in the downstream side cooling fluid accumulating section. Therefore, the cooling fluid having a lowered temperature circulating from the downstream side cooling fluid accumulating section to the cooling chamber of the optical modulator holder can cool the optical modulator further effectively.

In the present invention, the exterior casing has the partition wall formed therein for partitioning the heat release section from the other members, so that heat transferred from the optical modulator via a cooling fluid to the heat release section cannot be transferred to the other members. Thus the present invention can have a configuration in which a temperature rise inside the projector can be prevented.

In the projector of the present invention, preferably, the heat release section comprises a plurality of heat release fins, and a cooling fan is provided inside the partition wall for blowing cooling air onto a plurality of the heat-radiating fins or for sucking up air near a plurality of the heat release fins.

In the present invention, inside the partition wall is provided the cooling fan, so that heat in the heat release section can be cooled effectively, namely, heat-radiating characteristics from a cooling fluid to the heat release section can be improved. Additionally, a temperature rise inside the partition wall can be suppressed, so that the present invention can have a configuration in which a temperature rise inside the projector can be further prevented.

In the projector of the present invention, the heat release section is preferably placed inside the partition wall of the exterior casing along an extending direction of the projecting optical device.

The projecting optical device comprises a coupling lens generally constituting a plurality of lenses combined with each other, and a body tube accommodating the coupling lens. Because of this configuration, inside of the exterior casing has a space in which any member is not accommodated in the vicinity of the projecting optical device.

In the present invention, the heat release section is placed inside the partition wall of the exterior casing along an extending direction of the projecting optical device, so that efficiency of accommodating components inside the projector can be improved, and the size of the projector is not disadvantageously enlarged.

Preferably, the projector of the present invention has a casing for optical components made of heat conductive material for accommodating the optical device in a prespecified position with regard to the projecting optical device; the optical modulator comprising the optical device comprises a plurality of the optical modulators; the optical modulator holder comprising the optical device comprises a plurality of the optical modulator holders corresponding to a plurality of the optical modulators; the optical device has a plurality of light beam incident sides having a plurality of the optical modulator holders mounted therein and is equipped with a color combining optical device for combining and projecting each color light modulated by a plurality of the optical modulators; the upstream side cooling fluid accumulating section comprising the optical device is mounted on either edge face of the edge faces crossing with a plurality of the light beam incident sides of the color combining optical device and comprises a fluid branching section made of heat conductive material for branching and discharging an accumulated cooling fluid via a plurality of the fluid circulating members for each of a plurality of the optical modulator holders; and the fluid branching section is, when the optical device is accommodated in the casing for optical components, connected to the casing for optical components in the manner allowing heat conduction.

In the present invention, the optical device has the color combining optical device, and the downstream side cooling fluid accumulating section is mounted on either edge face of the edge faces crossing with a plurality of the light beam incident sides of the color combining optical device, while the fluid branching section of the upstream side cooling fluid accumulating section is mounted on the other edge face of the same, so that the optical device can be made to be compact, with the size thereof being reduced.

Further, the projector has a casing for optical components made of heat conductive material, and the fluid branching section made of heat conductive material is, when the optical device is accommodated in the casing for optical components, connected to the casing for optical components in the manner allowing heat conduction. Because of this configuration, a heat transfer channel circulating from a cooling fluid via the fluid branching section to the casing for optical components is secured, cooling efficiency of the cooling fluid is improved, and thereby cooling efficiency of each optical modulator by the cooling fluid can be improved.

In the projector of the present invention, preferably, the optical device is placed in a flow path of the cooling fluid in a plurality of the fluid circulating members, press-feeds the cooling fluid via a plurality of the fluid circulating members to the optical modulator holders, and has a fluid press-feeding section for forcefully circulating the cooling fluid, and the fluid press-feeder is placed inside the exterior casing along an extending direction of the projecting optical device.

In the present invention, the optical device has a fluid press-feeding section, so that the cooling fluid warmed up by the optical modulator in the cooling chamber can be discharged to the downstream side cooling fluid accumulating section without fail, while the cooling fluid in the upstream side cooling fluid accumulating section can be flowed into the cooling chamber, enabling a secure exchange of the cooling fluid in the cooling chamber. Thus a large temperature difference between the optical modulator and the cooling fluid is maintained at any time, and cooling efficiency of the optical modulator can be improved.

As described above, inside the exterior casing has a space in which any member is not accommodated in the vicinity of the projecting optical device. In the present invention, the fluid press-feeding section is placed inside the exterior casing along an extending direction of the projecting optical device, so that efficiency of accommodating components inside the projector can be improved, and the size of the projector is not disadvantageously enlarged.

BRIEF DESCRIPTION OF THE DRAWINGS

FIG. 7 is an exploded perspective view showing a general configuration of an optical modulator holder according to the first embodiment;

FIG. 19 is a cross-sectional view illustrating a cooling construction of a liquid crystal panel according to the third embodiment;

FIG. 20 is a view showing an arrangement position of cooling chamber dividing sections according to a fourth embodiment;

FIGS. 21A, 21B, and 21C are views each showing a construction of the cooling chamber dividing sections according to the fourth embodiment;

FIGS. 24A, 24B, and 24C are views each showing a construction of cooling chamber dividing sections according to the fifth embodiment;

DETAILED DESCRIPTION OF PREFERRED EMBODIMENT(S)

First Embodiment

A first embodiment of the present invention is described below with reference to the related drawings.

[Configuration of the Projector]

Figure 1:
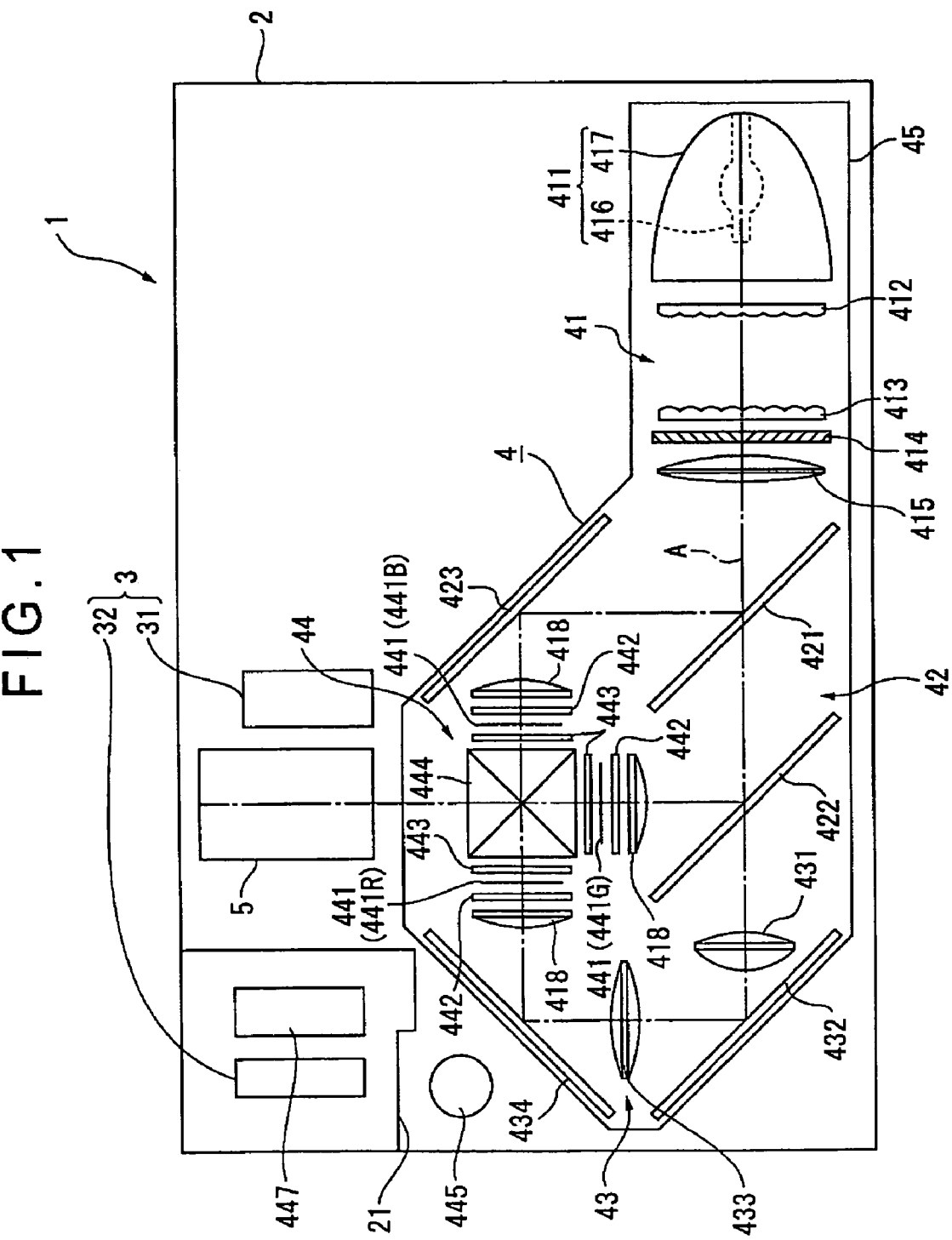
FIG. 1 is a view schematically showing a general configuration of a projector according to each embodiment of the present invention.

FIG. 1 is a view schematically showing the general configuration of a projector 1.

The projector 1 forms an optical image by modulating a light beam irradiated from a light source according to image information, and projects the formed optical image onto a screen in the enlarged state. The projector 1 comprises an exterior case 2 as an exterior casing, a cooling unit 3, an optical unit 4, and a projector lens 5.

In FIG. 1, although not shown, a power block, a lamp driving circuit, and the like are provided in spaces other than those to the cooling unit 3, optical unit 4, and projector lens 5 in the exterior case 2.

The exterior case 2 is made from a synthetic resin or the like, and has a substantially rectangular solid shape with the cooling unit 3, optical unit 4, and projector lens 5 accommodated therein. This exterior case 2 comprises an upper case constituting a ceiling, a front face, a rear face, and side faces of the projector 1 respectively, and a lower case constituting a bottom face, a front face, side faces, and a rear face of the projector 1 respectively, and the upper case and the lower case are fixed to each other with a screw or the like.

A raw material for the exterior case 2 is not limited to a synthetic resin, and other materials may be used, and for instance, the exterior case 2 may be made from a metal.

Although not shown, an air inlet port for introducing cooling air by the cooling unit 3 from outside of the projector 1 (for instance, an air inlet port 22 in FIG. 2) and an air exhaust port for exhausting air warmed up in the projector 1 are provided in the exterior case 2.

Further formed in this exterior case 2 is a partition wall 21 positioned by the projector lens 5 and at a corner section of the exterior case 2 for partitioning a radiator for an optical device described hereinafter in the optical unit 4 from other components.

The cooling unit 3 sends cooling air into a cooling flow path formed inside the projector 1, and cools heat generated in the projector 1. This cooling unit 3 comprises a sirocco fan 31 positioned at the side of the projector lens 5 for introducing cooling air outside the projector 1 from an air inlet port (not shown) and formed in the exterior case 2 and blowing the cooling air onto a liquid crystal panel of the optical device of the optical unit 4 described hereinafter, and an axial flow fan 32 as a cooling fan positioned inside the partition wall 21 formed in the exterior case 2 for introducing cooling air outside the projector 1 from an air inlet port 22 (Refer to FIG. 2) formed in the exterior case 2 and blowing the cooling air to a radiator of the optical unit 4 described hereinafter.

Although not shown in the figures, the cooling unit 3 has, in addition to the sirocco fan 31 and the axial flow fan 32, has a light source for the optical unit 4 described below, a power block, a lamp driving circuit, and the like (not shown).

The optical unit 4 is a unit for forming an optical image (color image) according to image information by optically processing a light beam irradiated from a light source. This optical unit 4 has a substantially L-shaped form extending along a rear face of the exterior case 2 and also extending along a side face of the exterior case 2 as shown in FIG. 1. Configuration of this optical unit 4 is described in detail hereinafter.

The projector lens 5 is a composite lens comprising a plurality of lenses assembled together. This projector lens 5 projects an optical image (color image) formed by the optical unit 4 onto a screen (not shown) in the enlarged state.

[Detailed Configuration of the Optical Unit]

As shown in FIG. 1, the optical unit 4 comprises an integrator illuminating optical system 41, a color separating optical system 42, a relay optical system 43, an optical device 44, and a casing 45 for optical components for accommodating therein the optical components 41 to 44.

The integrator illuminating optical system 41 is an optical system for substantially homogeneously illuminating an image forming region of a liquid crystal panel constituting the optical device 44. This integrator illuminating optical system 41 comprises, as shown in FIG. 1, a light source 411, a first lens array 412, a second lens array 413, a polarization converter 414, and a superposing lens 415.

The light source 411 comprises a light source lamp 416, and a reflector 417 for reflecting irradiated light irradiated from this light source lamp 416. As the light source lamp 416, a halogen lamp, a metal hydride lamp, a high pressure mercury lamp are often used. As the reflector 417, a parabolic mirror is used in FIG. 1, but the present invention is not limited to this configuration, and also the configuration is allowable in which an ellipsoidal mirror is used and a parallelizing concave lens for parallelizing a light beam reflected on the ellipsoidal mirror is employed in the light beam irradiation side.

The first lens array 412 has the configuration in which a plurality of small lenses each having a substantially rectangular contour when viewed from the light axis side are arrayed in the matrix form. Each of the small lenses divides a light beam irradiated from the light source 411 to a plurality of partial light beams.

The second lens array 413 has the substantially same configuration as that of the first lens array 412, in which a plurality of small lenses are arrayed in the matrix form. This second lens array 413 has the function to, with the superposing lens 415, form an image picked up by each of the small lenses in the first lens array 412 on a liquid crystal panel of the optical device 44 described hereinafter.

The polarization converter 414 is provided between the second lens array 413 and the superposing lens 415, and converts light from the second lens array 413 to a substantially one type of polarized light.

More specifically, each of the partial light beams converted to a substantially one type of polarized by the polarization converter 414 is finally superimposed by the superposing lens 415 onto the liquid crystal panel of the optical device 44. As only one type of polarized light can be used in a projector using a liquid crystal panel for modulating polarized light, a substantially half of light irradiated from the light source 411 emitting random polarized light. To cope with this problem, by using the polarization converter 414, the light irradiated from the light source 411 is converted to substantially one type of polarized light to improve the efficiency in utilization of light in the optical device 44.

The color separating optical system 42 comprises, as shown in FIG. 1, two sheets of dichroic mirrors 421, 422, and a reflection mirror 423, and has the function to separate a plurality of light beams irradiated from the integrator illuminating optical system 41 into three color lights of red light, green light, and blue light with the dichroic mirrors 421, 422.

The relay optical system 43 comprises, as shown in FIG. 1, an incident-side lens 431, a relay lens 433, and reflection mirrors 432, 434, and has the function to lead the red light separated by the color separating optical system 42 to a liquid crystal panel for red light of the optical device 44 described hereinafter.

In this step, the dichroic mirror 421 in the color separating optical system 42 reflects the blue light component irradiated from the integrator illuminating optical system 41, while the red light and green light components pass through the dichroic mirror 421. The blue light reflected by the dichroic mirror 421 is reflected on the reflection mirror 423, passes through the a field lens 418, and reaches a liquid crystal panel for blue light of the optical device 44. This field lens 418 converts each of partial light beams irradiated from the second lens array 413 to that parallel to the center line (key light). Also the field lenses 418 provided in the light incident-side of the liquid crystal panels for green light and red light respectively has the same function.

Of the red light and green light passed through the dichroic mirror 421, the green light is reflected by the dichroic mirror 422, passes through the field lens 418, and reaches a liquid crystal panel for green light of the optical device 44. On the other hand, the red light passes through the dichroic mirror 422, and also passes through the relay optical system 43 and field lens 418, and reaches a liquid crystal panel for red light of the optical device 44. It is to be noted that the relay optical system 43 is used for red light because the length of a light pass for the red light is longer than those for other color lights and it is necessary to prevent drop of efficiency in utilization of light due to exhalation of light or for some other reasons. Namely, the relay optical system 43 is used to deliver partial light beam introduced into the incident-side lens 431 as they are to the field lens 418.

As shown in FIG. 1, the optical device 44 comprises three sheets of liquid crystal panels 441 (the liquid crystal panel for red light is indicated by 441R, liquid crystal panel for green light by 441G, and that for blue light by 441B respectively), an incident-side polarization plate 442 and irradiation-side polarization plate 443 as optical converters provided in the light beam incident side and light beam irradiation side of the liquid crystal panel 441, and a cross dichroic prism 444 as a color combining optical device, and these components are formed monolithically.

The optical device 44 (the specific configuration thereof will be described in detail below) comprises, in addition to the liquid crystal panel 441, incident-side polarization plate 442, irradiation-side polarization plate 443, cross dichroic prism 444, a main tank, a fluid press-feeding section, a radiator, a fluid circulating member, a fluid branching section, an optical modulator holder, and a relay tank.

Although not shown in the figure specifically, the liquid crystal panels 441 has the configuration in which liquid crystal panel as a electrochemical substance is sealed in a pair of transparent glass substrate, and the orientation of the liquid crystal panel is controlled according to a drive signal outputted from a control unit (not shown), and also the liquid crystal panel 441 modulates a polarizing direction of a polarized flight beam irradiated from the incident-side polarization plate 442.

The incident-side polarization plate 442 receives lights having various colors with the polarizing direction aligned to the substantially same direction by the polarization converter 414, and allows passage therethrough, of the irradiated light beams, only polarized light having the substantially same direction as the polarization axis of the flight beam aligned by the polarization converter 414, and absorbs other light beams. The incident-side polarization plate 442 has the configuration in which a polarization film as an optically converting film is adhered to a light-transmissible substrate such as sapphire glass or crystalline quartz.

The irradiation-side polarization plate 443 has the substantially same configuration as that of the incident-side polarization plate 442, and allows passage throughthere, of the light beams irradiated from the liquid crystal panels 441, only light beams having the polarization axis perpendicular to the light beam transmission axis of the incident-side polarization plate 442, and absorbs other light beams.

The cross dichroic prism 444 is an optical element for forming a color image by combining an optical image modulated for each of color lights irradiated from the irradiation-side polarization plate 443. The cross dichroic prism 444 has a substantially square form when viewed from the top in which four right angle prisms are adhered to each other, and two dielectric multilayered films are formed on an interface between the right angle prisms. These dielectric multilayered films reflect color lights irradiated from the liquid crystal panels 441R, 441B and having passed through the irradiation-side polarization plate 443, and allows passage therethrough of color lights irradiated from the liquid crystal panel 441G and having passed through the irradiation-side polarization plate 443. Thus the color lights modulated by the liquid crystal panels 441R, 441G, and 441B are combined to form a color image.

Figure 2:
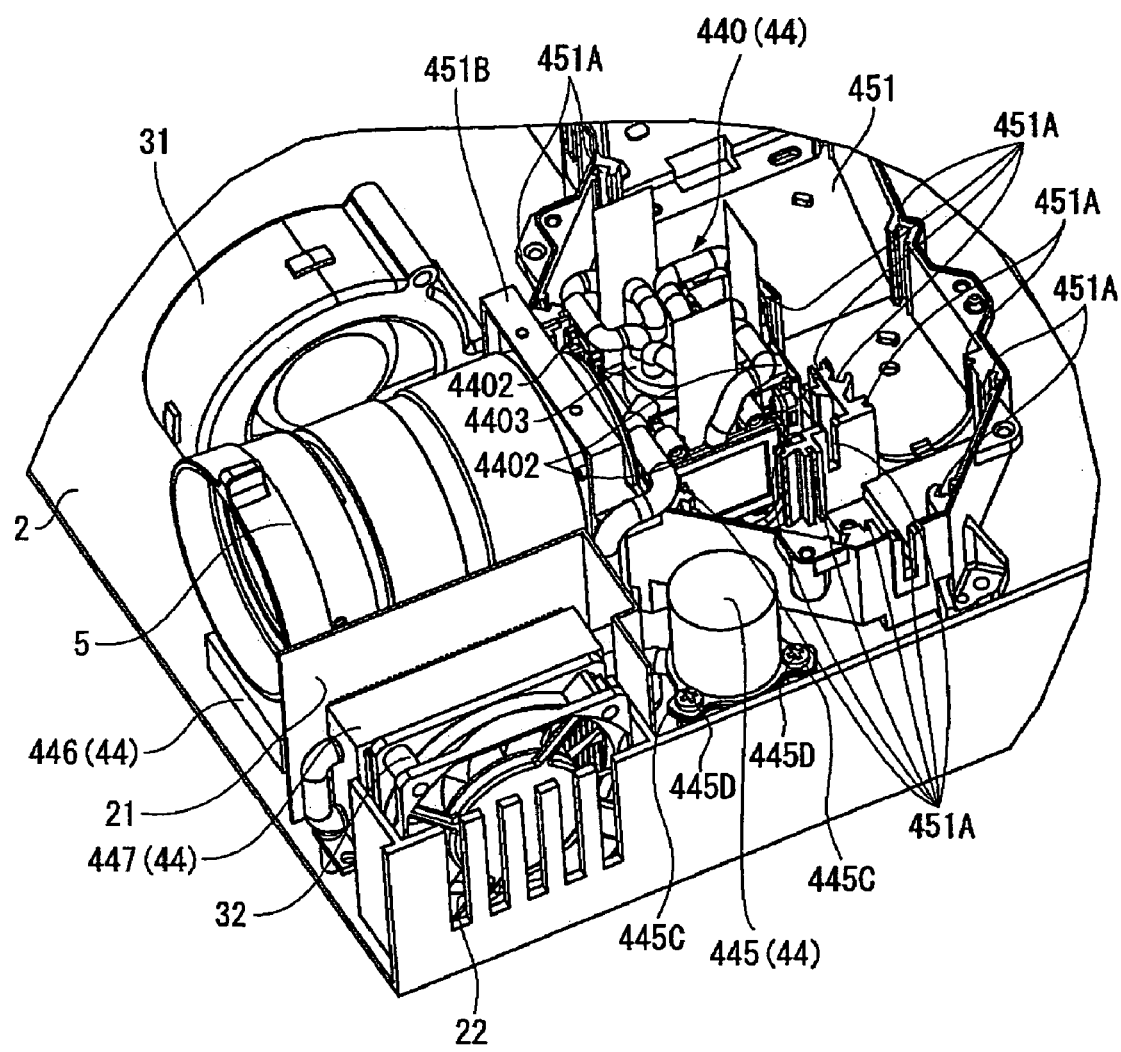
FIG. 2 is a perspective view of a portion inside of the projector viewed from the top side according to a first embodiment.

FIG. 2 is a perspective view showing a portion of inside of the projector 1 viewed from above. In FIG. 2, to simplify the description, of the optical components provided within the casing 45 for optical components, only a main body of optical device of the optical device 44 is described, and other optical components 41 to 43 are not shown.

Figure 3:
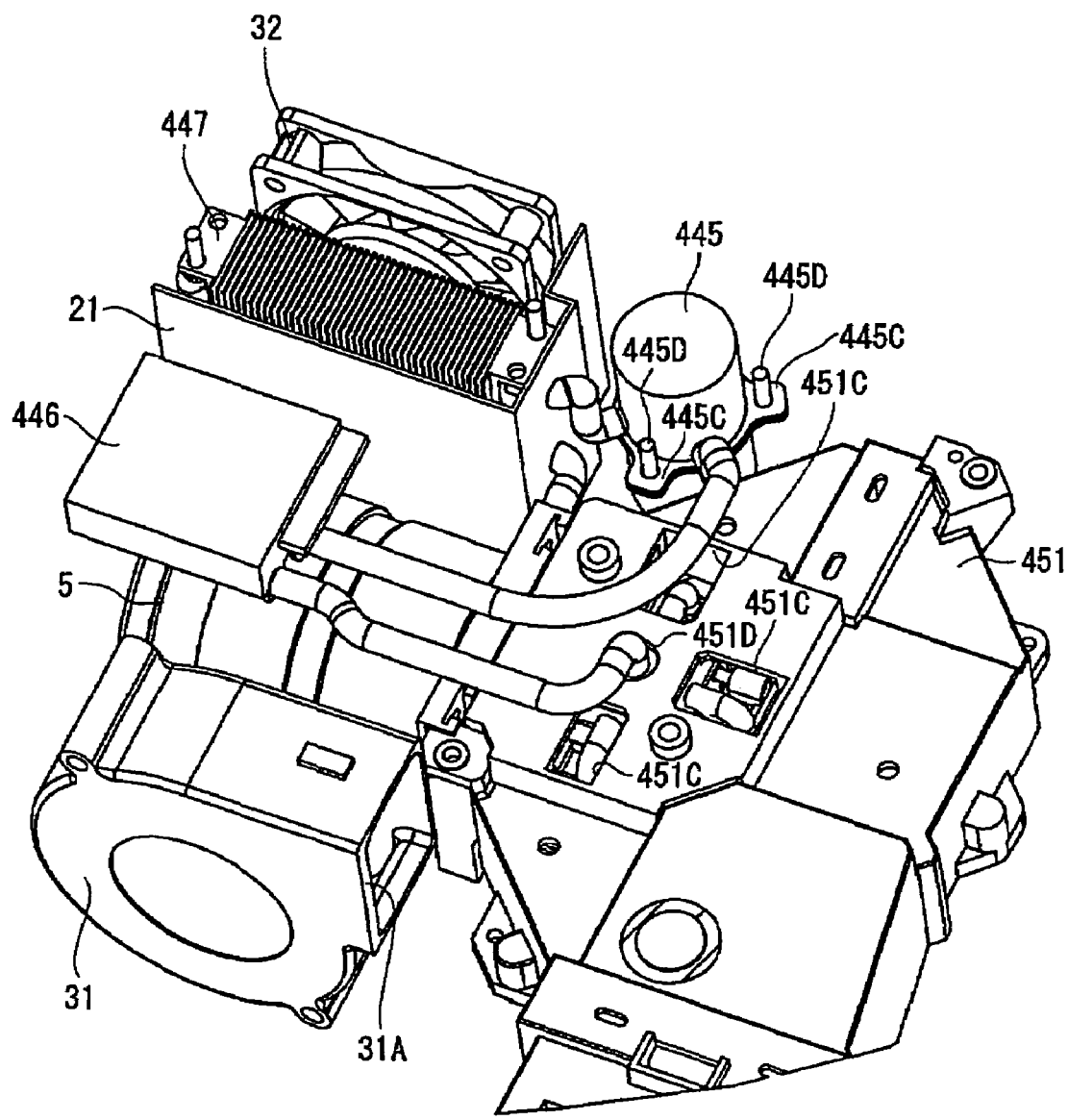
FIG. 3 is a perspective view of a portion inside of the projector viewed from the bottom side according to the first embodiment.

FIG. 3 is a perspective view showing a portion of inside of the projector 1 viewed from the bottom.

The casing 45 for optical component comprises, for instance, a metallic component, and a specified illumination optical axis A is set therein as shown in FIG. 1, and the optical components 41 to 43 and an optical device main body of the optical device 44 described hereinafter are accommodated therein at prespecified positions against the illumination optical axis A. The casing 45 for optical components is not always required to be formed with a metallic material, and other material may be used for forming the casing 45 on the condition that the material is thermally conductive. The casing 45 for optical components comprises, as shown in FIG. 2, a vessel-shaped component accommodation member 451 for accommodating therein the optical components 41 to 43 and an optical device main body described later of the optical device 44, and a cover member (not shown) for closing an opening of the component accommodation member 451.

Of these components, the component accommodation member 451 constitutes a bottom face, a front face, and side faces of the casing 45 for optical components.

In this component accommodation member 451, grooves 451A are formed on the internal side faces, and the optical components 412 to 415, 418, 421 to 423, 431 to 434 are set therein in slidable manner from the above as shown in FIG. 2.

As shown in FIG. 2, in a front portion of the side face, a projector lens installing section 451B for installing the projector lens 5 at a prespecified position against the optical unit 4 is formed. This projector lens installing section 451B has a substantially rectangular shape when viewed from the top, and a circular hole (not shown) is formed at a position corresponding to a light beam irradiating position from the optical device 44 in the substantially central portion thereof when viewed from the top, and the color image formed by the optical unit 4 is projected by the projector lens 5 through the hole in the enlarged state.

In the component accommodation member 451, three holes 451C each formed at a position corresponding to the position of the liquid crystal panels 441 of the optical device 44, and a hole 451D formed in correspondence to a cooling fluid flow-in section of a fluid branching section of the optical device 44 described below are formed on the bottom face thereof as shown in FIG. 3. Herein cooling air introduced by the sirocco fan 31 of the cooling unit 3 from the outside of the projector 1 into inside thereof is discharged from the discharging outlet port 31A (Refer to FIG. 3) of the sirocco fan 31 and is led via a dust (not shown) to the holes 451C.

[Configuration of the Optical Device]

Figure 4:
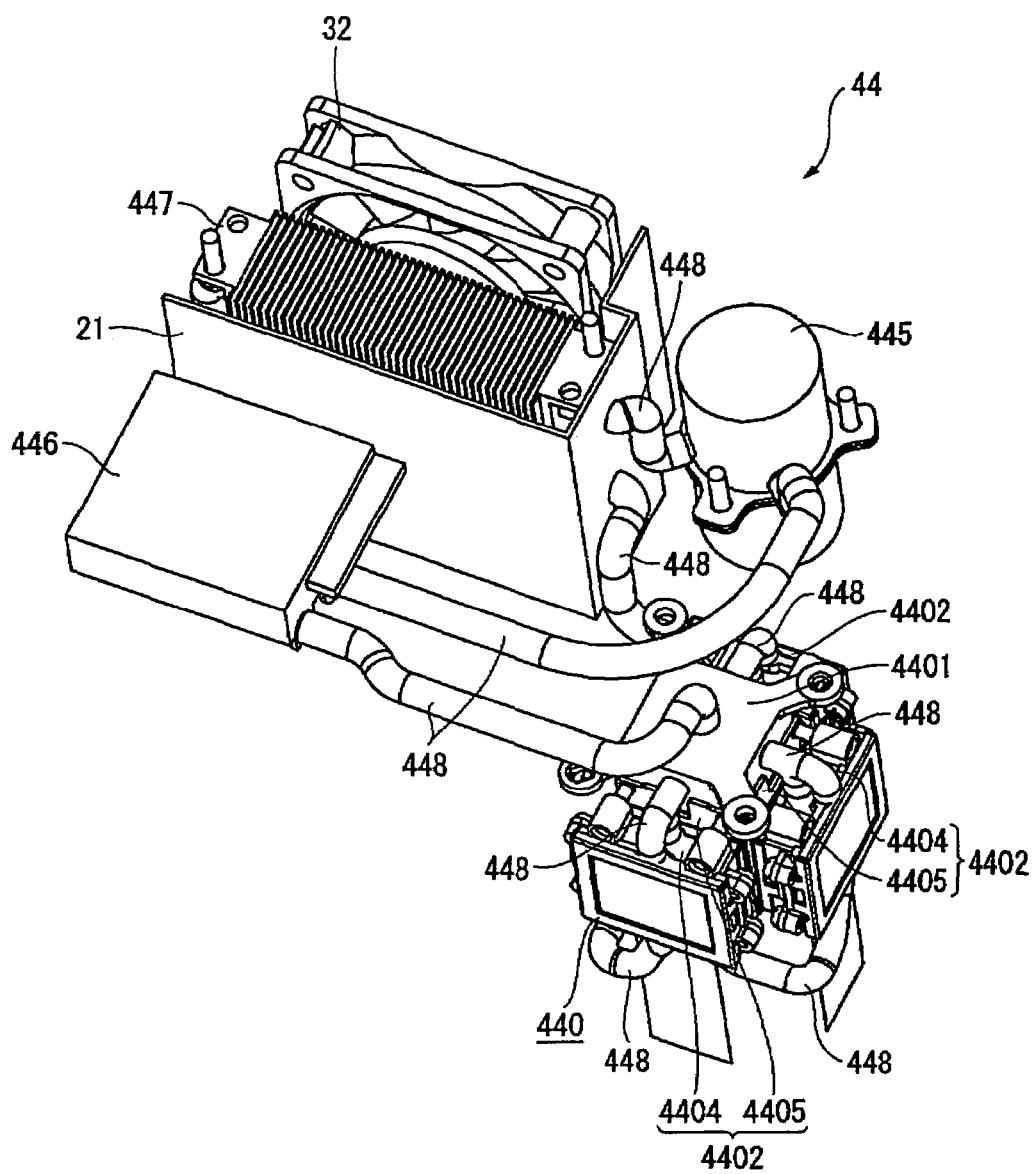
FIG. 4 is a perspective view of an optical device viewed from the bottom side according to the first embodiment.

FIG. 4 is a perspective view showing the optical device 44 viewed from the bottom side.

The optical device 44 comprises, as shown in FIG. 2 through FIG. 4, an optical device main body 440 in which the liquid crystal panels 441, incident-side polarization plate 442, irradiation-side polarization plate 443, and cross dichroic prism 444 are integrated with each other, a main tank 445, a fluid press-feeding section 446, a radiator 447 as a radiation section, and a plurality of fluid circulating members 448.

Each of the plurality of fluid circulating members 448 has an aluminum-made tubular member enabling circulation of a cooling fluid therein, and the components 440, 445 to 447 are connected so that the cooling fluid can circulate therein. The circulating cooling fluid removes the heat generated in the liquid crystal panels 441, incident-side polarization plate 442, and irradiation-side polarization plate 443 each constituting the optical device main body 440.

In this embodiment, as the cooling fluid, ethylene glycol, which is a transparent non-volatile liquid, is employed. The cooling fluid is not limited to ethylene glycol, and other liquids may be employed.

The components 440, 445 to 447 are described one by one along the flow path of the circulating cooling fluid from the upstream side against the liquid crystal panels 441.

[Structure of the Main Tank]

Figure 5A:
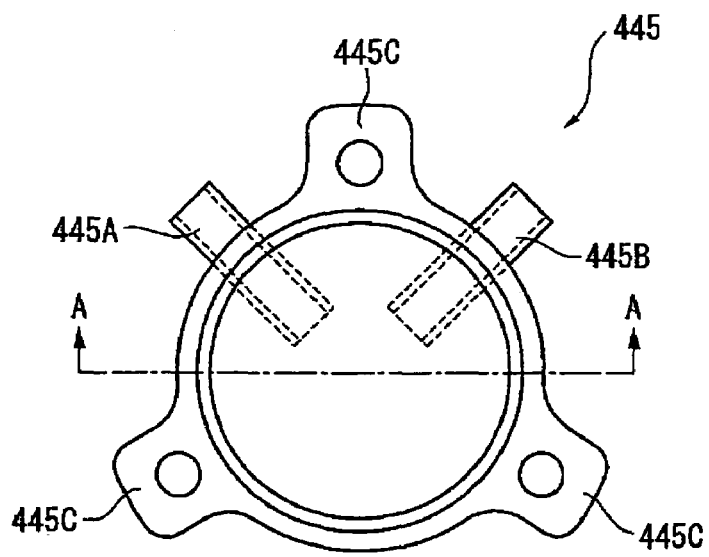
FIG. 5A and FIG. 5B are views each showing a construction of a main tank according to the first embodiment.
Figure 5B:
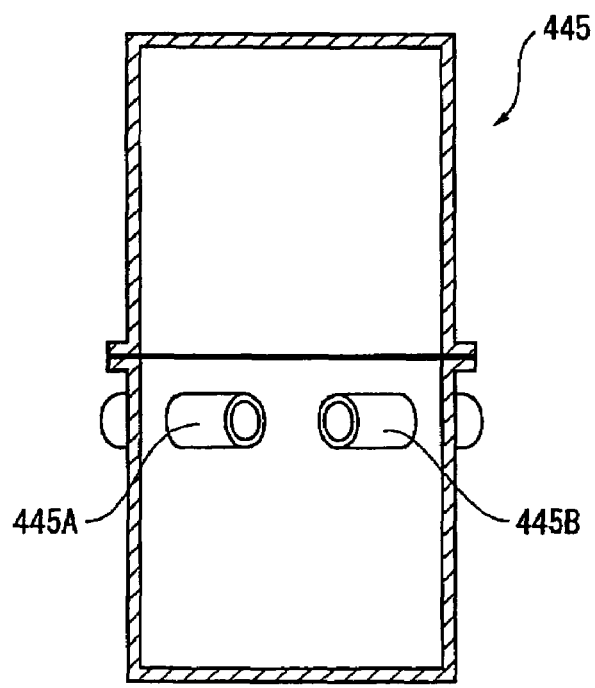

FIG. 5A and FIG. 5B are views each showing a structure of the main tank 445. More specifically, FIG. 5A is a flat view showing the main tank 445 viewed from the top side. FIG. 5B is a cross-sectional view taken along the line A—A in FIG. 5A.

The main tank 445 has a substantially circular form and comprises two vessel-shaped components each made from aluminum, and openings of the two vessel-shaped components are connected to each other to temporally store a cooling fluid therein. These vessel-shaped components are connected to each other by means of seal welding or with an elastic member such as rubber therebetween.

As shown in FIG. 5B, in this main tank 445, a cooling fluid inflow section 445A for inletting a cooling fluid into inside thereof and a cooling fluid outflow section 445B for leading the cooling fluid therein to the outside are formed at a substantially central portion in the column axial direction.

Each of these cooling fluid inflow sections 445A and cooling fluid outflow section 445B is formed with a substantially tubular member having a tube diameter smaller as compared to that of the fluid circulating member 448, and is arranged so that the components extrude from inside and outside of the main tank 445. An edge of the cooling fluid inflow section 445A protruding toward the outside is connected to an edge of the fluid circulating members 448, and a cooling fluid from the outside flows into the main tank 445 via the fluid circulating members 448. Further also an edge of the cooling fluid outflow section 445B protruding toward outside is connected to an edge of the fluid circulating members 448, and a cooling fluid inside the optical device 44 flows out to the outside thereof via the fluid circulating members 448.

The other edges protruding inward of the cooling fluid inflow section 445A and cooling fluid outflow section 445B extend toward the column shaft of the main tank 445 as shown in FIG. 5A, and are arranged respectively so that the edges are perpendicular to each other when from the top. With the configuration as described above, the cooling fluid flowing into the main tank 445 via the cooling fluid inflow section 445A can be prevented from immediately flowing out to the outside via the cooling fluid outflow section 445B, and the cooling fluid flowing in and that in the main tank 445 are mixed with each other to uniform a temperature of the cooling fluid.

Further as shown in FIG. 5A, three fixing sections 445C are formed each at a substantially central portion of the column-axial direction on the external peripheral surface of the main tank 445 in each of the two vessel-formed members respectively, and by inserting a screw 445D into each of the fixing sections 445C (as shown in FIG. 2 and FIG. 3) and screwing the fixing sections to the two bottom faces of the casing, the two vessel-formed members are connected to each other, and also the main tank 445 is fixed to the exterior case 2.

This main tank 445 is provided in a region having a triangular form when viewed from the top and formed with the casing 45 for optical components and inner fade faces of the exterior case 2. By providing the main tank 445 in this region, the accommodating efficiency in the exterior case 2 can be improved, so that size increase of the projector 1 can be prevented.

[Structure of a Fluid Press-Feeding Section]

The fluid press-feeding section 446 feeds the accumulated cooling fluid into the main tank 445 and also forcefully feeds out the fed cooling fluid to outside of the main tank 445. For this purpose, as shown in FIG. 4, the fluid press-feeding section 446 is communicated to the other edge of the cooling fluid circulating member 448 connected to the cooling fluid outflow section 445B of the main tank 445, and is also communicated to an edge of the other cooling fluid circulating member 448 for sending out the cooling fluid to the outside.

This fluid press-feeding section 446 has, although not specifically shown in the figure, the configuration in which a vane wheel is provided inside an aluminum-made hollow member having a substantially rectangular form, and when the vane wheel rotates under the control by a control unit (not shown), the accumulated cooling fluid is forcefully fed into the main tank 445 via the cooling fluid circulating member 448 and also the cooling fluid fed is forcefully fed out to the outside of the main tank 445 via the cooling fluid circulating member 448. With the configuration as described above, the thickness of the fluid press-feeding section 446 in the rotational axis of the vane wheel can be reduced, and the fluid press-feeding section 446 can be placed at an empty space of the projector 1. In this embodiment, as shown in FIG. 2 or FIG. 3, the fluid press-feeding section 446 is provided under the projector lens 5.

[Configuration of the Optical Device Main Body]

The optical device main body 440 comprises, in addition to the three liquid crystal panels 441, three incident-side polarization plates 442, three irradiation-size polarization plates 443, and cross dichroic prism 444, a fluid branching section 4401 (Refer to FIG. 4), three optical modulator holders 4402, and a relay tank 4403 as an accumulating section of the cooling fluid on the downstream side (Refer to FIG. 2).

[Structure of the Fluid Branching Section]

Figure 6A:
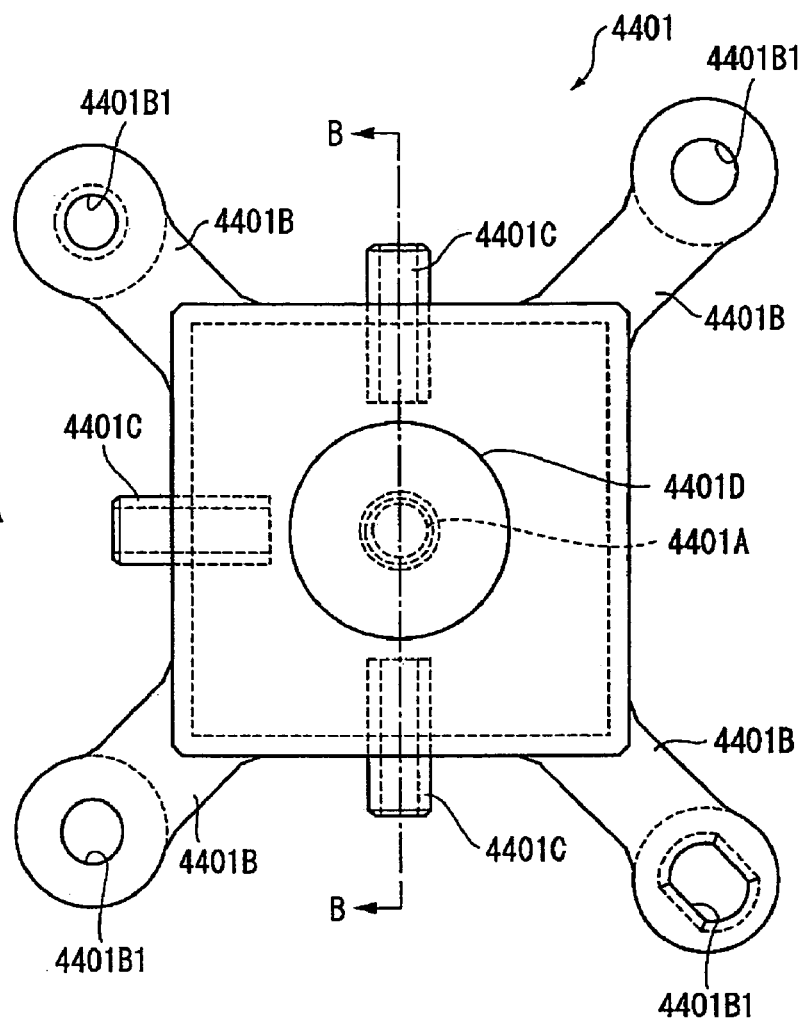
FIG. 6A and FIG. 6B are views each showing a construction of a fluid branching section according to the first embodiment.
Figure 6B:
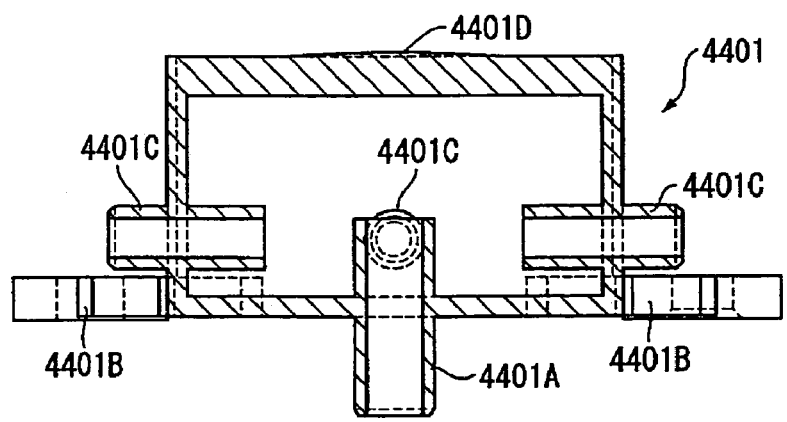

FIG. 6A and FIG.6B are views each showing structure of he fluid branching section 4401. More specifically, FIG. 6A is a flat view showing the fluid branching section 4401 viewed from the top. FIG. 6B is a cross-sectional view taken along the line B—B in FIG. 6A.

The fluid branching section 4401 comprises an aluminum-made hollow member having a substantially rectangular form, and feeds the cooling fluid forcefully sent out from the fluid press-feeding section 446 and branches the fed-in cooling fluid to each of the three optical modulator holders 4402 to sent it out. Further this fluid branching section 4401 is fixed to a lower face which is an edge face of the cross dichroic prism 444 crossing three light-beam incident side thereof, so that the fluid branching section 4401 has also the function as a prism fixing plate for supporting the cross dichroic prism 444.

In this fluid branching section 4401, as shown as in FIG. 6B, a cooling fluid inflow section 4401A for inletting the cooling fluid press-fed from the fluid press-feeding section 446 into inside thereof is formed at a substantially central portion of the bottom face. This cooling fluid inflow section 4401A comprises a substantially tubular member having a diameter smaller as compared to that of the cooling fluid circulating member 448 like the cooling fluid inflow section cooling fluid inflow section 445A of the main tank 445, and protrude to both inside and outside of the fluid branching section 4401. An edge of the cooling fluid inflow section 4401A protruding outward is connected to the other edge of the cooling fluid circulating member 448 communicated to the fluid press-feeding section 446, and the cooling fluid press-fed from the fluid press-feeding section 446 via the cooling fluid circulating member 448 flows via the edge into inside of the fluid branching section 4401.

Also arm sections 4401B each extending along the bottom face are formed at four corners of the bottom face respectively as shown in FIG. 6A. A hole 4401B1 is formed at a tip portion of the arm section 4401B, and by inserting screws (not shown) into the holes 4401B1 and screwing the arm sections 4401B to the component accommodation member 451 of the casing 45 for optical components, the optical device main body 440 is fixed to the component accommodation member 451 (Refer to FIG. 11). In this step, the fluid branching section 4401 and the casing 45 for optical components are connected to each other in the thermally conductive state.

In this fluid branching section 4401, a cooling fluid outflow section 4401C for branching and sending the fed-in cooling fluid to each of three optical modulator holders 4402 is formed, as shown in FIG. 6A, on each of three side faces corresponding to a light beam incident side of the cross dichroic prism 444.

The cooling fluid outflow section 4401C comprises a substantially tubular member having a diameter smaller as compared to that of the cooling fluid circulating member 448 like in the cooling fluid inflow section 4401A, and protrudes to both inside and outside of the fluid branching section 4401. An edge of the cooling fluid circulating member 448 is connected to an edge of each cooling fluid outflow section 4401C protruding outward, and the cooling fluid inside the fluid branching section 4401 flows out to the outside via the cooling fluid circulating member 448.

Further in this fluid branching section 4401, a spherical expanding portion 4401D is formed at a substantially central portion of the upper face as shown in FIG. 6A and FIG. 6B. By contacting a bottom face of the cross dichroic prism 444 to this expanding portion 4401D, a position of the cross dichroic prism 444 in the driving direction against the fluid branching section 4401 can be adjusted.

The main tank 445 and the fluid branching section 4401 corresponds to the upstream side cooling fluid accumulating section, while the main tank 445, fluid branching section 4401, and relay tank 4403 correspond to the cooling fluid accumulating section according to the present invention.

[Construction of the Optical Modulator Holder]

Three optical modulator holder 4402 hold three liquid crystal panels 441, three incident-side polarization plates 442, and three irradiation-side polarization plates 443 respectively, and a cooling fluid flows in and out of the inside of each of the thee optical modulator holders 4402 to cool the three liquid crystal panels 441, three incident-side polarization plates 442, and three irradiation-side polarization plates 443 with the cooling fluid respectively. Each of the three optical modulator holders 4402 has the same configuration, and only one of the optical modulator holders 4402 is described below. The optical modulator holder 4402 comprises an optical modulator holder main body 4404 and a support member 4405 as shown in FIG. 4.

FIG. 7 is a developed perspective view showing general configuration of the optical modulator holder main body 4404.

The optical modulator holder main body 4404 comprises, as shown in FIG. 7, a pair of frame members 4404A, 4404B, four elastic members 4404C, and a pair of polarization plate fixing members 4404D, 4404E.

The frame body 4404A is an aluminum-made frame body having a rectangular opening 4404A1 corresponding to an image formation region on the liquid crystal panel 441 formed at the substantially central portion thereof and also having a rectangular form when viewed from the top, and is set in the light beam incident side against the frame member 4404B and supports an edge face of the liquid crystal panel 441 in the light beam incident side and also support an edge face of the incident-side polarization plate 442 in the light beam irradiation side.

Figure 8:
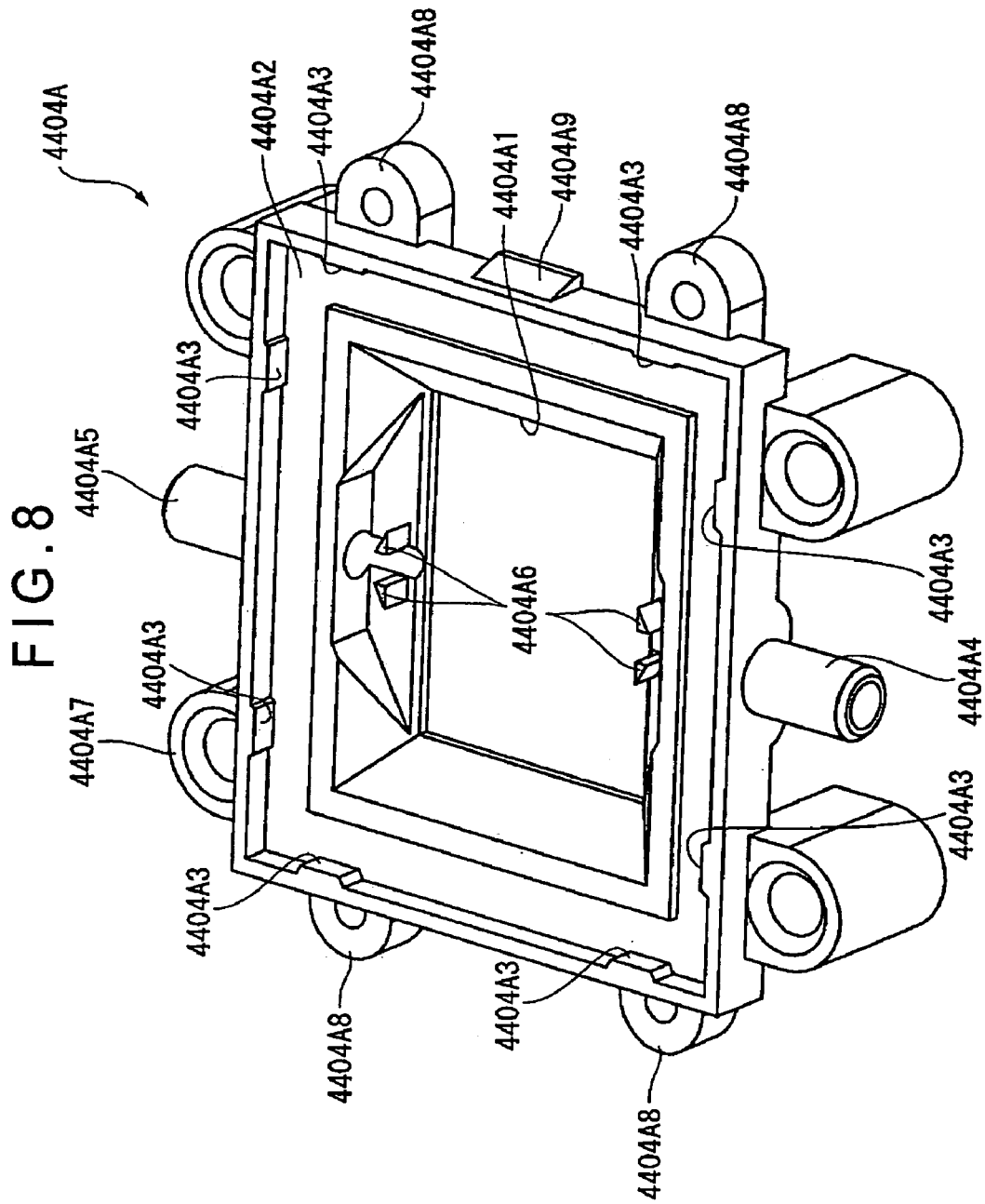
FIG. 8 is a perspective view of a frame member viewed from the light beam incident side according to the first embodiment.

FIG. 8 is a perspective view showing the frame body 4404A viewed from the light beam incident side.

In this frame body 4404A, a recess 4404A2 having a rectangular frame-shaped form corresponding to a form of the elastic member 4404C is formed on the light beam incident side edge face thereof as shown in FIG. 8, and this recess 4404A2 supports the incident-side polarization plate 442 via the elastic member 4404C. Further, the frame member 4404A supports an edge face of the incident-side polarization plate 442 in the light beam irradiation side, so that the light beam incident side of the opening 4404A1 is closed with the elastic member 4404C and the edge face of the incident-side polarization plate 442 in the light beam irradiation side. Further a plurality of hooking projections 4404A3 are formed on the external peripheral surface of this recess 4404A2, and the external side face of the elastic member 4404C contacts the hooking projections 4404A3, so that the elastic member 4404C is positioned and set in the recess 4404A2.

Also formed on the edge face of the frame member 4404A in the light beam irradiation side is a recess 4404A2 having a rectangular frame-shaped form corresponding to the form of the elastic member 4404C like on the edge face thereof in the light beam incident side as shown in FIG. 7, and this recess 4404A2 supports an edge face of the liquid crystal panel 441 in the light beam incident side via the elastic member 4404C. This frame member 4404A supports an edge face of the liquid crystal panel 441 in the light beam incident side, so that the light beam irradiation side of the opening 4404A1 is closed with the elastic member 4404C and the edge face of the liquid crystal panel 441 in the light beam incident side. Also formed on the edge face thereof in the light beam irradiation side are hooking projections 4404A3 on the external peripheral surface of the recess 4404A2.

As described above, when the light beam incident side of the opening 4404A1 is closed with the liquid crystal panel 441 and the incident-side polarization plate 442, a cooling chamber R1 capable of sealing a cooling fluid in the frame member 4404A (Refer to FIG. 11) is formed.

Further in this frame member 4404A, at the substantially central portion in the lower edge section thereof, an inlet port 4404A4 for inletting the cooling fluid flowing out of the cooling fluid outflow section 4401C of the fluid branching section 4401 is formed as shown in FIG. 8. This inlet port 4404A4 comprises a substantially cylindrical member having a diameter smaller as compared to that of the fluid circulating member 448, and protrudes outward from the frame member 4404A. Connected to the protruding edge of this inlet port 4404A4 is the other edge of the fluid circulating member 448 with an edge thereof connected to the cooling fluid outflow section 4401C of the fluid branching section 4401, so that the cooling fluid flowing out from the fluid branching section 4401 via the fluid circulating member 448 flows into the cooling chamber R1 of the frame member 4404A (Refer to FIG. 11).

Further in this frame member 4404A, formed at the substantially central portion in the upper edge section is an outlet port 4404A5 for sending out the cooling fluid in the cooling chamber R1 (Refer to FIG. 11) of the frame member 4404A to the outside as shown in FIG. 8. Namely, the outlet port 4404A5 is formed at a position opposing to the inlet port 4404A4. This outlet port 4404A5 comprises, like the inlet port 4404A4, a substantially cylindrical member having a diameter smaller as compared to that of the fluid circulating member 448 and protrudes outward from the frame member 4404A. The fluid circulating member 448 is connected to a protruding edge of the outlet port 4404A5, so that the cooling fluid in the cooling chamber R1 (Refer to FIG. 11) is sent out via the fluid circulating member 448 to the outside.

In the periphery of the opening 4404A1, a recess recessing toward the light beam irradiation side is formed at a position near the portion communicated to the inlet port 4404A4 and the outlet port 4404A5 as shown in FIG. 8, and an external side face of the recess is tapered toward the portion described above.

Two rectifying sections 4404A6 are provided in the upright state on a bottom face of the recess. These rectifying sections 4404A6 have a cross section having a form like a substantially right-angled triangle and are provided with a prespecified space therebetween, and are also provided so that hypotenuses of the substantially right-angled triangles extend each other away toward the portion.

Further in the frame member 4404A, formed at the corner portion in the upper edge section and at the corner portion in the lower edge section are four insert sections 4404A7 each enabling insertion of a pin-shaped member of the support member 4405 described below as shown in FIG. 8.

Further in this frame member 4404A, as shown in FIG. 8, formed at a corner portion in the left edge section and at a corner portion in the right edge section is a connecting section 4404A8 for connection to the frame member 4404B as shown in FIG. 8.

Further in this frame member 4404A, formed at the substantially central portion of the left edge section and at the substantially central portion in the right edge section are hooks 4404A9 for the polarization plate fixing section 4404D to be engaged therein.

The frame member 4404B comprises an aluminum-made member, and holds the liquid crystal panel 441 together with the frame member 4404A via the elastic member 4404C therebetween, and also supports the irradiation-side polarization plate 443 via the elastic member 4404C with a face opposing to the frame member 4404A and a counter face thereto, and the specific configuration is the substantially same as that of the frame member 4404A described above. Namely formed in this frame member 4404B are an opening 4404B1, a recess 4404B2, a hooking projection 4404B3, an inlet port 4404B4, an outlet port 4404B5, a rectifying section 4404B6, a connecting section 4404B8, and a hook 4404B9 similar to the opening 4404A1 of the frame member 4404A, recess 4404A2, hooking projection 4404A3, inlet port 4404A4, outlet port 4404A5, rectifying section 4404A6, connecting section 4404A8, and hook 4404A9 respectively.

The fluid circulating members 448 for connecting the inlet ports 4404A4 and 4404B4 of the cooling fluid outflow section 4401C of the fluid branching section 4401 and the frame members 4404A, 4404B to each other have a form with the other edge branching to two ways as shown in FIG. 4. Namely, the cooling fluid flowing out from the cooling fluid outflow section 4401C of the fluid branching section 4401 is branched to two ways via the fluid circulating members 448 and flows into the cooling chambers R1, R2 (Refer to FIG. 11) of the frame members 4404A, 4404B.

When screws 4404F are set in the connecting sections 4404A8, 4404B8 of the frame members 4404A, 4404B, the liquid crystal panel 441 is held between the frame members 4404A, 4404B via the elastic member 4404C, and opposite faces of the openings 4404A1, 4404B1 of the frame members 4404A, 4404B are sealed.

The elastic members 4404C are provided between the incident-side polarization plate 442 and frame member 4404A, between the frame member 4404A and liquid crystal panel 441, between the liquid crystal panel 441 and frame member 4404B, and between the frame member 4404B and irradiation-side polarization plate 443 respectively to seal the cooling chambers R1, R2 (Refer to FIG. 11) of the frame members 4404A, 4404B for preventing leakage of a cooling fluid and the like. This elastic member 4404C is made from silicon rubber, and one or both surfaces thereof are subjected to surface processing for raising the bridging density in the top layer. As a material for the elastic member 4404C, products belonging to the Thercon Series (trade name owned by Fuji Polymer Industries CO. Ltd.) may be used. As the edge face is subjected to the surface processing, the elastic members 4404C can easily be set in the recesses 4404A2, 4404B2 of the frame members 4404A, 4404B.

The elastic member 4404C may be made from such a material as butyl rubber or fluorine rubber each with low water-permeability.

The polarization plate fixing members 4404D, 4404E press-ft the incident-side polarization plate 442 and irradiation-side polarization plate 443 via the elastic members 4404C to the recesses 4404A2 and 4404B2 of the frame members 4404A, 4404B respectively. These polarization plate fixing members 4404D, 4404E each comprise frame bodies each having a substantially rectangular form when viewed from the top and also having the openings 4404D1, 4404E1 at the substantially central portions respectively, and the peripheries of the openings 4404D1, 4404E1 press the incident-side polarization plate 442 and irradiation-side polarization plate 443 to the frame members 4404A, 4404B respectively. Further these polarization plate fixing members 4404D, 4404E have hooking engagement sections 4404D2, 4404E2 formed along the right and left edges, and when the hooking engagement sections 4404D2, 4404E2 are engaged with the hooks 4404A9, 4404B9 of the frame members 4404A, 4404B, the polarization plate fixing members 4404D, 4404E press and fix the incident-side polarization plate 442 and irradiation-side polarization plate 443 to the frame members 4404A, 4404B.

The support member 4405 comprises a plate body having a frame-shaped body having a rectangular form when viewed from the top and also having an opening (not shown) and formed at the substantially central portion.

In this support member 4405, formed at positions corresponding to four insert sections 4404A7 of the optical modulator holder main body 4404 are pin-shaped members 4405A (Refer to FIG. 11) protruding from the plate body.

When the pin-shaped members 4405A (Refer to FIG. 11) are inserted into the four insert sections 4404A7 of the optical modulator holder main body 4404, the support member 4405 supports the optical modulator holder main body 4404, and when the edge face of the plate body in the light beam irradiation side is adhered to and fixed to an light beam incident side of the cross dichroic prism 444, the optical modulator holder 4402 is integrated with the cross dichroic prism 444.

[Structure of the Relay Tank]

Figure 9A:
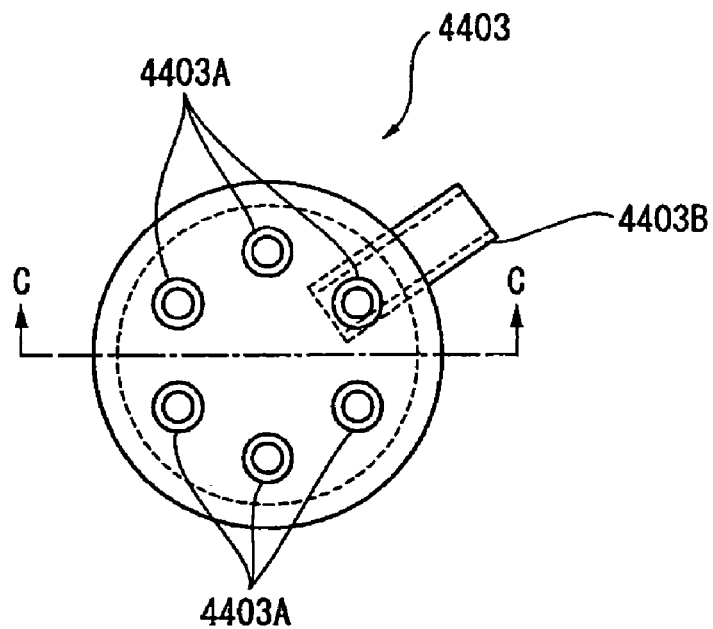
FIG. 9A and FIG. 9B are views each showing a construction of a relay tank according to the first embodiment.
Figure 9B:
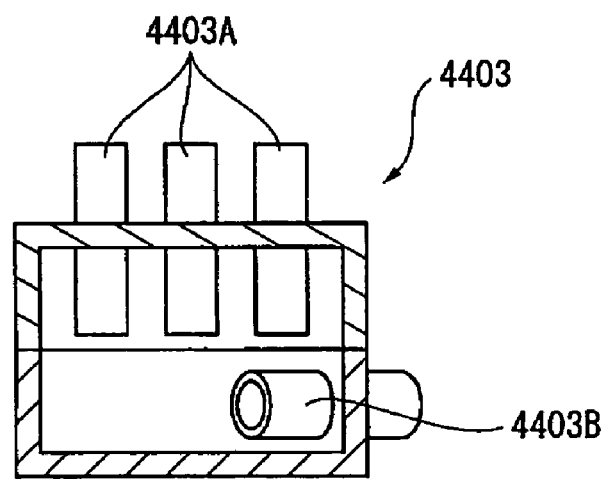

FIG. 9A and FIG. 9B are views each showing the structure of the relay tank 4403. More specifically, FIG. 9A is a flat view showing the relay tank 4403 viewed from the top. FIG. 9B is a cross-sectional view taken along the line C—C in FIG. 9A.

The relay tank 4403 comprises an aluminum-made hollow and substantially column-shaped body, and is fixed on the upper face which is an edge face where the three light beam incident sides of the cross dichroic prism 444 cross each other. This relay tank 4403 receives the cooling fluid fed from the optical modulator holders 4402 in batch, and sends out the received cooling fluid to the outside.

In this relay tank 4403, formed on the top face are 6 cooling fluid inflow sections 4403A for inletting the cooling fluid sent out from the frame members 4404A, 4404B of each optical modulator holder 4402 therein as shown in FIG. 9A and FIG. 9B. Each of the cooling fluid inflow sections 4403A comprises a substantially cylindrical member having a smaller diameter as compared to that of the fluid circulating members 448, and protrudes into the relay tank 4403 and also outward therefrom. To the edges protruding outward of the cooling fluid inflow sections 4403A, the other edges of the fluid circulating members 448 with edges thereof connected to the outlet ports 4404A5, 4404B5 of the frame members 4404A, 4404B in the three optical modulator holders 4402 are connected, so that the cooling fluid sent out via the fluid circulating members 448 from the optical modulator holders 4402 flows into the relay tank 4403 in batch.

In this relay tank 4403, formed in the lower section of the external side face is a cooling fluid outflow section 4403B for sending out the received cooling fluid to the outside as shown in FIG. 9A and FIG. 9B. This cooling fluid outflow section 4403B comprises, like the cooling fluid inflow section 4403A, a substantially cylindrical member having a smaller diameter as compared to that of the fluid circulating members 448, and protrudes into inside of the relay tank 4403 and also outward therefrom. An edge of the fluid circulating members 448 is connected to an edge of the cooling fluid outflow section 4403B protruding outward, so that the cooling fluid inside the relay tank 4403 flows out to the outside via the fluid circulating members 448.

[Structure of the Radiator]

Figure 10A:
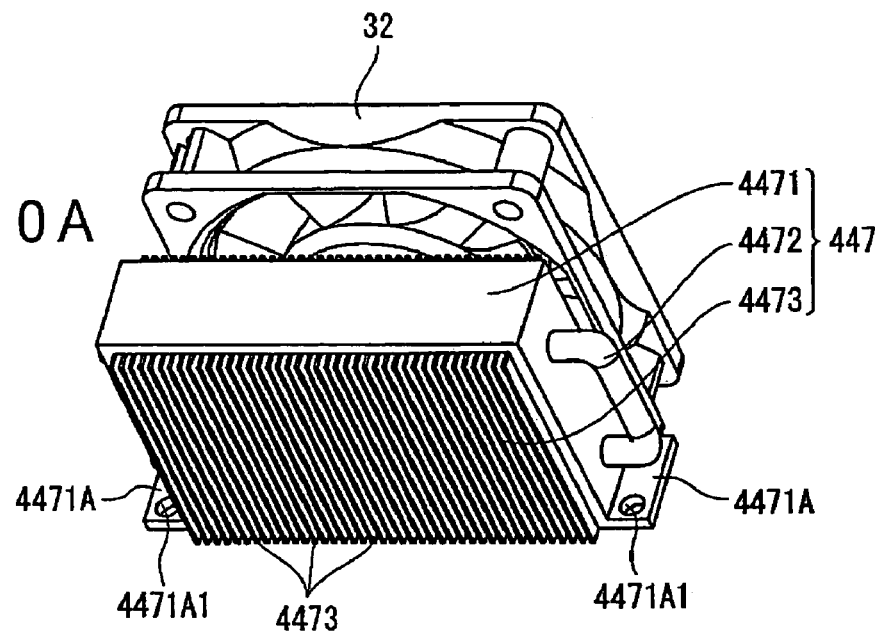
FIG. 10A and FIG. 10B are views each showing a construction of a radiator and a positional relation between the radiator and an axial-flow fan according to the first embodiment.
Figure 10B:
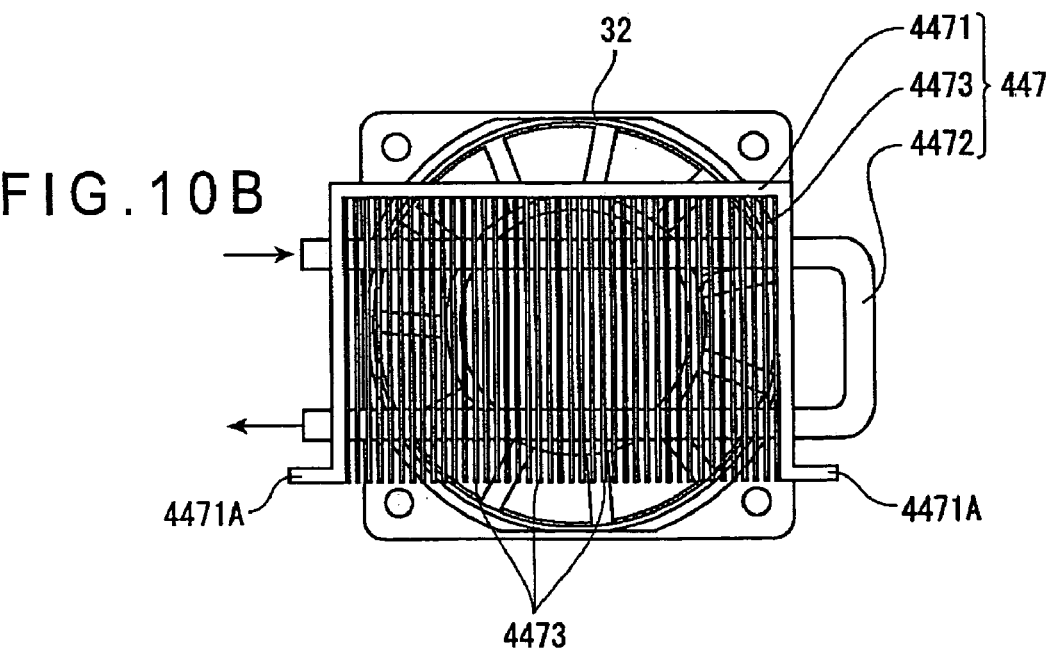

FIG. 10A and FIG. 10B are views showing structure of the radiator 447 and a positional relation between the radiator 447 and the axial flow fan 32. More specifically, FIG. 10A is a perspective view showing the radiator 447 and the axial flow fan 32 viewed from the top. Further FIG. 10B is a flat view showing the radiator 447 and the axial flow fan 32 from the side of the radiator 447.

The radiator 447 is provided in the inner side from a partition wall 21 formed in the exterior case 2 as shown in FIG. 1 or in FIG. 2, and releases heat of the cooling fluid heated by the liquid crystal panel 441, each incident-side polarization plate 442, and irradiation-side polarization plate 443 in the optical device main body 440. This radiator 447 comprises a fixing section 4471, a tubular section 4472, and a plurality of heat-radiating fins 4473 as shown in FIG. 10A and FIG. 10B.

The fixing section 4471 comprises, for instance, a thermally conductive member made from a metal or the like, and has a substantially horseshoe-shaped form viewed from the top as shown in FIG. 10B, and a tubular member 4472 can be inserted between the horseshoe-shaped edges opposite to each other. Further this fixing section 4471 supports a plurality of heat-radiating fins 4473 in the horseshoe-shaped inner side faces. An extending section 4471A extending outward is formed at a horse-shaped tip portion of this fixing section 4471, and the radiator 447 is fixed to the exterior case 2 by setting a screw (not shown) in the exterior case 2 via the hole 4471A1 of the extending section 4471A.

The tubular section 4472 is made from aluminum, and extends, as shown in FIG. 10B, from a horseshoe-shaped tip edge portion of the fixing section 4471 toward the other horse-shaped tip edge section, and a tip portion thereof in the extending direction bends by about 90 degrees downward, and further the tip portion bends in the extending direction by about 90 degrees to form a horseshoe-shaped portion when viewed from the top and extending from the other horseshoe-shaped tip edge portion of the fixing section 4471 toward the former horseshoe-shaped tip edge portion thereof, so that the fixing section 4471 and the heat-radiating fin 4473 are connected to each other in the thermally conductive state. Further this tubular section 4472 has a diameter smaller as compared to that of the fluid circulating members 448, and an edge thereof in the upper side in FIG. 10B connects to the other edge of the fluid circulating members 448 connected to the cooling fluid outflow section 4403B of the relay tank 4403 in the optical device main body 440. Further, the other edge thereof in the lower side in FIG. 10B connects to the other edge of the fluid circulating members 448 connected to the cooling fluid inflow section 445A of the main tank 445. Therefore, the cooling fluid flowing out of the relay tank 4403 passes via the fluid circulating members 448 through the tubular section 4472, and the cooling fluid having passed through the tubular section 4472 flows into the main tank 445 via the fluid circulating members 448.

The heat-radiating fin 4473 comprises, for instance, a plate body comprising a thermally conductive member made from such a material as metal and enabling insertion of the tubular section 4472. A plurality of heat-radiating fins 4473 extend in a direction perpendicular to the inserting direction of the tubular section 4472, and are arranged parallel to each other along the inserting direction of the tubular section 4472. When the plurality of heat-radiating fins 4473 are arranged as described above, as shown in FIG. 10A and FIG. 10B, cooling air discharged from the axial flow fan 32 passes through the plurality of heat-radiating fins 4473.

As described above, the cooling fluid circulates through the flow path formed with the main tank 445, fluid press-feeding section 446, fluid branching section 4401, each optical modulator holder 4402, relay tank 4403, radiator 447, and main tank 445 arranged in the order described above via a plurality of fluid circulating members 448.

[Cooling Mechanism]

The cooling mechanisms for the liquid crystal panels 441, incident-side polarization plate 442, and irradiation-side polarization plate 443 are described below.

Figure 11:
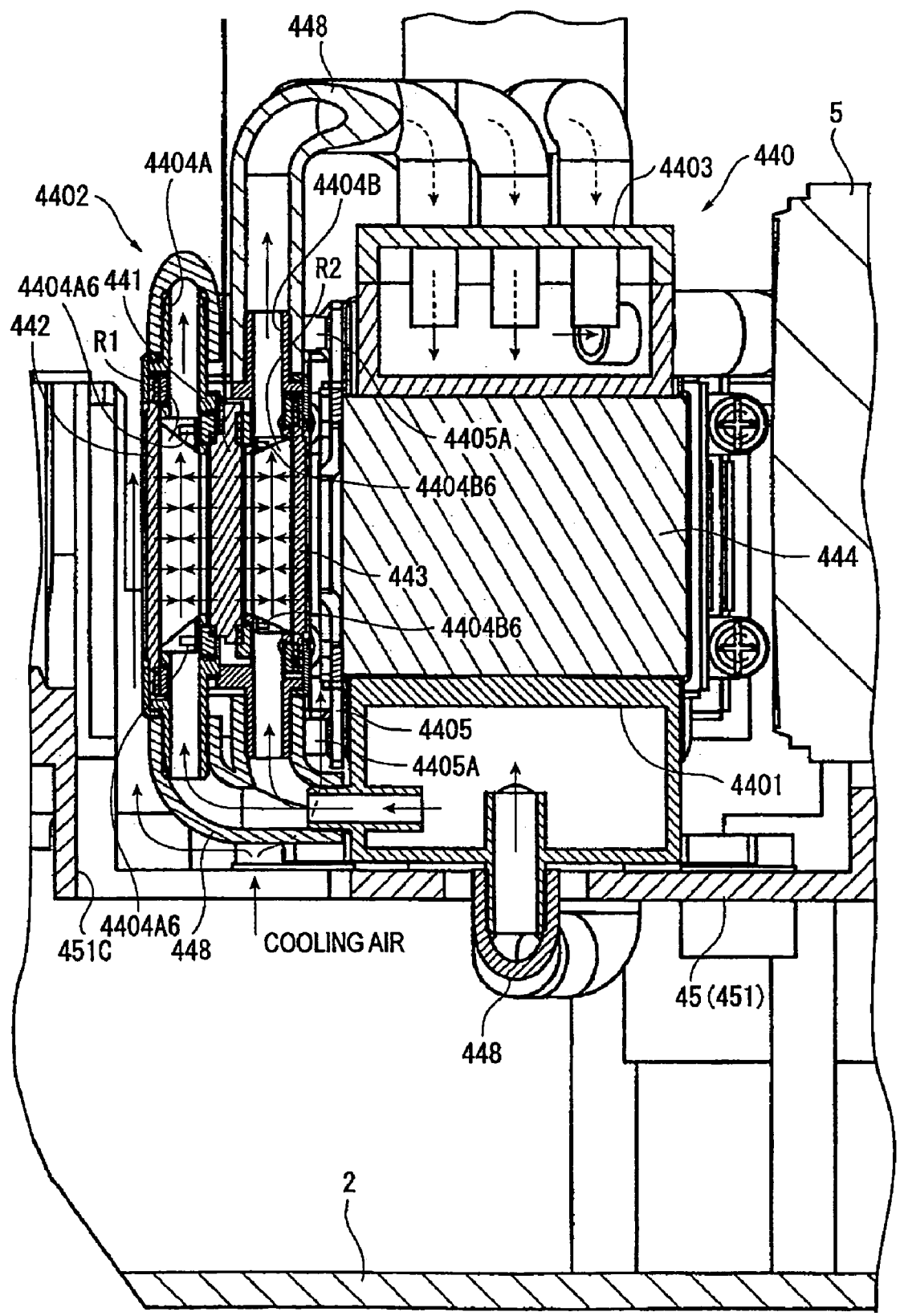
FIG. 11 is a cross-sectional view illustrating a cooling construction of a liquid crystal panel, an incident-side polarization plate, and an irradiation-side polarization plate according to the first embodiment.

FIG. 11 is a cross-sectional view showing the cooling mechanisms for the liquid crystal panel 441, incident-side polarization plate 442, and irradiation-side polarization plate 443.

When the fluid press-feeding section 446 is driven, the cooling fluid inside the main tank 445 is press-fed via the fluid press-feeding section 446 toward the fluid branching section 4401, is branched by the fluid branching section 4401, and flows into the cooling chambers R1, R2 of each optical modulator holder 4402. In this step, the cooling fluid flowing into each of the cooling chambers R1 and R2 is rectified by the rectifying sections 4404A6, 4404B6 to extend into inside of the cooling chambers R1, R2.

The heat generated by the light flux from the light source 411 in the liquid crystal panel 441, incident-side polarization plate 442, and irradiation-side polarization plate 443 is delivered to the cooling fluid in the cooling chambers R1, R2 of the frame members 4404A, 4404B of the optical modulator holder 4402.

The heat delivered to the cooling fluid inside the cooling chambers to the cooling chambers R1, R2 moves from the cooling chambers R1, R2 to the relay tank 4403 and then to the radiator 447 along a flow of the cooling fluid. When the warmed-up cooling fluid passes through the tubular section 4472 of the radiator 447, heat of the cooling fluid is delivered to the tubular section 4472 and then to the plurality of heat-radiating fin 4473. Then the heat delivered to the plurality of heat-radiating fins 4473 is cooled down by the cooling air discharged from the axial flow fan 32.

The cooling fluid cooled down by the radiator 447 moves from the radiator 447 to the main tank 445, and then to fluid press-feeding section 446 and fluid branching section 4401, and again moves to the cooling chambers R1, R2.

The cooling air led from the outside to inside of the projector 1 by the sirocco fan 31 of the cooling unit 3 is led to inside of the casing 45 for optical components via a hole 451C formed on a bottom face of the casing 45 for optical components. The cooling air led into inside of the casing 45 for optical components flows over an external face of the optical modulator holder 4404 and between the optical modulator holder 4404 and the supporting member 4405, and flows upward from the bottom to the top. In this step, the cooling air cools an edge face of the incident-side polarization plate 442 in the light flux incident side and an edge face of the irradiation-side polarization plate 443 in the light flux irradiation side.

In the first embodiment described above, as the optical device 44 comprises the main tank 445 and the relay tank 4403 via a plurality of fluid circulating members 448 therebetween in the upstream side and in the down stream side of a flow path of a cooling fluid in the optical modulator holder 4402, a capacity of the cooling fluid can be made larger by sealing the cooling fluid not only in the cooling chambers R1, R2 of the optical modulator holder 4402, but also in the plurality of fluid circulating members 448, main tank 445, and in relay tank 4403, so that the heat exchange capacity between the liquid crystal panel 441, incident-side polarization plate 442, irradiation-side polarization plate 443 and the cooling fluid.

Further as the main tank 445 and relay tank 4403 are provided via the plurality of fluid circulating members 448 therebetween in the upstream side and in the down stream side of a flow path of a cooling fluid in the optical modulator holder 4402, the cooling fluid can smoothly flow from the upstream side to the downstream side in the cooling chambers R1, R2 of the optical modulator holder 4402, so that a convention speed of the cooling fluid can be raised.

Because of the feature, it never occurs that the cooling fluid is warmed up by the liquid crystal panel 441, incident-side polarization plate 442, and irradiation-side polarization plate 443 to reduce a temperature difference between each of the components 441 to 443 and the cooling fluid, so that each of the components 441 to 443 can efficiently be cooled.

As the optical device 44 comprises the fixing section 4471, tubular member 4472, and radiator 447 having a plurality of heat-radiating fins 4473, by passing the cooling fluid through the tubular member 4472, heat of the cooling fluid flowing from the relay tank 4403 toward the main tank 445 can be released to the plurality of heat-radiating fin 4473, so that a temperature of the cooling fluid accumulated in the main tank 445 can be lowered. Because of this feature, the liquid crystal panel 441, incident-side polarization plate 442, and irradiation-side polarization plate 443 can more efficiently be cooled by the cooling fluid with the temperature lowered flowing from the main tank 445 to the cooling chambers R1, R2 of the optical modulator holder 4402.

As the partition wall 21 for separating the radiator 447 from other components is provided in the exterior case 2, it is possible to prevent the heat delivered from the liquid crystal panel 441, incident-side polarization plate 442, and irradiation-side polarization plate 443 via the cooling fluid to the heat-radiating fins 4473 constituting the radiator 447 from being delivered to other components.

As the axial flow fan 32 is provided inside the partition wall 21 of the exterior case 2, hat accumulated in the plurality of heat-radiating fin 4473 can efficiently be cooled down, namely the heat-radiating capability from the cooling fluid to the radiator 447 can be improved. Further temperature rise in the partition wall 21 can be suppressed, so that it is possible to prevent temperature in the projector 1 from becoming excessively high.

Further as the radiator 447 is set in the partition wall 21 of the exterior case 2 formed in the side from the projector lens 5, the radiator 447 can be set in an empty space formed by the projector lens 5 in the exterior case 2, so that the accommodation efficiency in the projector 1 can be improved and size increase of the projector 1 can be evaded.

As the optical device 44 comprises the fluid press-feeding section 446, the cooling fluid in the cooling chambers R1, R2 warmed up by the liquid crystal panel 441, incident-side polarization plate 442, and irradiation-side polarization plate 443 can be sent out to the relay tank 4403 without fail, and also the cooling fluid in the main tank 445 can be introduced into the cooling chambers R1, R2, so that the cooling fluid inside the cooling chambers R1, R2 can be circulated without fail. Because of this feature, it is possible to always secure a temperature difference between the liquid crystal panels 441, incident-side polarization plate 442, irradiation-side polarization plate 443 and the cooling fluid, so that the heat exchange efficiency between the cooling fluid and the components 441 to 443 can further be improved.

As the fluid press-feeding section 446 is provided under the projector lens 5, the fluid press-feeding section 446 can be set in an empty space formed with the projector lens 5 in the exterior case 2, so that the accommodation efficiency in the projector 1 can be improved and size increase of the projector 1 can be evaded.

The optical modulator holder main body 4404 constituting the optical modulator holder 4402 has a pair of frame members 4404A, 4404B having the opening s 4404A1, 4404B1 and holds the liquid crystal panel 441 between the pair of frame members 4404A, 4404B, and further the incident-side polarization plate 442 and irradiation-side polarization plate 443 are provided in the light beam incident side of the frame member 4404A and in the light beam irradiation side of the frame member 4404B respectively, so that the cooling chambers R1, R2 are formed in the pair f frame members 4404A, 4404B. Because of this feature, the heat generated in the liquid crystal panel 441 due to irradiation of a light beam irradiated from the light source 411 can directly be release to the cooling fluid filled in the cooling chambers R1, R2 provided both in the light beam incident side and in light beam irradiation side of the liquid crystal panel 441. Also the heat generated in the incident-side polarization plate 442 and irradiation-side polarization plate 443 can directly be released to the cooling fluid filled in the cooling chambers R1, R2. Because of this feature, the liquid crystal panel 441, incident-side polarization plate 442, and irradiation-side polarization plate 443 can efficiently be cooled.

As the openings 4404A1, 4404B1 are provided in an image formation region of the liquid crystal panel 441, the cooling fluid filled in the cooling chambers R1, R2 contacts the image formation regions of the liquid crystal panels 441, incident-side polarization plate 442, and irradiation-side polarization plate 443. Because of this feature, the temperature distribution within the image formation regions of the components 441 to 443 are uniformed with local overheating evaded, so that a clear optical image can be formed with the liquid crystal panels 441, incident-side polarization plate 442, and irradiation-side polarization plate 443.

As the inlet ports 4404A4, 4404B4 and outlet ports 4404A5, 4404B5 formed on the frame members 4404A, 4404B are provided at positions opposing to the frame members 4404A, 4404B respectively, so that circulation of a cooling fluid in the cooling chambers R1, R2 can smoothly be carried out, and a circulation speed of the cooling fluid can further be raised. Further the inlet ports 4404A4, 4404B4 are formed in the lower edge sections of the frame members 4404A, 4404B and the outlet ports 4404A5, 4404B5 are formed in the upper edge sections of the frame members 4404A, 4404B, so that the direction in which heat moves is the same as that of circulation of the cooling fluid, so that circulation of the cooling fluid in the cooling chambers R1, R2 can easily be carried out.

As the rectifying sections 4404A6, 4406B6 are formed in the inlet ports 4404A4, 4404B4 and also in the outlet ports 4404A5, 4404B5, it is possible to expand the cooling fluid flowing into the cooling chambers R1, R2 via the inlet ports 4404A4, 4404B4 inside the rectifying sections 4404A6, 4404B6, gather the cooling fluid inside the cooling chambers R1, R2 in the rectifying sections 4404A6, 4404B6, and send it out to the outside via the outlet ports 4404A5, 4404B5, preventing the warmed-up cooling fluid from residing in the cooling chambers R1, R2. For the reasons described above, the liquid crystal panels 441, incident-side polarization plate 442, and irradiation-side polarization plate 443 can further efficiently be cooled.

Cooling fluids each having a different temperature from the cooling chambers R1, R2 of the optical modulator holders 4402 are fed in the relay tank 4403 in batch, and the cooling fluids fed in as described above are mixed with each other in the relay tank 4403, so that the temperature is uniformed. The cooling fluids with the uniformed temperature from the main tank 445 are branched in the fluid branching section 4401 and flow into the cooling chambers R1, R2 of the optical modulator holders 4402. Because of this feature, the temperature of the cooling fluids flowing into the cooling chambers R1, R2 of the optical modulator holders 4402 are kept at a uniformed level, so that the liquid crystal panels 441, three incident-side polarization plates 442, and three irradiation-side polarization plates 443 can be cooled with cooling fluids having the substantially same temperature.

Further as the relay tank 4403 is attached to the top surface of the cross dichroic prism 444 and the fluid branching section 4401 is attached to the bottom face of the cross dichroic prism 444, the optical device main body 440 can be made compact, and size reduction of the optical device 44 is possible.

When the optical device main body 440 is accommodated in the casing 45 for optical components made from a metallic material, the aluminum-made fluid branching section 4401 is connected to the casing 45 for optical components in the heat-transferable state, so that the heat transfer path from the circulating cooling fluid to the fluid press-feeding section 446 and then to the casing 45 for optical components is secured with the cooling fluid cooling efficiency improved, and further the efficiency in cooling the liquid crystal panels 441, incident-side polarization plate 442, and irradiation-side polarization plates 443 with the cooling fluid can be improved.

Further by flowing air with the sirocco fan 31 along a bottom face of the casing 45 for optical components, a heat-radiating area of the circulating fluid can be increased, so that the cooling efficiency can further be improved.

Further in the main tank 445, fluid branching section 4401, and the relay tank 4403, edges of the cooling fluid inflow sections 445A, 4401A, 4403A and the cooling fluid outflow sections 445B, 4401C, 4403B protrude inward, so that only the cooling fluids accumulated in the main tank 445, fluid branching section 4401, and relay tank 4403 can be sent out to the outside without fail. For instance, even when the main tank 445, fluid branching section 4401, and relay tank 4403 are not completely filled with the cooling fluid, only the cooling fluid can be sent out to the outside without any air mixed therein. Further as not only the cooling fluid outflow sections 445B, 4401C, 4403B not also the cooling fluid inflow sections 445A, 4401A, and 4403A protrude inward, so that, even when a convecting direction of the cooling fluid is changed, namely even when the cooling fluid is sent out from the cooling fluid inflow sections 445A, 4401A, 4403A and the cooling fluid is inlet from the cooling fluid outflow sections 445B, 4401C, and 4403B, only the cooling fluid accumulated in the cooling fluid inflow sections 445A, 4401, and 4403A can be sent out to the outside without fail.

As the plurality of fluid circulating members 448, main tank 445, fluid press-feeding section 446, fluid branching section 4401, the pair of frame members 4404A, 4404B, relay tank 4403, and tubular member 4472 each comprise aluminum having the corrosion resistance, so that, even when the components contact a cooling fluid for a long time, any chemical reaction never occurs in the components. Namely, coloration of the cooling fluid due to any reactive substance generated through a chemical reaction or other troubles can be evaded, and also the optical characteristics of a light beam passing through the cooling chambers R1, R2 can be prevented from changing.

As the projector 1 comprises the optical device 44 described above, degradation of the liquid crystal panel 441, incident-side polarization plate 442, and irradiation-side polarization plate 443 due to heat can be prevented, so that the projector 1 can be used for a longer period of time.

Second Embodiment

Next, a second embodiment of the present invention is described with reference to the related drawings.

In the following descriptions, the same reference numerals are assigned to the same structures and components as those in the first embodiment described above, and the detailed description thereof is omitted herefrom.

In the first embodiment, the in the optical modulator holder 4402 constituting the optical device 44, there are provided a pair of cooling chambers R1, R2, and heat generated in the liquid crystal panel 441, incident-side polarization plate 442, and irradiation-side polarization plate 443 is radiated by circulating a cooling fluid.

In contrast, in the second embodiment, in an optical modulator holder 5402 constituting the optical device 54, only one cooling chamber R3 is formed, and the heat generated in the liquid crystal panel 441 and irradiation-side polarization plate 443 is radiated by circulating a cooling fluid therein.

In the first embodiment, the incident-side polarization plate 442 is integrated as the optical device 44, but in the second embodiment, the incident-side polarization plate 442 is not integrated as an optical device 54, and like the optical components 412 to 415, 418, 421 to 423, 431 to 434, the incident-side polarization plate 442 is accommodated in the casing 45 for optical components by sliding it into the groove 451A of the component accommodation member 451 in the casing 45 for optical components.

Although not shown specifically, this incident-side polarization plate 442 comprises a reflection type of polarization element allowing passage of a light flux having a specific polarization axis and reflecting light fluxes having different polarization axes. For instance, as the incident-side polarization plate 442, a reflection type of polarization element comprising a light-transmissible substrate such as a glass sheet and a multilayered film comprising a number of film sheets prepared by extending a polymer and laminated on the light-transmissible substrate may be used. Further as the incident-side polarization plate 442, not only the light-transmissible polarization element comprising the organic material as described above, but also the reflection type of polarization element of an inorganic material and comprising, for instance, a light-transmissible substrate such as a glass sheet and a plurality of projecting stripe portions arranged in parallel to each other each comprising a conductive material such as metal, projecting from the light-transmissible substrate and extending toward inside of a face of the light-transmissible substrate may be employed.

Figure 12:
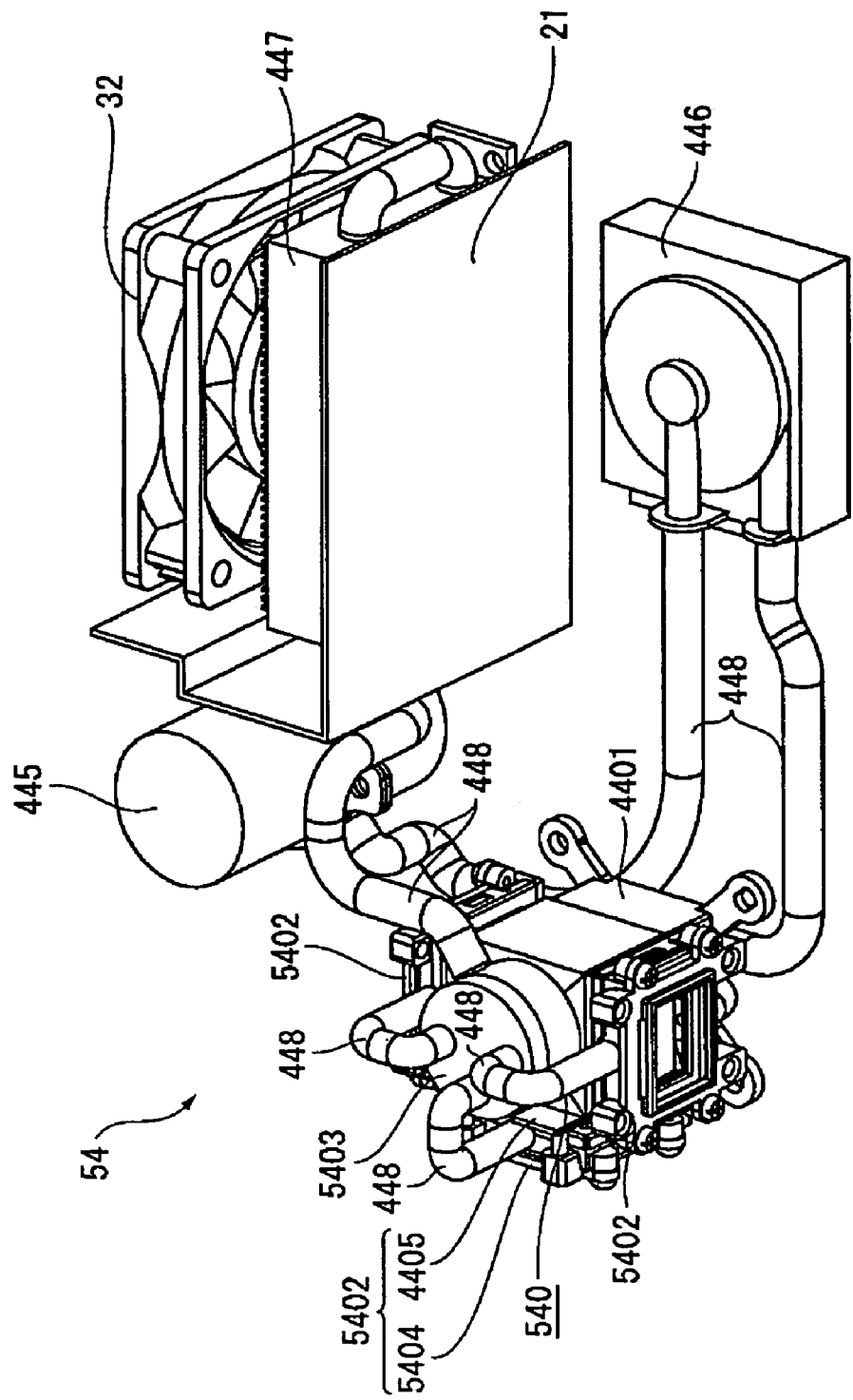
FIG. 12 is a perspective view of an optical device viewed from the top side according to a second embodiment.

FIG. 12 is a perspective view showing the optical device 54 according to the second embodiment viewed from the top side.

Figure 13:
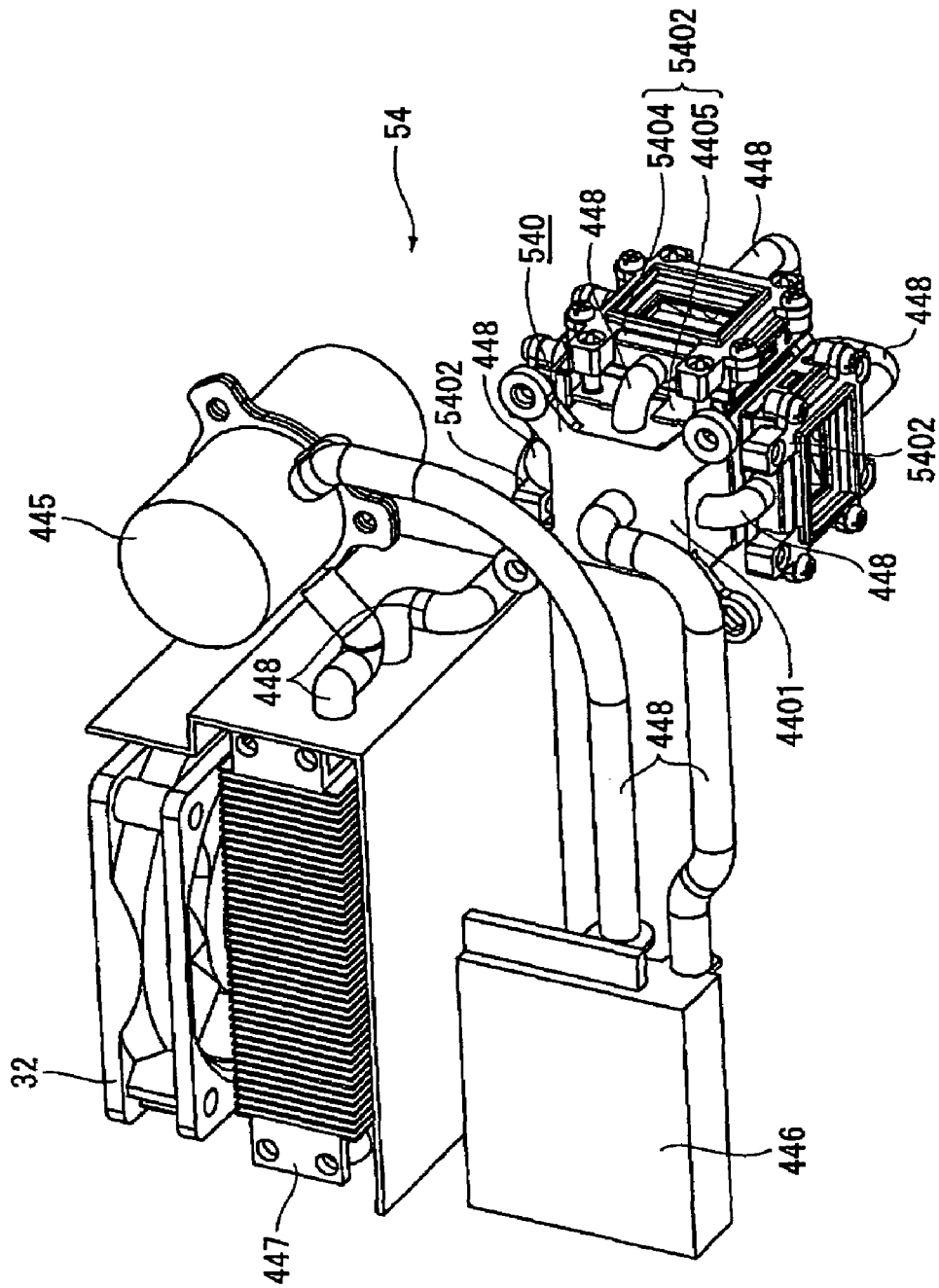
FIG. 13 is a perspective view of the optical device viewed from the bottom side according to the second embodiment.

FIG. 13 is a perspective view showing the optical device 54 viewed from the bottom side.

The optical device 54 comprises, in addition to the main tank 445, fluid press-feeding section 446, radiator 447, and a plurality of fluid circulating members 448 each described in the first embodiment, an optical device main body 540.

The optical device main body 540 comprises, in addition to the three liquid crystal panels 441, three irradiation-side polarization plates 443, cross dichroic prism 444, and fluid branching section 4401 (Refer to FIG. 13), three optical modulator holders 5402, and a relay tank 5403 (Refer to FIG. 12) as a downstream side cooling fluid accumulating section, and the components 441, 443, 444, 4401, 5402, and 5403 are integrated with each other.

Namely the main tank 445, fluid branching section 4401, and relay tank 5403 correspond to the cooling fluid accumulating section according to the present invention.

The three optical modulator holders 5402 hold the three liquid crystal panels 441 and the three irradiation-side polarization plate 443 respectively, and a cooling fluid flows into inside thereof to cool the three liquid crystal panels 441 and three irradiation-side polarization plate 443 respectively. The optical modulator holders 5402 have the same configuration, so that only one optical modulator holder 5402 is described below. The optical modulator holder 5402 has, in addition to the supporting member 4405 described in the first embodiment, an optical modulator holder main body 5404.

Figure 14:
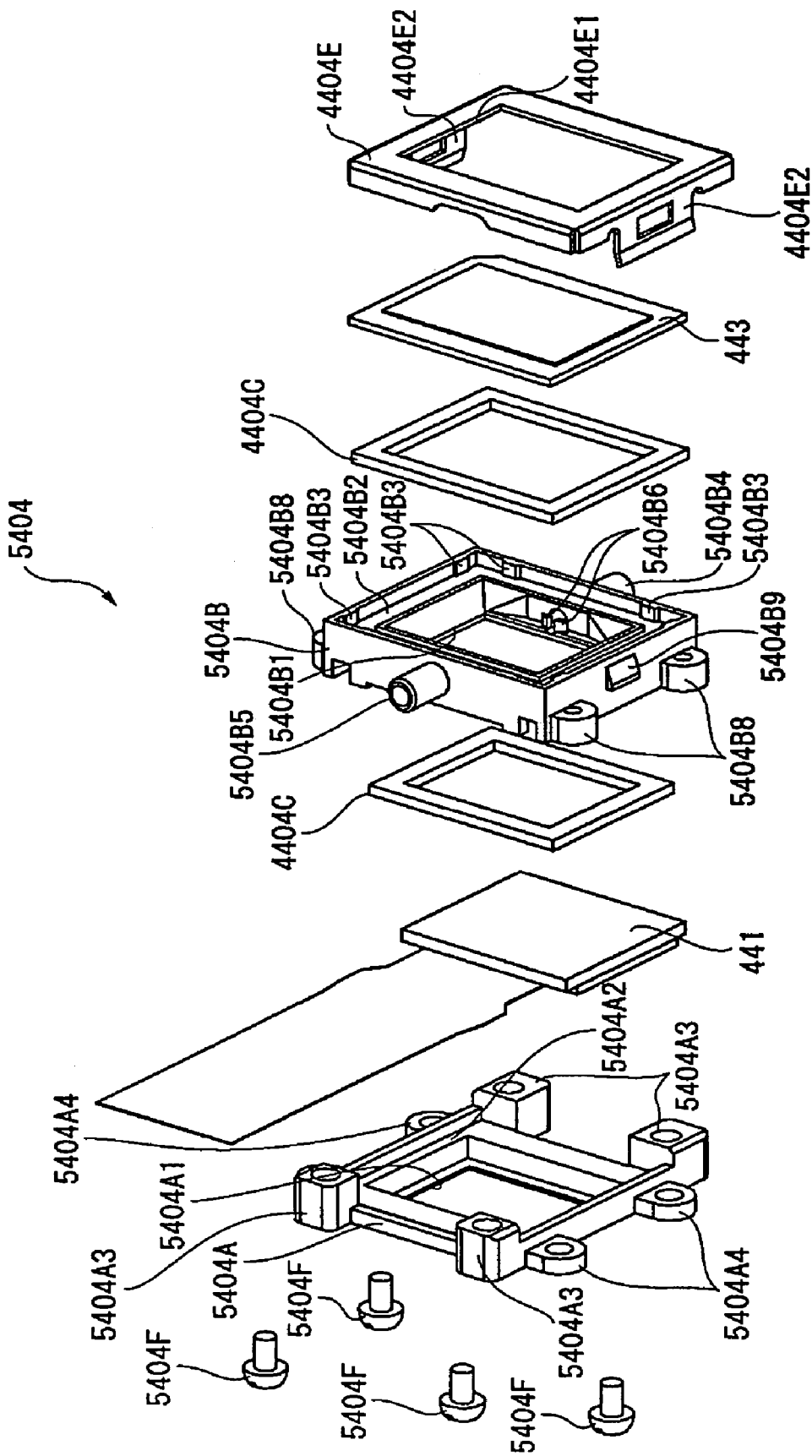
FIG. 14 is an exploded perspective view showing a general configuration of an optical modulator holder according to the second embodiment.

FIG. 14 is a developed perspective view showing general configuration of the optical modulator holder main body 5404.

The optical modulator holder main body 5404 has the substantially same configuration as that of the optical modulator holder main body 4404 described in the first embodiment, and comprises a pair of frame members 5404A, 5404B, two elastic members 4404C, and a polarization plate fixing member 4404E.

The frame member 5404A is a frame body having a substantially rectangular form when viewed from the top and also having a rectangular opening 5404A1 corresponding to an image formation region of the liquid crystal panel 441 formed at the substantially central portion thereof, and is set in the light beam incident side of the frame member 5404B, and press-fits the liquid crystal panel 441 via the elastic member 4404C to the frame member 5404B from the light beam incident side.

In this frame member 5404A, formed on an edge face in the light beam incident side is a support face 5404A2 for supporting an edge face of the liquid crystal panels 441 in the light beam incident side as shown in FIG. 14.

Further in the frame member 5404A, formed at a corner portion in the upper edge section and at a corner portion in the lower edge section are, as shown in FIG. 14, through insert sections 5404A3 each allowing insertion of the pin-shaped member 4405A (Refer to FIG. 15) of the support member 4405.

Further in the frame member 5404A, formed at a corner portion in the left edge section and at a corner portion in the right edge section are connecting sections 5404A4 for connection to the frame member 5404B as shown in FIG. 14.

The frame member 5404B comprises an aluminum-made member, and holds the liquid crystal panels 441 with the frame member 5404A described above via the elastic member 4404C, and also supports the irradiation-side polarization plate 443 on a face opposing to the frame member 5404A and on a counter face thereto via the elastic member 4404C with the polarization plate fixing member 4404E, and the specific structure is the substantially same as that of the frame member 4404B described in the first embodiment. Namely formed in this frame member 5404B are an opening 5404B1, a recess 5404B2, a hooking projection 5404B3, a inlet port 5404B4, an outlet port 5404B5, a rectifying section 5404B6, a connecting section 5404B8, and a hook 504B9 like the opening 4404B1, recess 4404B2, hooking projection 4404B3, inlet port 4404B4, outlet port 4404B5, rectifying section 4404B6, connecting section 4404B8, and hook 4404B9 in the frame member 4404B described in the first embodiment.

When screws 5404F are set in the connecting sections 5404A4, 5404B8 of the frame members 5404A, 5404B respectively, the liquid crystal panels 441 is pressed via the elastic member 4404C to the frame member 5404B to seal the light beam incident side of the opening 5404B1 of the frame member 5404B.

When the polarization plate fixing member 4404E is fixed to the frame member 5404B, the irradiation-side polarization plate 443 is pressed via the elastic member 4404C to the frame member 5404B to seal the light beam irradiation side of the opening 5404B1 of the frame member 5404B.

As described above, when the light beam incident side and light beam irradiation side of the opening 5404B1 of the frame member 5404B are closed, a cooling chamber R3 (Refer to FIG. 15) is formed inside the frame member 5404B.

As described above, as only one cooling chamber R3 is formed in the optical modulator holder main body 5404, the fluid circulating member 448 for connecting the cooling fluid outflow section 4401C of the fluid branching section 4401 to the optical modulator holder main body 5404 is connected to the inlet port 5404B4 of the frame member 5404B without the other edge branching.

The relay tank 5403 has the substantially same configuration as that of the relay tank 4403 described in the first embodiment, and is different from the latter only in the point that the optical modulator holder main body 5404 has only one cooling chamber R3 and accordingly only three cooling fluid inflow sections 4403A are formed. Other portions of the structure are the same as those of the relay tank 4403 described in the first embodiment.

Next, a cooling mechanism for the liquid crystal panel 441 as well as for the irradiation-side polarization plate 443 is described below.

Figure 15:
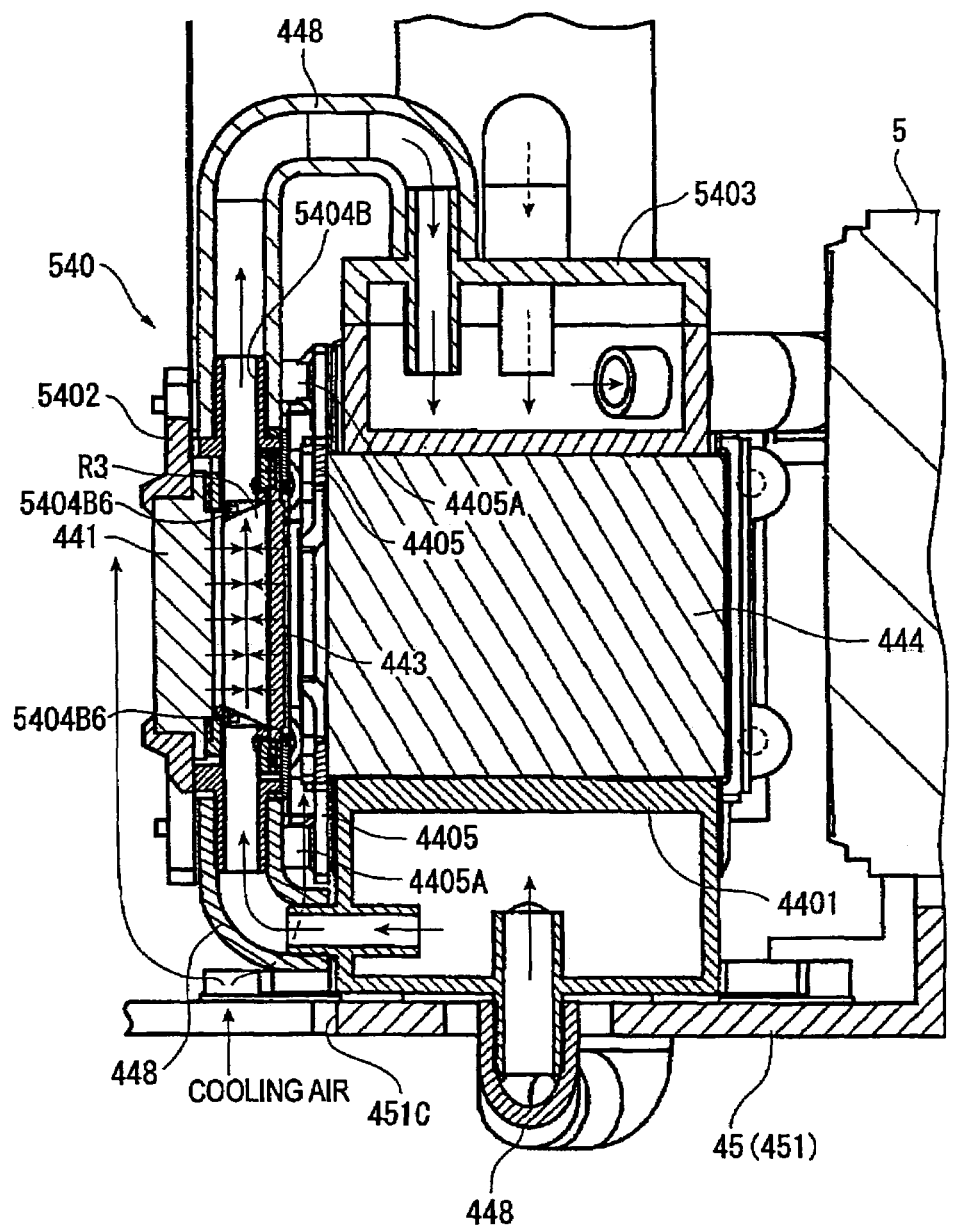
FIG. 15 is a cross-sectional view illustrating a cooling construction of a liquid crystal panel and an irradiation-side polarization plate according to the second embodiment.

FIG. 15 is a cross-sectional view showing a cooling mechanism for the liquid crystal panel 441 as well as for the irradiation-side polarization plate 443.

When the fluid press-feeding section 446 is driven, a cooling fluid inside the main tank 445 is press-fed via the fluid press-feeding section 446 to the fluid branching section 4401 and is branched by the fluid branching section 4401 to flow into each cooling chamber R3 of each optical modulator holder 5402. In this step, the cooling fluid flowing into inside of each cooling chamber R3 is rectified by the rectifying section 5404B6 so that the cooling fluid spreads inside the cooling chamber R3.

In this step, heat generated by a light flux irradiated from the light source 411 in the liquid crystal panel 441 and irradiation-side polarization plate 443 is delivered to the cooling fluid inside the cooling chamber R3 of the frame member 5404B in the optical modulator holder 5402.

The heat delivered to the cooling fluid inside the cooling chamber R3 moves from the cooling chamber R3 to the relay tank 5403, and then to the radiator 447, and is radiated by the radiator 447 like in the first embodiment described above.

The cooling fluid cooled by the radiator 447 moves from the radiator 447 to the main tank 445 and then to the fluid press-feeding section 446 and fluid branching section 4401, and is again led into the cooling chamber R3.

Cooling air is flown by the sirocco fan 31 of the cooling unit 3 over an external face of the optical modulator holder 5404 and to between the optical modulator holder body 5404 and the supporting member 4405, and then flows upward from the bottom. In this step, the cooling air cools and flows along an edge face of the liquid crystal panel 441 in the light flux incident side and an edge face of the irradiation-side polarization plate 443 in the light flux irradiation side.

In the second embodiment described above, different from the first embodiment, the incident-side polarization plate 442 is formed with a reflection type of polarization element, so that temperature increase in the incident-side polarization plate 442 is prevented and it is not necessary to integrate the incident-side polarization plate 442 with the optical device 54. Therefore, the optical modulator holder 5402 is required only to support the liquid crystal panel 441 and the irradiation-side polarization plate 443, so that configuration of the optical modulator holder 5402 can be simplified.

Further as the optical modulator holder 5402 comprises only one cooling chamber R3, also configuration of the fluid circulating members 448 for connecting the fluid branching section 4401 to the optical modulator holder 5402 and also for connecting the optical modulator holder 5402 to the relay tank 5403 can be simplified.

Third Embodiment

A third embodiment of the present invention is described below with reference to the related drawings.

In the following descriptions, the same reference numerals are assigned to the same structures and components as those in the first embodiment described above, and detailed descriptions are omitted herefrom or simplified herein.

In the first embodiment, the optical devices 44 comprises the optical device main body 440, main tank 445, fluid press-feeding section 446, radiator 447, and fluid circulating members 448, and circulates a cooling fluid through a flow path from the main tank 445 to the fluid press-feeding section 446 and then to the optical device main body 440 and radiator 447 and finally to the main tank 445 via the fluid circulating members 448. In the optical modulator holder 4402 constituting the optical device main body 440, a pair of cooling chambers R1, R2 are formed, and the heat generated in the liquid crystal panel 441, incident-side polarization plate 442, and irradiation-side polarization plate 443 are released by circulating the cooling fluid.

In contrast, in the optical device 64 in the third embodiment, the main tank 445 and radiator 447 are omitted, and the optical device main body 640 and the fluid press-feeding section 646 are connected with the fluid circulating members 448 so that a cooling fluid can circulate therethrough. Further only one cooling chamber R3 is formed in the optical modulator holder 6402 constituting the optical device main body 640, and the heat generated in the liquid crystal panel 441 is released by circulating a cooling fluid therethrough.

The incident-side polarization plate 442 comprises a reflection type of polarization element like in the second embodiment described above, and is accommodated and stored in the casing 45 for optical components by sliding into a groove 451A of the component accommodation member 451 of the casing 45 for optical components.

Figure 16:
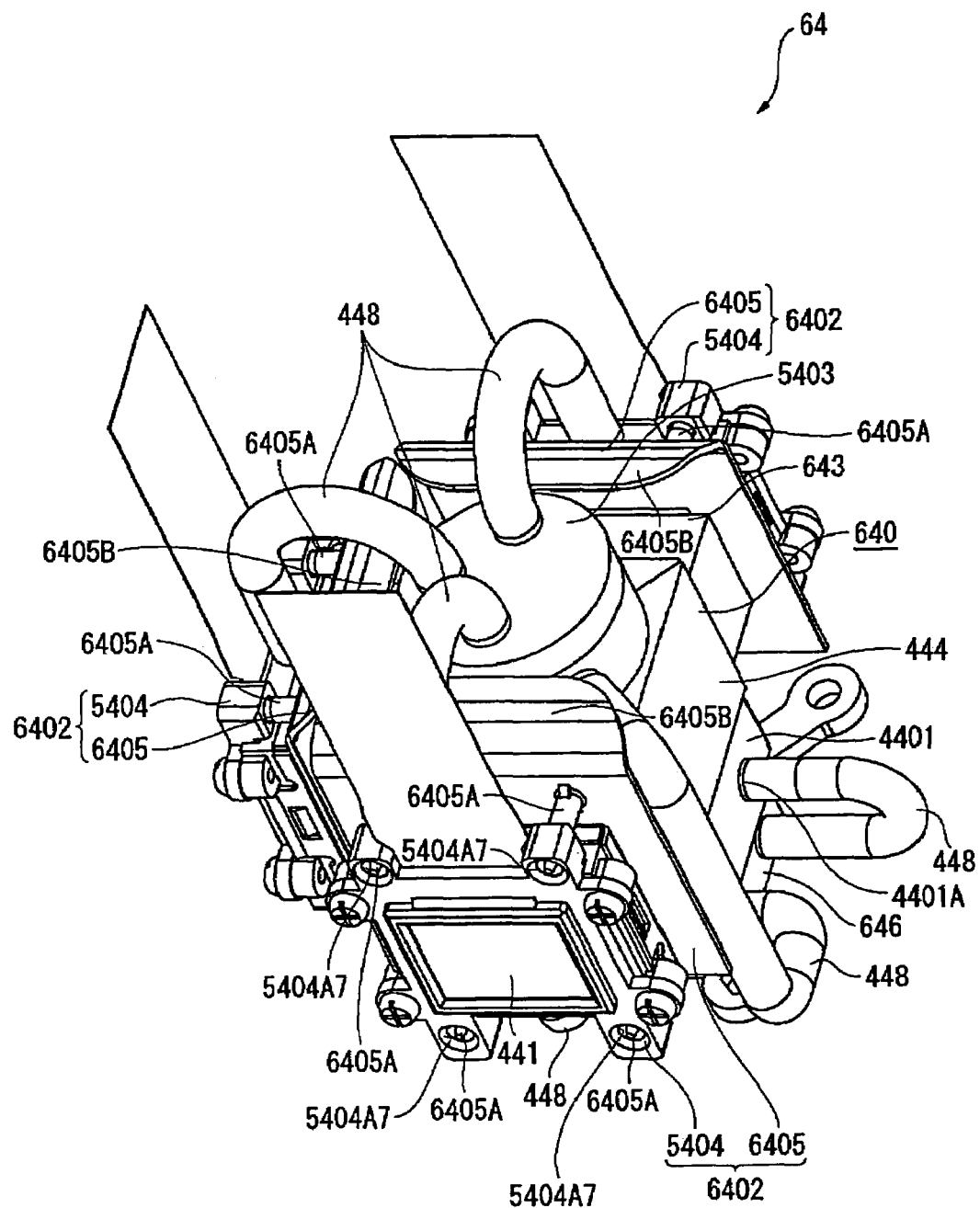
FIG. 16 is a perspective view of an optical device viewed from the top side according to a third embodiment.

More specifically, FIG. 16 is a perspective view showing the optical device 64 in the third embodiment viewed from the top.

Figure 17:
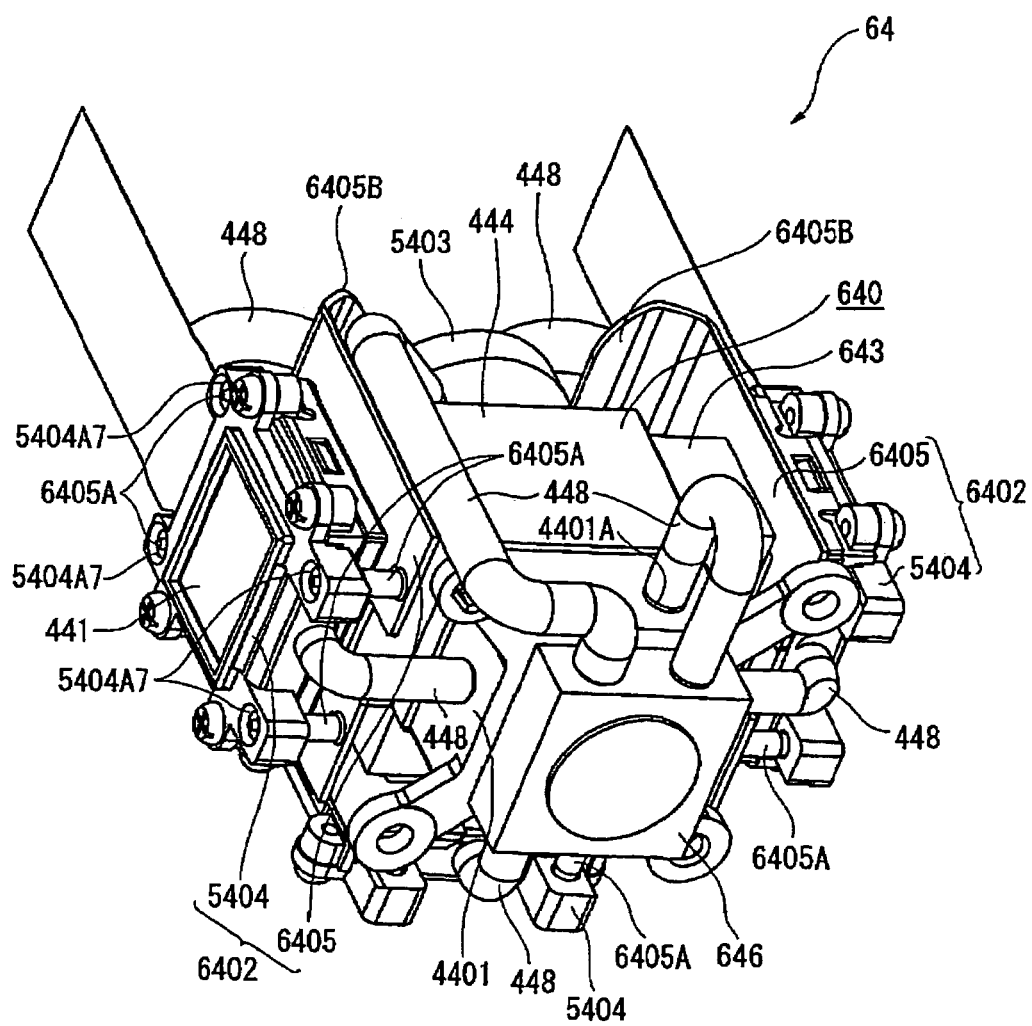
FIG. 17 is a perspective view of the optical device viewed from the bottom side according to the third embodiment.

FIG. 17 is a perspective view showing the optical device 64 viewed from the bottom side.

An optical device main body 640 constituting the optical device 64 comprises, in addition to the three liquid crystal panels 441, cross dichroic prism 444, the plurality of fluid circulating members 448 and the fluid branching section 4401 described in the first embodiment and the relay tank 5403 described in the second embodiment, three irradiation-side polarization plates 643, and three optical modulator holders 6402.

The fluid branching section 4401 is different from the fluid branching section 4401 described in the first embodiment in the position of the cooling fluid inflow section 4401A, and this cooling fluid inflow section 4401A is formed on three of the four side faces thereon other than that on which the cooling fluid outflow section 4401C is formed.

The fluid branching section 4401 in the third embodiment corresponds to the downstream side cooling fluid accumulating section according to the present invention, while the relay tank 5403 and the fluid branching section 4401 correspond to the cooling fluid accumulating section according to the present invention.

Figure 18:
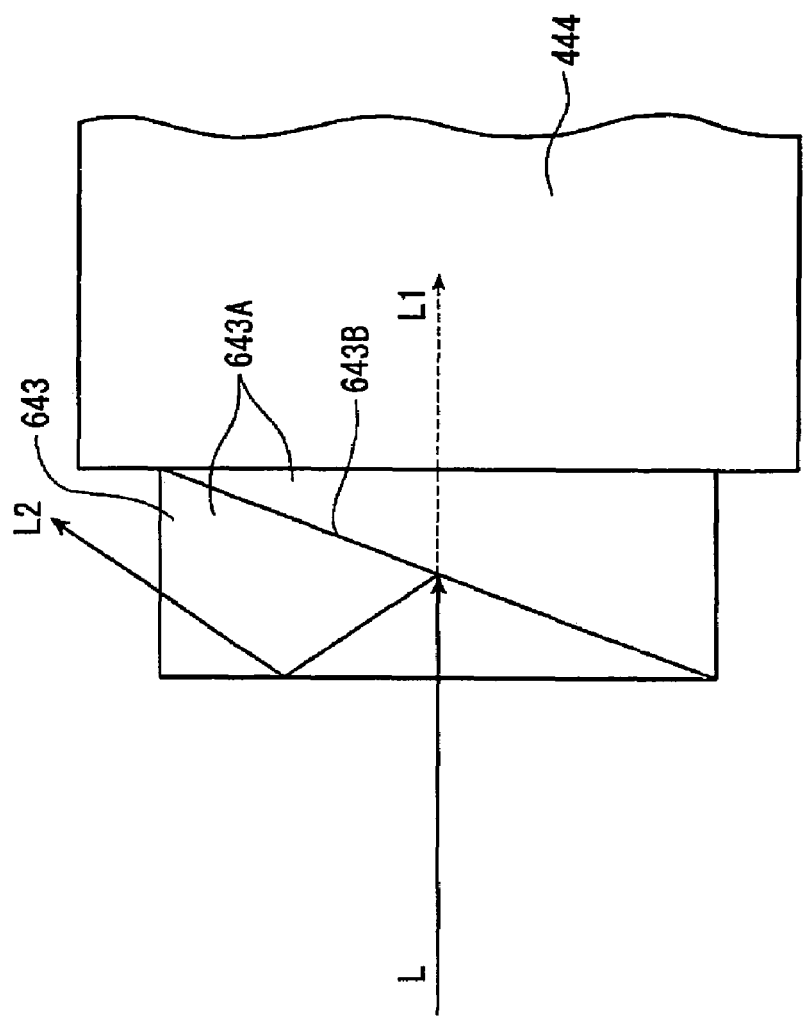
FIG. 18 is a view schematically showing a general configuration of an irradiation-side polarization plate according to the third embodiment.

FIG. 18 is a view schematically showing a structure of the irradiation-side polarization plates 643. More specifically, FIG. 18 is a side view showing the irradiation-side polarization plates 643.

The three irradiation-side polarization plates 643 each comprise a reflection type of polarization element allowing transmission of a light beam having a prespecified polarization axis and reflecting light beams having other polarization axes, and are adhered and fixed to the light beam incident sides of the cross dichroic prism 444 respectively.

This irradiation-side polarization plate 643 comprises, as shown in FIG. 18, two right-angle prisms 643A, and a reflection type of polarization film 643B formed on an interface between the two right-angle prisms 643A. As a material for the reflection type of polarization film 643B, for instance, it is possible to employ a multilayered film in which a number of film sheets each prepared by drawing polymer are laminated.

Of the light beams L coming onto the irradiation-side polarization plate 643, a light beam L1 having a specific polarization axis passes through the reflection type of polarization film 643B and goes into the cross dichroic prism 444 as shown in FIG. 18.

Further, as shown in FIG. 18, of the light beams L coming into the irradiation-side polarization plate 643, light beams L2 having other polarization axes are reflected on the polarization film 643B, further totally reflected on the light beam incident-side edge face of the right-angle prism 643A, and are irradiated upward.

The three optical modulator holders 6402 hold the three liquid crystal panels 441 respectively, and a cooling fluid flows therein and out therefrom to cool the three liquid crystal panels 441 with the cooling fluid respectively. The three optical modulator holders 6402 have the same configuration, so that only one of the three optical modulator holders 6402 is described herein. This optical modulator holder 6402 comprises, in addition to the optical modulator holder main body 5404 described in the second embodiment, a supporting member 6405.

In the optical modulator holder main body 5404 in the third embodiment, not the irradiation-side polarization plate 443, but a light-transmissible board 5404G made from glass or the like (Refer to FIG. 19) is set in the light beam irradiation side of the frame member 5404B. Other portions of the configuration are the same as those of the optical modulator holder main body 5404 in the second embodiment, so that description thereof is omitted herefrom.

The supporting body 6405 comprises a plate body having a substantially rectangular form when viewed from the top side and having an opening (not shown) formed at the substantially central portion. This supporting member 6405 is made from such a material as aluminum with the surface processed into black alumite.

In this supporting member 4405, as shown in FIG. 16 and FIG. 17, formed on the edge face in the light beam incident side are pin-shaped members 6405A protruding from the plate body at positions corresponding to the four insert sections 5404A3 of the optical modulator holder main body 5404.

Further in this supporting member 4405, a curved section 6405B curving toward the light beam irradiation side is formed in the upper edge section as shown in FIG. 16 and FIG. 17.

This supporting member 6405 supports the optical modulator holder main body 5404 by inserting the pin-shaped members 6405A into the four insert sections 5404A3 of the optical modulator holder main body 5404, and when the edge face of the plate body in the light beam irradiation side is adhered and fixed to the light beam incident side edge face of the irradiation-side polarization plates 643 fixed to the cross dichroic prism 444 the optical modulator 6402 can be integrated with the cross dichroic prism 444.

When the optical modulator holder 6402 is fixed to the cross dichroic prism 444 as described above, the curved section 6405B of the supporting member 6405 is set spanning above the irradiation-side polarization plates 643 (Refer to FIG. 19).

The fluid press-feeding section 646 constituting the optical device 64 has the configuration as the fluid press-feeding section 446 described in the first embodiment, and circulates a cooling fluid in the optical device 64 with the fluid circulating members 448. The fluid press-feeding section 646 is connected to the relay tank 5403, as shown in FIG. 16 and FIG. 17, so that the cooling fluid inside the relay tank 5403 can be fed in and out via the relay tank 5403 and the fluid circulating members 448, and also is connected via the fluid branching section 4401 and fluid circulating members 448 so that the cooling fluid can be fed out to the fluid branching section 4401.

The fluid press-feeding section 646 is connected to an external surface of the casing 45 for optical components in the heat-transferable state and is provided under the optical device body 640 (Refer to FIG. 19).

With the configuration as described above, the cooling fluid circulates via the plurality of fluid circulating members 448 through the flow path from the fluid press-feeding section 646 to the fluid branching section 4401, and then to each of the optical modulator holders 6402, relay tank 5403, and finally to the fluid press-feeding section 646.

Next, a cooling mechanism for the liquid crystal panels 441 is described below.

FIG. 19 is a cross-sectional view for illustrating a cooling mechanism for the liquid crystal panels 441.

When the fluid press-feeding section 646 is driven, a cooling fluid is press-fed to the fluid branching section 4401, branched by the fluid branching section 4401, and flows into each cooling chamber R3 of the optical modulator holders 6402. In this step, the cooling fluid flowing into inside of each cooling chamber R3 is rectified by the rectifying section 5404B6 so that the cooling fluid extends in the cooling chamber R3.

The heat generated in the liquid crystal panel 441 due to a light beam irradiated from the light source 411 is transferred to the cooling fluid in the cooling chamber R3 in the frame member 5404B constituting the optical modulator holder 6402.

The heat transferred to the cooling fluid in the cooling chamber R3 moves, in association with a flow of the cooling fluid, from the cooling chamber R3 to the relay tank 5403, and then to the fluid press-feeding section 646 and finally to the fluid branching section 4401. When the cooling fluid warmed up flows into the fluid press-feeding section 646 and into the fluid branching section 4401, heat of the cooling fluid is transferred through the heat transfer path from the fluid press-feeding section 646 to the fluid branching section 4401 and then to the casing 45 for optical components and is released to the outside.

The cooled cooling fluid again moves to the fluid branching section 4401 and then to the cooling chamber R3.

Like in the first embodiment described above, cooling air is sent by the sirocco fan 31 of the cooling unit 3 and flows over an external face of the optical modulator holder main body 5404 and between the optical modulator holder main body 5404 and the supporting member 6405 from top to bottom. In this step, the cooling air flows cooling an edge face of the liquid crystal panels 441 in the light beam incident side.

In the third embodiment, different from the first embodiment, each of the incident-side polarization plate 442 and irradiation-side polarization plate 643 comprises a reflection type of polarization element, so that temperature rise in the incident-side polarization plate 442 and irradiation-side polarization plate 643 can be suppressed, and therefore the optical modulator holder 6402 is not required to support, in addition to the liquid crystal panel 441, the incident-side polarization plate 442 and irradiation-side polarization plate 643. Therefore, configuration of the optical modulator holder 6402 can be simplified.

In the optical modulator holder 6402, only one cooling chamber R3 is formed, so that configuration of the fluid circulating members 448 connecting the fluid branching section 4401 to the optical modulator holder 6402 and also connecting the optical modulator holder 6402 to the relay tank 5403 can be simplified.

Further in the optical device 64, the main tank 445 and the radiator 447 are omitted, so that the optical device 64 can be made compact, which enables size reduction of the projector 1.

Further, the irradiation-side polarization plate 643 reflects a light beam irradiated thereto but not having a prespecified polarization axis upward, so that the light beam is not reflected toward the liquid crystal panel 441, so that generation of astray light in the optical device 64 can be prevented.

As the curved section 6405B with the surface having been subjected to the processing with black alumite is formed in the supporting member 6405 constituting the optical modulator holder 6402, the light beam reflected upward by the irradiation-side polarization plate 643 is shielded by the curved section 6405B, so that it is possible to prevent the fluid circulating members 448 provided above the irradiation-side polarization plate 643 from being warmed up by the light beam.

Fourth Embodiment

Next a fourth embodiment of the present invention is described with reference to the related drawings.

In the following descriptions, the same reference numerals are assigned to the same structures and same components as those in the first embodiment, and detailed description thereof is omitted or simplified herein.

This embodiment is different from the first embodiment only in the point that a cooling chamber dividing section 7404G dividing each of the cooling chambers R1, R2 to the light beam incident side and light beam irradiation side is provided in each of the cooling chambers R1, R2 respectively, and other portions of the structure are the same as those in the first embodiment.

FIG. 20 is a view showing positional arrangement of the cooling chamber dividing section 7404G in this embodiment.

FIG. 21A, FIG. 21B, and FIG. 21C are views each showing a structure of the cooling chamber dividing section 7404G. More specifically, FIG. 21A is a view showing the cooling chamber dividing section 7404G set in the light beam incident side of the liquid crystal panel 441 viewed from the light beam irradiation side. FIG. 21B is a cross-sectional view taken along the line D—D in FIG. 21A. FIG. 21C is a cross-sectional view taken along the line E—E in FIG. 21A.

As shown in FIG. 20, the two cooling chamber dividing section 7404G are set between the liquid crystal panels 441 and the frame member 4404A and between the liquid crystal panel 441 and the frame member 4404B respectively.

The two cooling chamber dividing section 7404G have the same configuration, and in the following descriptions, only the cooling chamber dividing section 7404G set between the liquid crystal panel 441 and the frame member 4404A is described.

This cooling chamber dividing section 7404G comprises a dividing section main body 7404G1 and a contacting section 7404G2 as shown in FIG. 21A, FIG. 21B and FIG. 21C.

The dividing section main body 7404G1 is a plate body having a rectangular form when viewed from the top and a little smaller as compared to the opening 4404A1 of the frame member 4404A.

In this dividing section main body 7404G1, the corner sections in the light beam incident side and light beam irradiation side n the upper and lower edge sections are beveled as shown in FIG. 21A and FIG. 21B to form slant surfaces 7404G3 there respectively. Namely these upper and lower edge sections have a tapered form with the cross-section becoming smaller in the vertical direction.

Further in the dividing section main body 7404G1, the right and left side edges are beveled in the light beam irradiation side as shown in FIG. 21A and FIG. 21C with the slant surfaces 7404G4 formed there. Namely with the slant surfaces 7404G3, 7404G4, the edge face of the dividing section main body 7404G1 in the light beam irradiation side has a form expanding at the substantially central portion toward the light beam irradiation side.

The contacting sections 7404G2 contact the frame member 4404A, and are formed along the ridges of the right and left edges of the dividing section main body 7404G1 respectively as shown in FIG. 21A, FIG. 21B, and FIG. 21C. Each of these contact sections 7404G2 is a plate body having a substantially rectangular form when viewed from the top side and extending in the vertical direction, and the thickness thereof is smaller than that of the dividing section main body 7404G1 as shown in FIG. 21B and FIG. 21C.

The dividing section main body 7404G1 and contacting section 7404G2 described above each comprise a light-transmissible member such as a glass sheet, and is a molded product prepared by molding. There is not any specific restriction over the materials for the dividing section main body 7404G1 and the contacting section 7404G2 so long as the material are light-transmissible, but the materials are preferably light-transmissible members each having the efficient of thermal conductivity of 10 W/m·K or more.

The cooling chamber dividing section 7404G set in the light beam irradiation side of the liquid crystal panel 441 is set so that the two edge faces in the optical-axial direction are reverse to those of the cooling chamber dividing section 7404G set in the light beam incident side of the liquid crystal panel 441 as shown in FIG. 20.

Figure 22:
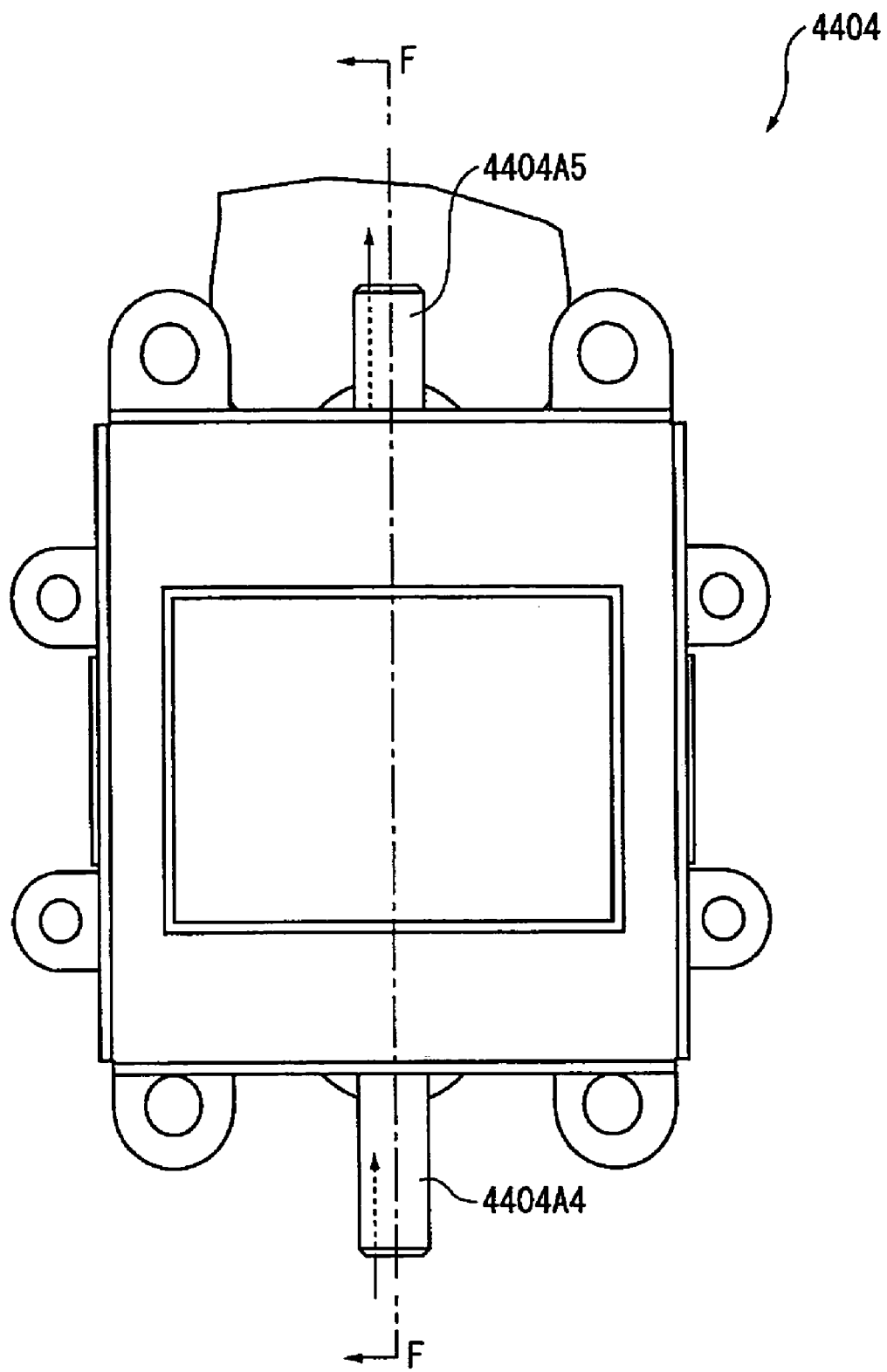
FIG. 22 is a view illustrating a state of the cooling chamber dividing sections arranged inside cooling chambers respectively according to the fourth embodiment.
Figure 23:
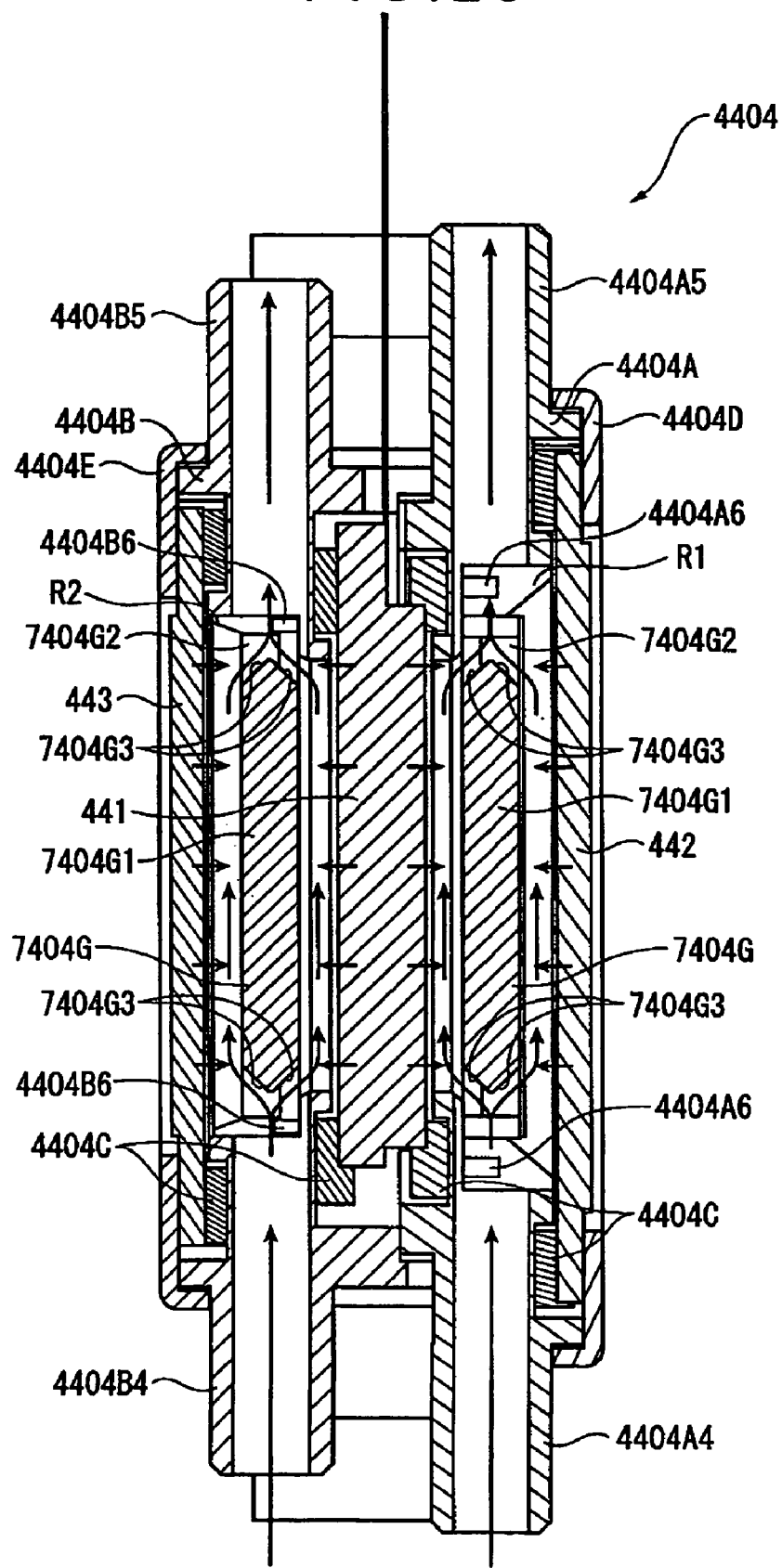
FIG. 23 is a view illustrating a state of the cooling chamber dividing sections arranged inside the cooling chambers respectively according to the fourth embodiment.

FIG. 22 and FIG. 23 are views illustrating positional arrangement of the cooling chamber dividing sections 7404G set in the cooling chambers R1, R2 respectively. More specifically, FIG. 22 is a view showing the optical modulator holder main body 4404 viewed from the light beam irradiation side. FIG. 23 is a cross-sectional view taken along the line F—F in FIG. 22.

Although not shown specifically, recesses each having the smaller thickness in the optical-axial direction as compared to that of the recess 4404A2 are formed in the edge sections in the horizontal direction of the recess 4404A2 formed in the light beam irradiation side of the frame member 4404A. The recess described above but (not shown) has a form corresponding to the contacting section 7404G2 of the cooling chamber dividing section 7404G, and when the cooling chamber dividing section 7404G is set in the cooling chamber R1, the light beam incident side edge face of the contacting section 7404G2 in the cooling chamber dividing section 7404G contacts the recess (not shown). Further when the optical modulator holder main body 4404 is assembled, the edge sections in the horizontal direction of the elastic member 4404C set between the liquid crystal panels 441 and the frame member 4404A contact the light beam irradiation side edge face of the contacting section 7404G2, and the cooling chamber dividing section 7404G is press-fit to the recess (not shown).

Also the frame member 4404B has the recess (not shown).

As shown in FIG. 23, when the cooling chamber dividing sections 7404G are set in the cooling chambers R1, R2 respectively, prespecified spaces are formed with the recess (not shown) and the elastic member 4404C between the incident-side polarization plate 442 and the liquid crystal panel 441 and between the irradiation-side polarization plate 443 and the cooling chamber dividing section 7404G respectively.

The width of each of the spaces in the optical-axial direction is in the range from 0.5 mm to 2 mm. The width of each of the spaces in the optical-axial direction should preferably be in the range from 0.5 mm to 1 mm.

With the configuration as described above, as shown in FIG. 23, a cooling fluid flowing from the inlet ports 4404A4, 4404B4 into inside of the cooling chambers R1, R2 is branched by the slant surfaces 7404G3 formed in the lower side edge sections of the cooling chamber dividing sections 7404G respectively to the light beam incident side and to the light beam irradiation side, and circulates along the light beam incident side edge face and the light beam irradiation side edge face of the cooling chamber dividing section 7404G. Further the cooling fluid circulating along the light beam incident side edge face and the light beam irradiation side edge face of the cooling chamber dividing section 7404G is led to the substantially central portion in the thickness direction of the cooling chamber dividing section 7404G by the slant surfaces 7404G3 formed in the upper side edge sections of the cooling chamber dividing section 7404G and flows out via the outlet ports 4404A5, 4404B5 from the cooling chambers R1, R2 to the outside.

In the fourth embodiment described above, different from the first embodiment, as the cooling chamber dividing section 7404G is set in each of the cooling chamber R1 and cooling chamber R2, the thickness of the cooling fluid layer contacting the liquid crystal panel 441, incident-side polarization plate 442, and irradiation-side polarization plate 443 respectively can be reduced, so that the circulation speed of the cooling fluid contacting the liquid crystal panel 441, incident-side polarization plate 442, and irradiation-side polarization plate 443 can be quickened. Therefore the temperature difference between the liquid crystal panel 441, incident-side polarization plate 442, irradiation-side polarization plates 443 and the cooling fluid can be maintained, and the liquid crystal panel 441, incident-side polarization plate 442, and irradiation-side polarization plates 443 can be cooled more efficiently.

Herein in the cooling chamber dividing section 7404G, the slant surfaces 7404G3 are formed at the upper and lower edge sections in the side of inlet ports 4404A4, 4404B4 and also in the side of outlet ports 4404A5, 4404B5, so that the cooling fluid flowing from the inlet ports 4404A4, 4404B4 does not lose its circulation speed and can smoothly be circulated to the light beam incident side and light beam irradiation side of the cooling chamber dividing section 7404G, and also the cooling fluid circulating to the light beam incident side and light beam irradiation side of the cooling chamber dividing section 7404G can smoothly be led to the outlet ports 4404A5 and 4404B5.

Therefore, different from the cooling chamber dividing section not having the slant surfaces 7404G3 therein, the circulation speed of the cooling fluid contacting the liquid crystal panel 441, incident-side polarization plate 442, and irradiation-side polarization plates 443 can be maintained in the good conditions to increase a heat transfer rate by the cooling fluid, and the liquid crystal panel 441, incident-side polarization plate 442, and irradiation-side polarization plate 443 can be cooled by the cooling fluid efficiently.

Further the cooling fluid flowing in from the inlet ports 4404A4, 4404B4 does not lose the circulation speed in the cooling chambers R1, R2, so that bubbling in the cooling chambers R1, R2 can be suppressed, whereby an image quality of an optical image formed by the liquid crystal panel 441 can be stabilized.

Further, as the circulation speed of the cooling fluid circulating in the cooling chambers R1, R2 can be maintained in the raised state, rpm of the fluid press-feeding section 446 can be set at a lower value, so that generation of noises in the fluid press-feeding section 446 can be suppressed to the minimum level, and a level of noises generated in the projector 1 can be lowered.

Further the cooling chamber dividing section 7404G has a expanding portion expanding toward the liquid crystal panel 441 formed at the substantially central portion and including the slant surfaces 7404G3 and 7404G4, so that the thickness of the layer of cooling fluid circulating between the liquid crystal panel 441 and the cooling chamber dividing section 7404G can further be reduced, and the circulation speed of the cooling fluid contacting the liquid crystal panel 441 can further be quickened.

Further the cooling chamber dividing section 7404G comprises the dividing section main body 7404G1 and the contacting section 7404G2 and, when the cooling chamber dividing section 7404G is set in each of the cooling chambers R1, R2, the contacting section 7404G2 contacts the recessed of the frame members 4404A, 4404B, so that the cooling chamber dividing sections 7404G can be set at prespecified positions in the cooling chambers R1, R2 in good conditions. Therefore, change in the thickness of the layer of cooling fluid contacting the liquid crystal panel 441, incident-side polarization plate 442, and irradiation-side polarization plate 443 due to positional displacement of the cooling chamber dividing section 7404G never occurs in the cooling chambers R1, R2, so that the liquid crystal panel 441, incident-side polarization plate 442, and irradiation-side polarization plates 443 can be cooled in good conditions.

Herein the contacting sections 7404G2 are formed along the borders of the right and left edge sections of the dividing section main body 7404G1 respectively, so that the cooling chamber dividing sections 7404G can accurately be set against the frame members 4404A, 4404B, and positional displacement of the cooling chamber dividing section 7404G can be prevented without fail.

The dividing section main body 7404G1 and the contacting section 7404G2 are a molded product prepared by molding, so that the slant surfaces 7404G3 can easily be formed, and therefore the cooling chamber dividing section 7404G can easily be manufactured. Further by manufacturing the cooling chamber dividing section 7404G by means of molding, also the contacting sections 7404G2 provided at the right and left edge sections of the dividing section main body 7404G1 can easily be formed. Further the slant surfaces 7404G3 can be formed with desired angles, so that a flow rate control of a cooling fluid flowing between the liquid crystal panel 441, incident-side polarization plate 442, and irradiation-side polarization plate 443 and the cooling fluid can easily be carried out. In addition, it is also possible to easily form edge faces of the cooling chamber dividing section 7404G in the light beam incident side and in the light beam irradiation side either with a linear form or with a non-linear form, so that the circulation state of the cooling fluid in the light beam incident side and/or in the light beam irradiation side of the cooling chamber dividing section 7404G can be adjusted freely. Because of the features as described above, in production of the cooling chamber dividing section 7404G, the manufacturing cost can be reduced and improvement of the efficiency in cooling the liquid crystal panel 441, incident-side polarization plate 442, and irradiation-side polarization plate 443 can be realized with low cost.

Further by setting the heat conductivity of the cooling chamber dividing section 7404G to 10 W/m·K or more, it is possible to transfer heat of the cooling fluid circulating in the light beam incident side and in the light beam irradiation side of the cooling chamber dividing section 7404G to the cooling chamber dividing section 7404G, so that the temperature difference circulating in the light beam incident side and in the light beam irradiation side of the cooling chamber dividing section 7404G can be suppressed. Therefore, the liquid crystal panel 441, incident-side polarization plate 442, and irradiation-side polarization plate 443 can be cooled uniformly.

Fifth Embodiment

Next a fifth embodiment of the present invention is described with reference to the related drawings.

In the following descriptions, the same reference numerals are assigned to the same structures and components as those in the first embodiment, and descriptions thereof are simplified or omitted herein.

This embodiment is different from the fourth embodiment described above only in the point that two cooling chamber dividing sections 8404G are provided and the incident-side polarization plate 442 and irradiation-side polarization plate 443 each as an optical modulator are provided between the two components. Other portions of the configuration are the same as those in the fourth embodiment.

FIG. 24A, FIG. 24B, and FIG. 24C are views each showing a structure of the cooling chamber dividing section 8404G in this embodiment. More specifically, FIG. 24A is a view showing the cooling chamber dividing section 8404G set in the light beam incident side of the liquid crystal panel 441 and viewed from the light beam irradiation side. FIG. 24B is a cross-sectional view taken along the line G—G in FIG. 24A, and FIG. 24C is a cross-sectional view taken along the line H—H in FIG. 24A.

The two cooling chamber dividing sections 8404G have the same configuration as the cooling chamber dividing section 7404G described in the fourth embodiment as shown in FIG. 24A, FIG. 24B, and FIG. 24C. Namely the cooling chamber dividing section 8404G comprises a dividing section main body 8404G1 (including 8404G3, 8404G4) and a contacting section 8404G2 substantially similar to the dividing section 7404G1 (including the slant surfaces 7404G3, 7404G4) and the contacting section 7404G2 in the cooling chamber dividing section 7404G described in the fourth embodiment.

The dividing section main body 8404G1 is divided to a first dividing section 8404G5 provided in the light beam irradiation side and a second dividing section 8404G6 provided in the light beam incident side against a position at which the slant surface 8404G3 formed in the light beam irradiation side and the slant surface 8404G3 formed in the light beam incident side cross each other as shown in FIG. 24B and FIG. 24C.

Formed on an light beam incident side edge face of the first dividing section 8404G5 is a recess 8404G7 corresponding to an external form of the incident-side polarization plate 442. When the first dividing section 8404G5 and the second dividing section 8404G6 are assembled with each other, a space is formed between the first dividing section 8404G5 and the second dividing section 8404G6 because of the recess 8404G7, and the incident-side polarization plate 442 is set in this space. When the incident-side polarization plate 442 is set in this space, an adhesive, water glass or the like is applied onto an edge face contacted by the first dividing section 8404G5 and the second dividing section 8404G6 to prevent a cooling fluid from flowing into the space from the outside.

Also the cooling chamber dividing section 8404G set in the light beam irradiation side of the liquid crystal panel 441 has the same configuration, and the irradiation-side polarization plate 443 is set in a space formed with the first dividing section 8404G5 and the second 8404G6 each constituting the cooling chamber dividing section 8404G. The cooling chamber dividing section 8404G set in the light beam irradiation side of the liquid crystal panel 441 is set, like in the first embodiment, so that the two edge faces in the optical-axial direction are reverse to those of the cooling chamber dividing section 8404G set in the light beam incident side of the liquid crystal panel 441.

Figure 25:
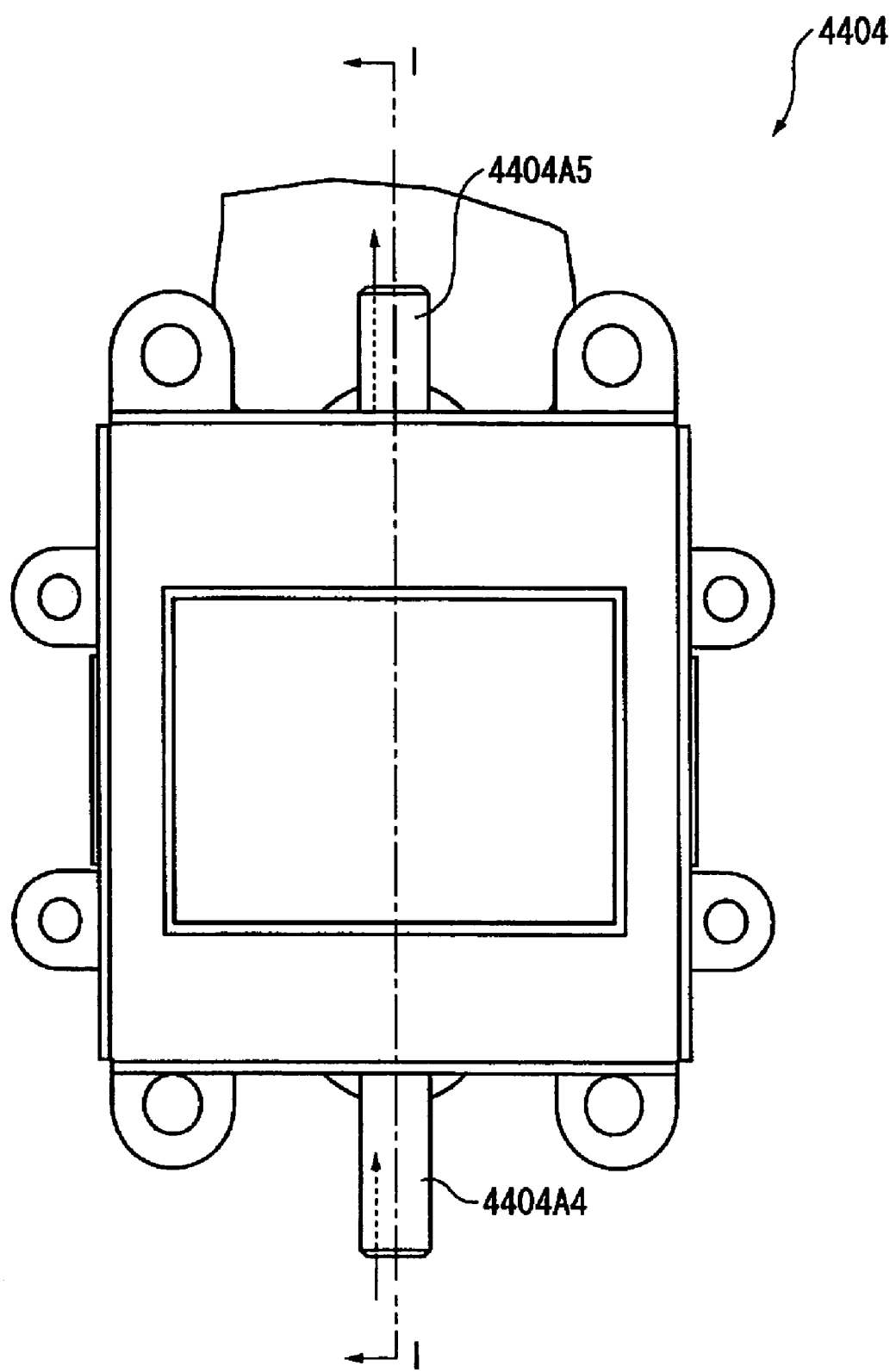
FIG. 25 is a view illustrating a state of the cooling chamber dividing sections arranged inside cooling chambers respectively according to the fifth embodiment.
Figure 26:
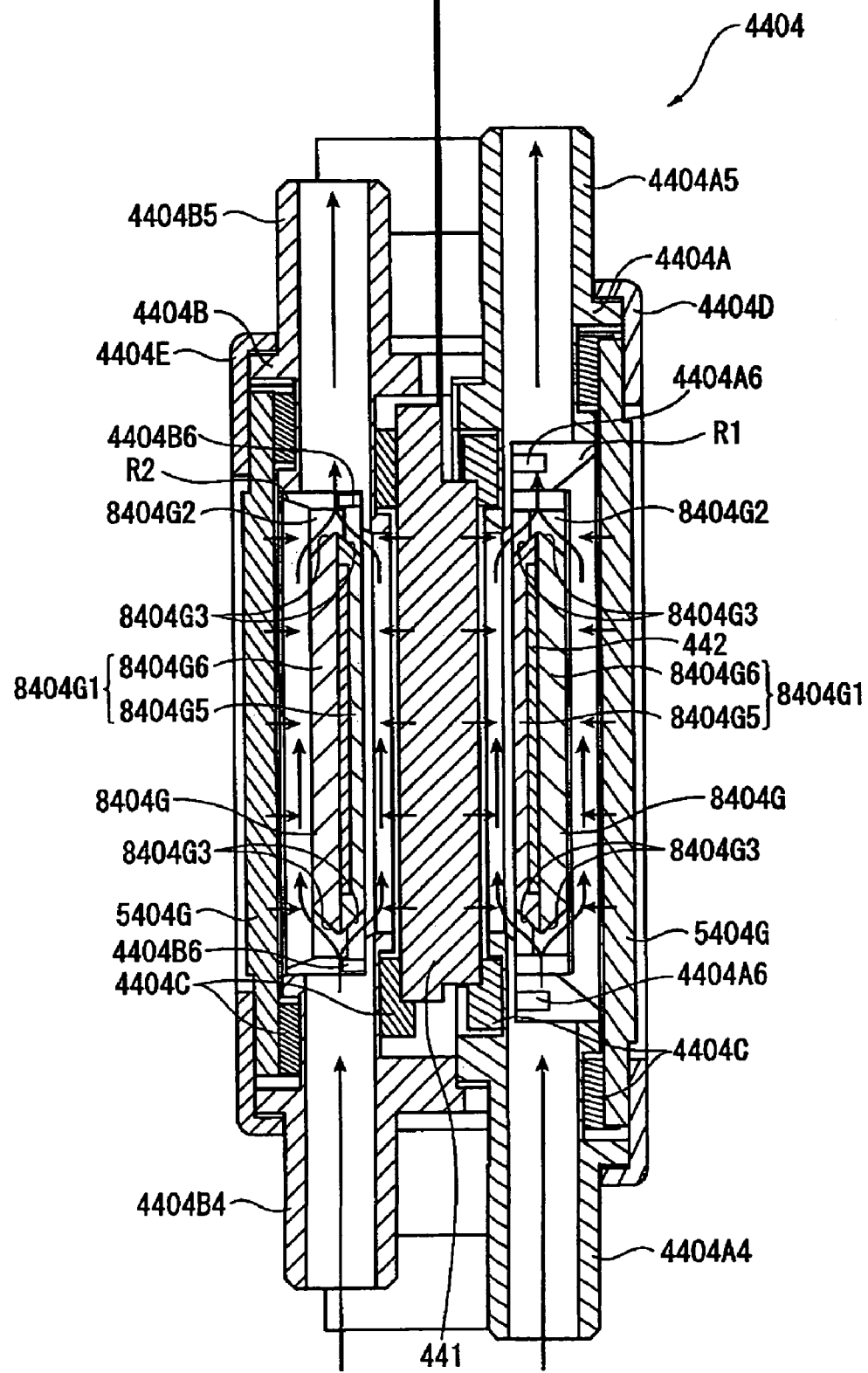
FIG. 26 is a view illustrating a state of the cooling chamber dividing sections arranged inside the cooling chambers respectively according to the fifth embodiment.

FIG. 25 and FIG. 26 are views each for illustrating the state where the cooling chamber dividing sections 8404G are set in the cooling chambers R1, R2 respectively. More specifically, FIG. 25 is a view showing the optical modulator holder main body 4404 viewed from the light beam irradiation side. FIG. 26 is a cross-sectional view taken along the line I—I in FIG. 25.

As shown in FIG. 25 and FIG. 26, the positional arrangement of the two cooling chamber dividing sections 8404G are the same as that of the two cooling chamber dividing sections 7404G described in the fourth embodiment, and detailed description thereof is omitted herein.

Further as the incident-side polarization plate 442 and irradiation-side polarization plates 443 are set in the two cooling chamber dividing sections 8404G respectively, the light-transmissible boards 5404G described in the third embodiment are set in the light beam incident side of the frame member 4404A and in the light beam irradiation side of the frame member 4404B respectively as shown in FIG. 25 and FIG. 26.

In the fifth embodiment described above, different from the fourth embodiment, the dividing section main body 8404G1 constituting each of the cooling chamber dividing sections 8404G is divided to the first dividing section 8404G5 and the second dividing section 8404G6, and further the incident-side polarization plate 442 and irradiation-side polarization plate 443 are set in each of the recesses 8404G7 of the first dividing section 8404G5, so that both the light beam incident side and light beam irradiation side of the incident-side polarization plate 442 and the irradiation-side polarization plates 443 can be cooled with a cooling fluid via the cooling chamber dividing section 8404G, so that the efficiency in cooling the incident-side polarization plate 442 and irradiation-side polarization plate 443 can further be improved.

Sixth Embodiment

A sixth embodiment of the present invention is described below with reference to the related drawings.

In the following descriptions, the same reference numerals are assigned to the same structures and same components as those in the first embodiment above, and detailed description thereof is omitted or simplified herein.

In the first embodiment, in the optical device 44, a flow rate of a cooling fluid branched by the fluid branching section 4401 and flowing into the three optical modulator holders 4402 is set at the substantially same level.

In the six embodiment, however, the optical device 44 comprises a flow rate changing section 449 capable of changing a flow rate of a cooling fluid flowing into the optical modulator holders 4402. Other portions of the configuration are the same as those in the first embodiment.

Figure 27:
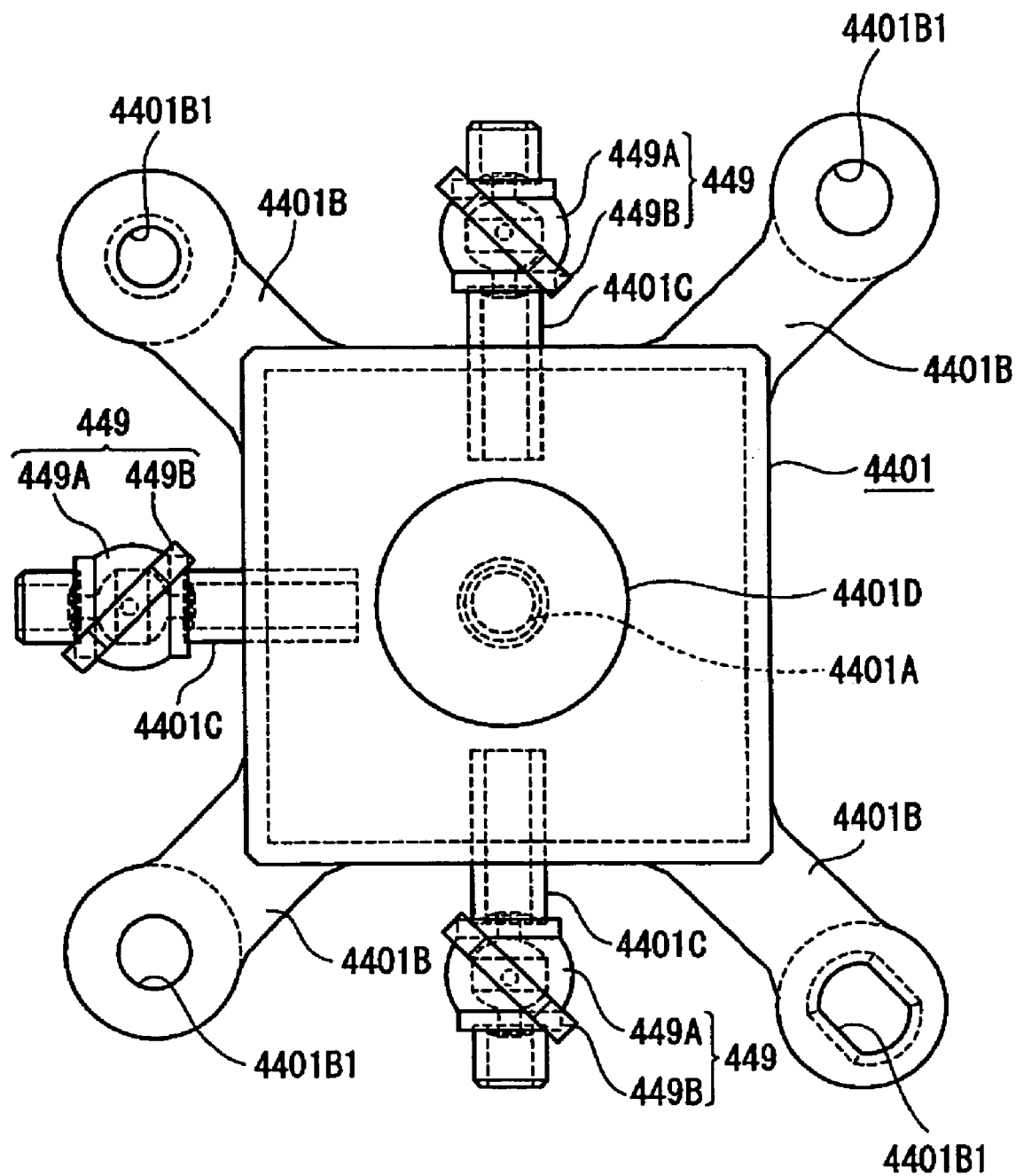
FIG. 27 is a view showing a construction and an arrangement position of a flow rate changing section according to a sixth embodiment.

More specifically, FIG. 27 is a view showing a structure and a positional arrangement of the flow rate changing section 449 in the sixth embodiment. More specifically, FIG. 27 is a view showing the fluid branching section 4401 viewed from the top side.

The flow rate changing sections 449 are provided, as shown in FIG. 27, in the cooling fluid outflow sections 4401C of the fluid branching section 4401 respectively and are capable of changing a flow rate of a cooling fluid fed from each of the cooling fluid outflow sections 4401C to each optical modulator holder 4402. As shown in FIG. 20, this flow rate changing section 449 comprises a flow rate changing section main body 449A and a flow rate adjusting section 449B.

The flow rate changing section main body 449A has a flow path formed so that a cooling fluid can flow therethrough, and also rotatably supports the flow rate adjusting section 449B.

The flow rate adjusting section 449B comprises, although not shown in the figures, a control valve provided in the flow rate changing section main body 449A and an adjustment screw protruding outward from the flow rate changing section main body 449A.

The control valve is used to change a flow rate of a cooling fluid flowing through a flow path by widening or narrowing the flow path in the flow rate changing section main body 449A according to the rotational position. The control valve allows changes in a flow rate of the cooling fluid passing through a flow path in the flow rate changing section main body 449A by manually turning the adjustment screw in correlation to movement of the adjustment screw.

In the sixth embodiment described above, different from the first embodiment, by operating the flow rate adjusting section 449B of the flow rate changing sections 449, it is possible to easily uniform temperatures in the liquid crystal panels 441 with simple configuration and also with high precision by increasing a flow rate of a cooling fluid to ones each with larger heat values of the three liquid crystal panels 441 and also decreasing the flow rate to ones each with a small heat value. With the configuration described above, hue of an optical image formed with each liquid crystal panel 441 can be maintained in good conditions.

Seventh Embodiment

A seventh embodiment of the present invention is described below with reference to the related drawings.

In the following descriptions, the same reference numerals are assigned to the same structures and components as those in the first embodiment, and detailed description thereof is omitted or simplified herein.

In the first embodiment, in the optical device 44, flow rates of fluids branched by the fluid branching section 4401 and flowing into the three optical modulator holders 4402 are adjusted to the substantiality same level.

In contrast, in the fifth embodiment, diameters of the fluid circulating members 748 for connecting the fluid outflow sections 7401C of the fluid branching section 7401 as well as the fluid branching section 7401 to the optical modulator holders 4402 are differentiated to change flow rates of cooling fluids flowing into the optical modulator holders 4402.

Figure 28:
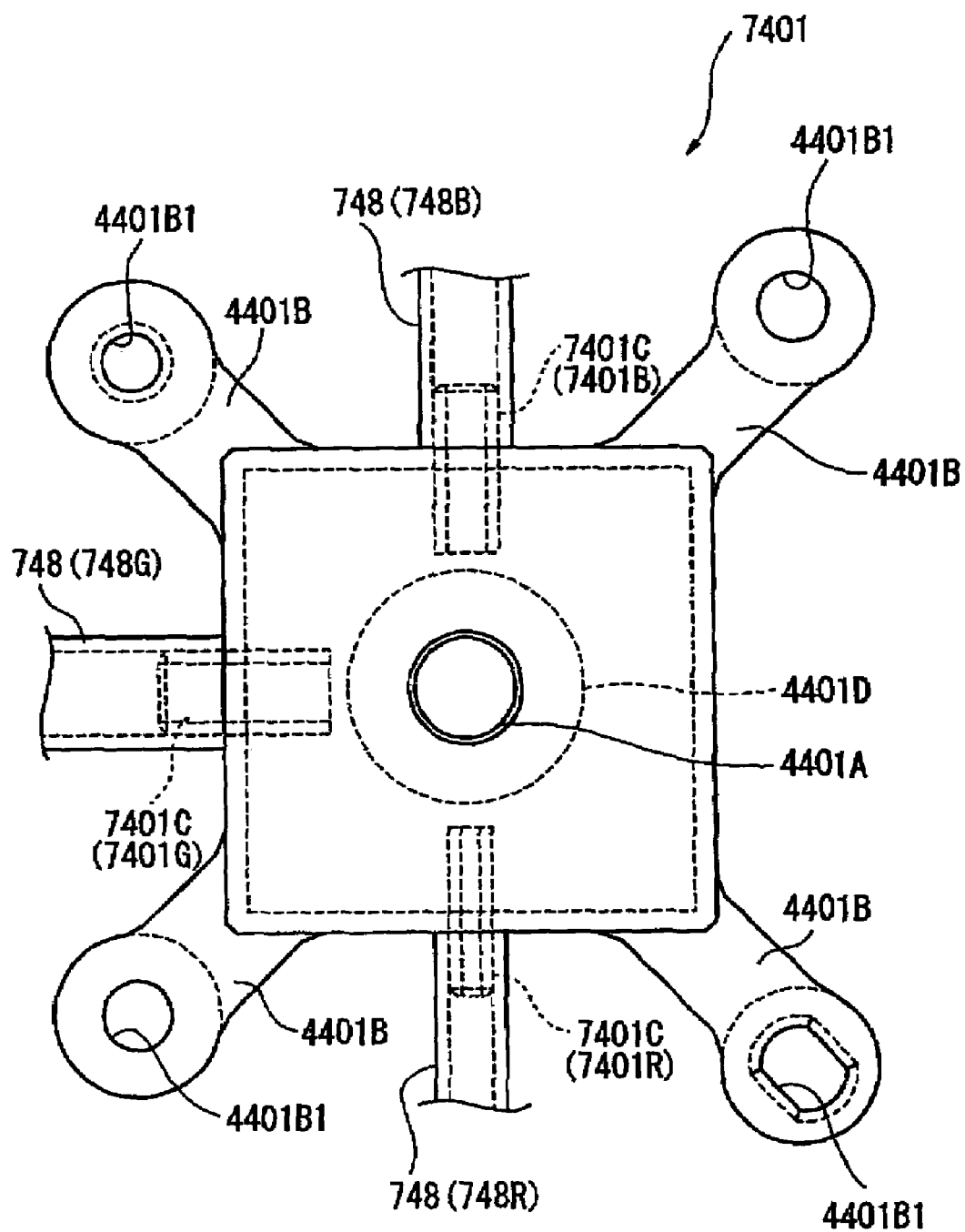
FIG. 28 is a view showing a fluid branching section and fluid circulating members connected thereto according to a seventh embodiment.

Specifically, FIG. 28 is a view showing the fluid branching section 7401 and the fluid circulating member 748 connected to the fluid branching section 7401 in the seventh embodiment. More specifically, FIG. 28 is a flat view showing the fluid branching section 7401 viewed from the bottom side.

The branching section 7401 has the substantially same configuration as that of the fluid branching section 4401 described in the first embodiment, and is different from that only in the point that the three cooling fluid outflow sections 7401R, 7401G, and 7401B have different tube diameters.

In this embodiment, the cooling fluid outflow section 7401G for feeding out a cooling fluid to the optical modulator holder 4402 for holding the liquid crystal panel 441 for G color light has the largest diameter, the cooling fluid outflow section 7401B for feeding out the cooling fluid to the optical modulator holder 4402 for holding the liquid crystal panel 441 for B color light has the second largest diameter, and the cooling fluid outflow section 7401R for feeding out the cooling fluid to the optical modulator holder 4402 for holding the liquid crystal panel 441 for R color light has the smallest diameter.

Also in the fluid circulating member 748, the fluid circulating members 748R, 748G, and 748B have different tube diameters corresponding to diameters of the cooling fluid outflow sections 7401R, 7401G, and 7401B respectively.

In the seventh embodiment described above, different from the first embodiment, the cooling fluid outflow sections 7401R, 7401G, 7401B are designed to have different diameters respectively and further the fluid circulating members 748R, 748G, 748B are designed to have different diameters respectively corresponding to diameters of the cooling fluid outflow sections 7401R, 7401G, 7401B, so that temperatures of the liquid crystal panels 441 can easily be uniformed with the simple configuration. Therefore, hue of an optical image formed by the liquid crystal panels 441 can be maintained in good conditions.

Presently preferred embodiments of the present invention are described above, but the present invention is not limited to the embodiments, and various improvements and design changes are possible without departing from the gist of the present invention.

In each of the embodiments described above, the optical devices 44, 54, 64 have the fluid press-feeding sections 446, 646 for forcefully circulate a cooling fluid, but the configuration may be employed in which the fluid press-feeding sections 446, 646 are omitted. Namely, the configuration may be employed in which the cooling fluid is circulated due to natural circulation.

In the embodiments other than the third embodiment, the radiator 447 is employed as a heat-radiating section, but the present invention is not limited to this configuration, and also the configuration may be employed in which the Perchet module making use of the Perchet effect connected in the heat-transferable state to a cooling fluid circulating in a plurality of fluid circulating members 448 is used as a heat-radiating section.

In the embodiments other than the third embodiment described above, the positions of the radiator 447 and fluid press-feeding section 446 are not limited to those described in each of the embodiments, but the radiator 447 and fluid press-feeding section 446 are required only to be provided at positions along the extending direction of the projector lens 5, and may be provided at any positions right and left from the projector lens 5, or above or under the projector lens 5.

Further in the embodiments described above other than the third embodiment, the axial flow fan 32 for cooling the radiator 447 discharges cooling air to the heat-radiating fins 4473, but the present invention is not limited to this configuration, and also the configuration is allowable in which the air warmed up neat the heat-radiating fins 4473 are absorbed and discharged to outside of the projector 1.

In the first embodiment, the configuration is described in which the incident-side polarization plate 442 and irradiation-side polarization plate 443 are set in the light beam incident side and light beam irradiation side of a pair of frame members 4404A, 4404B constituting the optical modulator holder 4402, but the present invention is not limited to this configuration. For instance, the configuration may be employed in which light-transmissible boards such as glass sheets are set in the light beam incident side and light beam irradiation side of a par of the frame members 4404A, 4404B to seal one edge face of the openings 4404A1, 4404B1, and the incident-side polarization plate 442 and irradiation-side polarization plate 443 are the reflection type of polarization elements as those described in the third embodiment.

Further in the second embodiment and third embodiment, the configuration may be employed in which the light beam incident side of the frame member 5404A is sealed with a light-transmissible member substantially like in the first embodiment and a cooling chamber is formed in each of the pair of frame members 5404A, 5404B. With the configuration, the cooling chambers are provided in he light beam incident side and light beam irradiation side of the liquid crystal panel 441, so that the efficiency in cooling the liquid crystal panel 441 can further be improved.

In the embodiments described above, the configuration is described in which the main tank 445, fluid branching sections 4401, 7401, and relay tanks 4403, 5403 have the cooling fluid inflow sections 445A, 4401A, 4403A and cooling fluid outflow sections 445B, 4401C, 4403B, and 7401C respectively, and one edge sections of the cooling fluid inflow sections 445A, 4401A, 4403A and cooling fluid outflow sections 445B, 4401C, 4403B, 7401C protrude inward respectively, but the present invention is not limited to this configuration. For instance, the configuration is allowable in which the main tank 445, fluid branching sections 4401, 7401 and relay tanks 4403, 5403 are directly communicated and connected to the fluid circulating members 448, 748 and edge sections of the fluid circulating members 448, 748 protrude into inside of the main tank 445, fluid branching sections 4401, 7401 and relay tanks 4403, 5403.

In the embodiments described above, the rectifying sections 4404A6, 4404B6, 5404B6 formed in the frame members 4404A, 4404B, 5404B are formed near the inlet ports 4404A4, 4404B4, and 5404B4 and neat the outlet ports 4404A5, 4404B5, 5404B5 respectively, but the present invention is not limited to this configuration, and the rectifying sections 4404A6, 4404B6, 5404B6 are only required to be formed at least near the inlet ports 4404A4, 4404B4, and 5404B4. Further forms of he rectifying sections 4404A6, 4406B6, and 5404B6 are not limited to those described in the embodiments above, and other forms may be employed on the condition that the cooling fluid flowing into each of the cooling chambers R1, R2, and R3 extends inside thereof.

In the embodiments above, the configuration is described in which the fluid circulating members 448, 748, main tank 445, fluid press-feeding sections 446, 646, tubular member 4472 of the radiator 447, frame members 4404A, 4404B, 5404B, relay tanks 4403, 5403 each comprise an aluminum-made member, but the present invention is not limited to this configuration. Any other material such as oxygen free high conductivity copper or duralumin may be employed so long as the material has the corrosion resistance. As a material for the fluid circulating members 448, 748, low hardness butyl rubber, fluorine rubber or the like having a small reaction force to deformation to the optical modulator holders 4402, 5402, and 6402 and capable of suppressing displacement of pixels may be employed.

Configuration of the cooling chamber dividing sections 7404G, 8404G in the fourth embodiment and fifth embodiment is not always limited to that in the first embodiment, and the configuration according to the second embodiment or the third embodiment may be employed.

In the fourth embodiment and fifth embodiment, the cooling chamber dividing sections 7404G, 8404G have the contacting sections 7404G2, 8404G2 respectively, but the present invention is not limited to this configuration. As the cooling chamber dividing sections 7404G, 8404G can be stabilized at prespecified positions in the cooling chambers R1, R2 with a force of a cooling fluid flowing from the inlet ports 4404A4, 4404B4 in response to inclination angles of the slant surfaces 7404G3, 8404G3 formed in the dividing section main bodies 7404G1 8404G1, the configuration may be employed in which the contacting sections 7404G2, 8404G2 are omitted. The contacting sections 7404G2, 8404G2 are formed along the borders of the right and left edge sections of the dividing section main bodies 7404G1, 8404G1 respectively in the embodiments described above, but there is not specific restriction over the position and the length in the vertical direction so long as at least a pair of contacting sections are formed in the right and left edge sections.

In the fourth and fifth embodiments, the dividing section main bodies 7404G1, 8404G1 and the contacting sections 7404G2, 8404G2 are not always to be monolithically molded, and the components may be formed independently and then integrated with each other.

In the fourth embodiment and fifth embodiment, the slant surfaces 7404G3, 8404G3 are formed in the cooling chamber dividing sections 7404G, 8404G, but the present invention is not limited to this configuration. The portions are required only to be tapered so that the cross sections become smaller toward the inlet ports 4404A4, 4404B4 and also toward the outlet ports 4404A5, 4404B5, and also the configuration is allowable in which the slant surfaces 7404G3, 8404G3 are not flat and are curved.

In the fourth embodiment and fifth embodiment, the cooling chamber dividing sections 7404G, 8404G are provided between the liquid crystal panel 441 and the frame member 4404A and between the liquid crystal panel 441 and the frame member 4404B respectively, but the present invention is not limited to this configuration, and the cooling chamber dividing sections 7404G, 8404G may be provided between the incident-side polarization plate 442 and frame member 4404A and between the frame member 4404B and irradiation-side polarization plate 443 so long as the components are set in the cooling chambers.

The flow rate changing section 449 in the sixth embodiment is not always required to employ the configuration in the first embodiment, and the configuration in any of the second through fifth embodiments may be employed. Further the three flow rate changing sections 449 are provided for one unit of liquid crystal panel 441 in the embodiments described above, but the present invention is not limited to this configuration, and one or two units of flow rate changing sections 449 may be provided for one unit of liquid crystal panel 441. Further the flow rate changing section 449 is provided in the cooling fluid outflow section 4401C of the fluid branching section 4401 in the embodiments described above, but the present invention is not limited to this configuration, and also the configuration is allowable in which the flow rate changing section 449 is provided in the fluid circulating member 448 connected to the cooling fluid outflow section 4401C. Further the configuration of the flow rate changing section 449 is not limited to that described in the sixth embodiment, and other configurations may be employed on the condition that a valve is provided in a flow path for a cooling fluid and the flow path is widened or narrowed by changing a position of the valve.

In the embodiments described above, the configuration is employed in which external faces of the optical modulator holders 4402, 5402, and 6402 and a bottom face of the casing 45 for optical components are cooled by air sent by the sirocco fan 31, but the present invention is not limited to this configuration, and also the configuration may be employed in which the sirocco fan 31 is omitted. With the configuration, noise reduction can be realized.

The fluid branching section 7401 and the fluid circulating member 748 connected to the fluid branching section 7401 in the seventh embodiment are not always required to employ the configuration according to the first embodiment, and may employ the configuration described in the second to fifth embodiments. Further diameters of the cooling fluid outflow sections 7401C in the fluid branching section 7401 and those of the fluid circulating members 748 connected to the cooling fluid outflow sections 7401C are differentiated from each other in the embodiments described above, but the present invention is not limited to this configuration, and also the configuration may be employed in which only one of the components has a smaller or a larger diameter as compared to those of the other components.

In the first embodiment, second embodiment, fourth embodiment, and fifth embodiment, the incident-side polarization plate 442 and irradiation-side polarization plate 443 are employed each as an optical modulator, and the incident-side polarization plate 442 and/or irradiation-side polarization plate 443 are cooled with a cooling fluid, but the present invention is not limited to this configuration, and the configuration may be employed in which any of a phase difference plate, view field correction plate, or the like is employed as an optical modulator and the components are cooled with a cooling fluid, In the fifth embodiment, the dividing section main body 8404G comprises a first dividing section 8404G5 and a second dividing section 8404G6, but the present invention is not limited to this configuration, and also the configuration may be employed in which the polarization plate, phase difference plate, view field correction plate or the like is provided at least one of the spaces between the plurality of components.

In the embodiments above, the configuration is described in which the optical unit 4 has a substantially L-shaped formed when viewed from the top side, but the present invention is not limited to this configuration, and also the configuration may be employed in which the optical unit 4 has a substantially U-shaped form when viewed from the top side.

In the embodiments described above, the configuration is described in which the projector 1 using the three liquid crystal panels 441 is used, but the present invention is also applicable to the configuration in which the projector using only one liquid crystal panel, that using only two liquid crystal panels, or that using four or more liquid crystal panels is employed.

In the embodiments above, a transmission type of liquid crystal panel in which the light incident face and the light irradiation face are different, but the reflection type of liquid crystal panel in which the light incident face and the light irradiation face are identical may be used.

In the embodiments described above, a liquid crystal panel is used as an optical modulator, but an optical modulator other than a liquid crystal such as a device using a micro mirror may be employed. In this case, polarization plates in the light beam incident side and in the light beam irradiation side may be omitted.

In the embodiments described above, only a front type of projector projecting images in a direction in which viewers observe the screen on which the images are projected is described as an example, but the present invention is also applicable to a rear type of projector projecting images form behind the screen.

Optimal configurations for carrying out the present invention are described above, but the present invention is not limited to the embodiments described above. Namely, although the present invention is mainly illustrated and described above in relation to specific examples, but those skilled in the art can easily add various modifications to the present invention in details of the configuration such as a form, a material, a quantity, and the like without departing from the technological ideas and a scope of the objects of the present invention.

The forms, materials, and other restrictive descriptions on details of the present invention are only provided as examples so that those skilled in the art can easily understand the present invention, and do not limit the present invention in any sense, and therefore the descriptions using component names not employing a portion or all of the definitions for the forms, materials, and other details are included within a scope of the present invention.

The priority application Number JP2004-314547 upon which this patent application is based is hereby incorporated by reference.

What is claimed is:

1. An optical device which includes an optical modulator forming an optical image by modulating a light beam irradiated from a light source in accordance with image information, comprising:

an optical modulator holder having a cooling chamber, in which a cooling fluid is sealed therein, for holding said optical modulator in a thermally conductive state for the cooling fluid in said cooling chamber;

a plurality of fluid circulating members communicated to said cooling chamber of said optical modulator holder for guiding said cooling fluid to the outside of said cooling chamber and again guiding said cooling fluid to the inside of said cooling chamber; and a cooling fluid accumulating section provided in a flow path of said cooling fluid of said plurality of fluid circulating members for accumulating therein said cooling fluid, wherein said cooling fluid accumulating section comprises an upstream-side cooling fluid accumulating section provided in the upstream of said cooling fluid against said optical modulator holder and a downstream-side cooling fluid accumulating section provided in the downstream of said cooling fluid against said optical modulator holder, wherein said optical modulator holder includes a pair of frame members each having an opening formed therein corresponding to an image forming region of said optical modulator and a light-transmissible substrate provided on either one of the sides of said openings opposite to the sides where said pair of frame members are opposed to each other for closing either one of the sides of said openings opposite to the sides where said pair of frame members are opposed to each other, wherein said optical modulator is held between said pair of frame members for closing the sides of said opening where said pair of frame members are opposed to each other, and wherein either one of said pair of frame members is formed with an inlet port for flowing said cooling fluid inside and an outlet port for flowing said cooling fluid outside, both communicating to said plurality of fluid circulating members, and said cooling chamber is formed for sealing said cooling fluid by closing the sides of said opening where said pair of frame members are opposed to each other and the sides of said openings opposite to the sides where said pair of frame members are opposed to each other respectively with said optical modulator and said light-transmissible substrate.

2. The optical device according to claim 1, wherein said optical device comprises a radiator provided in the flow path of said cooling fluid in said plurality of fluid circulating members flowing from said downstream-side cooling fluid accumulating section to said upstream-side cooling fluid accumulating section for radiating heat of said cooling fluid.

3. The optical device according to claim 1, wherein said optical device comprises a fluid press-feeding section provided in the flow path of said cooling fluid in said plurality of fluid circulating members for pressurizing and sending said cooling fluid to said optical modulator holder via said plurality of fluid circulating members to force the circulation of said cooling fluid.

4. The optical device according to claim 1, wherein said optical modulator holder includes a pair of light-transmissible substrates respectively provided on the sides of said openings opposite to the sides where said pair of frame members are opposed to each other for respectively closing the sides of said openings opposite to the sides where said pair of frame members are opposed to each other, and wherein said pair of frame members are formed with inlet ports for flowing said cooling fluid inside and outlet ports for flowing said cooling fluid outside, both communicating to said plurality of fluid circulating members, and a pair of said cooling chambers for sealing said cooling fluid are formed by closing the sides of said opening where said pair of frame members are opposed to each other and the sides of said openings opposite to the sides where said pair of frame members are opposed to each other respectively with said optical modulator and said pair of light-transmissible substrates respectively.

5. The optical device according to claim 4,
wherein said inlet port and said outlet port are formed at positions opposite to each other in said frame member respectively, and
wherein a rectifying section is formed at a position near said inlet port for flowing said cooling fluid into said cooling chamber so that said cooling fluid extends to the inside thereof.

6. The optical device according to claim 4,
wherein said optical modulator holder comprises a cooling chamber dividing section made from plate-formed members with translucency and having a form corresponding to an image forming region of said optical modulator, and the cooling chamber dividing section is provided inside said cooling chamber for dividing said cooling chamber to two regions of the light beam incident side and the light beam irradiation side, and
wherein said cooling chamber dividing section, when arranged inside said cooling chamber of said optical modulator holder, has tapered forms with the cross-sections gradually becoming smaller toward said inlet port side and toward said outlet port side respectively in each of the side edge faces of said inlet port and said outlet port.

7. The optical device according to claim 4,
wherein said optical device comprises at least one optical converter for converting optical characteristics of an incident fight beam,
wherein said optical converter comprises a light-transmissible substrate and an optical conversion film formed on said light-transmissible substrate for converting the optical characteristics of the incident light beam, and
wherein at least either one of the light-transmissible substrates constituting said optical modulator holder is a light-transmissible substrate constituting said optical converter.

8. The optical device according to claim 6,
wherein said frame member formed inside said cooling chamber has at least a pair of recesses formed in the side edge portions facing each other in the peripheries of said openings to reduce the thickness thereof,
wherein said cooling chamber dividing section comprises a dividing section body made from plate-formed members having translucency and at least a pair of contacting sections positioned in the side edge portions facing each other in said dividing section body and having forms corresponding to said recesses, and
wherein said cooling chamber dividing section is arranged inside said cooling chamber by contacting said contacting sections to said recesses of said frame member.

9. The optical device according to claim 6,
wherein said optical device comprises at least one optical converter for converting optical characteristics of an incident light beam,
wherein said cooling chamber dividing section is formed by laminating a plurality of plate-formed members, and
wherein said optical converter is provided at least between any of said plurality of plate-formed members.

10. The optical devise according to claim 1,
wherein there are a plurality of optical modulators,
wherein there are a plurality of optical modulator holders in accordance with said plurality of optical modulators,
wherein said upstream-side cooling fluid accumulating section includes a fluid branching section for branching and sending out an accumulated cooling fluid via said plurality of fluid circulating members in each of said plurality of optical modulator holders, and wherein said downstream-side cooling fluid accumulating section sends in said cooling fluid from each of said optical modulator holders via said plurality of fluid circulating members in batch.

11. The optical device according to claim 10,
wherein said optical device comprises a color combining optical device having a plurality of light beam incident sides on which said plurality of optical modulator holders are mounted for combining and irradiating respective color lights modulated with said plurality of optical modulators, and
wherein said downstream-side cooling fluid accumulating section is attached to either one of the edge faces intersecting said plurality of light incident sides of said color combining optical device, and said fluid branching section is attached to the other edge face.

12. The optical device according to claim 10,
wherein said optical device comprises a flow rate changing section allowing modification of flow rates of said cooling fluid flowing in said respective optical modulator holders in response to heat values of said plurality of optical modulators.

13. The optical device according to claim 10,
wherein said plurality of fluid circulating members are made from tubular members having different diameters corresponding to the heat values of said plurality of optical modulators.

14. The optical device according to claim 1,
wherein said upstream-side cooling fluid accumulating section and said downstream-side cooling fluid accumulating section have a cooling fluid flow-in section for flowing said cooling fluid inside as well as a cooling fluid flow-out section for flowing said cooling fluid outside, both connecting to said plurality of fluid circulating members respectively, and
wherein said cooling fluid flow-in section and said cooling fluid flow-out section have a tubular allowing passage of said cooling fluid respectively, and have one of the edge portions protruding toward inside said upstream-side cooling fluid accumulating section and that toward inside said downstream-side cooling fluid accumulating section respectively.

15. A projector comprising a light source, an optical device, a projection optical device formed in said optical device for projecting an optical image in an enlarged manner, and an exterior casing for accommodating therein said light source, said optical device and said projection optical device at prespecified positions, wherein
said optical device includes an optical modulator forming an optical image by modulating a light beam irradiated from a light source in accordance with image information, the optical device comprising:
an optical modulator holder having a cooling chamber, in which a cooling fluid is sealed therein, for holding said optical modulator in a thermally conductive state for the cooling fluid in said cooling chamber;
a plurality of fluid circulating members communicated to said cooling chamber of said optical modulator holder for guiding said cooling fluid to the outside of said cooling chamber and again guiding said cooling fluid to the inside of said cooling chamber; and
a cooling fluid accumulating section provided in a flow path of said cooling fluid of said plurality of fluid circulating members for accumulating therein said cooling fluid,
wherein said cooling fluid accumulating section comprises an upstream-side cooling fluid accumulating section provided in the upstream of said cooling fluid against said optical modulator holder and a downstream-side cooling fluid accumulating section provided in the downstream of said cooling fluid against said optical modulator holder, wherein said optical modulator holder includes a pair of frame members each having an opening formed therein corresponding to an image forming region of said optical modulator and a light-transmissible substrate provided on either one of the sides of said openings opposite to the sides where said pair of frame members are opposed to each other for closing either one of the sides of said openings opposite to the sides where said pair of frame members are opposed to each other, wherein said optical modulator is held between said pair of frame members for closing the sides of said opening where said pair of frame members are opposed to each other, and wherein either one of said pair of frame members is formed with an inlet port for flowing said cooling fluid inside and an outlet port for flowing said cooling fluid outside, both communicating to said plurality of fluid circulating members, and said cooling chamber is formed for sealing said cooling fluid by closing the sides of said opening where said pair of frame members are opposed to each other and the sides of said openings opposite to the sides where said pair of frame members are opposed to each other respectively with said optical modulator and said light-transmissible substrate.

16. The projector according to claim 15, wherein said optical device comprises a radiator provided in the flow path of said cooling fluid flowing from said downstream-side cooling fluid accumulating section to said upstream-side cooling fluid accumulating section in said plurality of fluid circulating members for radiating heat of said cooling fluid, and wherein said exterior casing has a partition wall for partitioning said radiator from other components.

17. The projector according to claim 16, wherein said radiator includes a plurality of heat-radiating fins, and wherein said partition wall has a cooling fan for blowing cooling air to said plurality of heat-radiating fins or for sucking air near said plurality of heat-radiating fins.

18. The projector according to claim 16, wherein said radiator is provided inside the partition wall of said exterior casing along the extending direction of said projection optical device.

19. The projector according to claim 15, wherein said projector comprises a casing for optical components made from a thermally conductive material for accommodating therein said optical device at a prespecified position for said projection optical device, wherein there are a plurality of optical modulators constituting said optical device, wherein there are a plurality of optical modulator holders constituting said optical device corresponding to said plurality of optical modulators, wherein said optical device comprises a color combining optical device having a plurality of light beam incident sides on which said plurality of optical modulator holders are mounted for combining and irradiating respective color lights modulated with said plurality of optical modulators, wherein an upstream-side cooling fluid accumulating section constituting said optical device includes a fluid branching section made from a thermally conductive material and attached to either one of the edge faces intersecting said plurality of light incident sides of said color combining optical device for branching and sending out said accumulated cooling fluid in each of said plurality of optical modulator holders via said plurality of fluid circulating members, and wherein said fluid branching section is connected, when said optical device is accommodated in said casing for optical components, to said casing for optical components in the thermally conductive state.

20. The projector according to claim 15, wherein said optical device comprises a fluid press-feeding section provided in the flow path of said cooling fluid in said plurality of fluid circulating members for pressurizing and sending said cooling fluid to said optical modulator holders via said plurality of fluid circulating members to force the circulation of said cooling fluid, and wherein said fluid press-feeding section is provided inside said exterior casing along the extending direction of said projection optical device.

* * * * *